(12) United States Patent
Zhou et al.

(10) Patent No.: US 12,126,572 B2
(45) Date of Patent: Oct. 22, 2024

(54) UPLINK TRANSMISSIONS USING MULTIPLE ACTIVE RESOURCES

(71) Applicant: Comcast Cable Communications, LLC, Philadelphia, PA (US)

(72) Inventors: Hua Zhou, Herndon, VA (US); Esmael Dinan, Herndon, VA (US); Ali Cirik, Herndon, VA (US); Alireza Babaei, Fairfax, VA (US); Hyoungsuk Jeon, Centreville, VA (US); Kyungmin Park, Vienna, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 270 days.

(21) Appl. No.: 17/509,653

(22) Filed: Oct. 25, 2021

(65) Prior Publication Data
US 2022/0116188 A1 Apr. 14, 2022

Related U.S. Application Data

(63) Continuation of application No. 16/671,691, filed on Nov. 1, 2019, now Pat. No. 11,184,140.
(Continued)

(51) Int. Cl.
*H04L 5/00* (2006.01)
*H04B 1/713* (2011.01)
*H04L 1/1812* (2023.01)
*H04W 72/20* (2023.01)
*H04W 72/23* (2023.01)
(Continued)

(52) U.S. Cl.
CPC .......... *H04L 5/0092* (2013.01); *H04B 1/713* (2013.01); *H04L 1/1819* (2013.01); *H04L 5/0055* (2013.01); *H04L 5/0098* (2013.01); *H04W 72/20* (2023.01); *H04W 72/23* (2023.01); *H04W 74/0808* (2013.01); *H04W 76/27* (2018.02); *H04W 80/02* (2013.01)

(58) Field of Classification Search
None
See application file for complete search history.

(56) References Cited

U.S. PATENT DOCUMENTS

2018/0208548 A1 7/2018 Herzog et al.
2019/0103954 A1 4/2019 Lee et al.
(Continued)

FOREIGN PATENT DOCUMENTS

WO WO-2019160720 A1 * 8/2019 ............ H04W 24/02

OTHER PUBLICATIONS

Jan. 20, 2023—EP Office Action—EP App No. 19206713.0.
(Continued)

*Primary Examiner* — Anh Ngoc M Nguyen
(74) *Attorney, Agent, or Firm* — Banner & Witcoff, Ltd.

(57) ABSTRACT

Systems, apparatuses, and methods are described for wireless communications. A base station may transmit, to a wireless device, a DCI format comprising a downlink BWP indicator, an uplink BWP indicator, a PDSCH resource allocation, and a PUCCH resource allocation for HARQ ACK transmission. The wireless device may select, from a plurality of uplink active BWPs of the cell, an uplink active BWP based on the uplink BWP indicator. The wireless device may transmit the HARQ ACK via the selected uplink active BWP.

37 Claims, 45 Drawing Sheets

Related U.S. Application Data

(60) Provisional application No. 62/754,259, filed on Nov. 1, 2018.

(51) Int. Cl.
*H04W 74/0808* (2024.01)
*H04W 76/27* (2018.01)
*H04W 80/02* (2009.01)

(56) References Cited

U.S. PATENT DOCUMENTS

| | | | |
|---|---|---|---|
| 2019/0113437 A1 | 4/2019 | Guan et al. | |
| 2019/0215126 A1 | 7/2019 | Choi et al. | |
| 2019/0253200 A1 | 8/2019 | Salem et al. | |
| 2019/0254110 A1 | 8/2019 | He et al. | |
| 2019/0261185 A1 | 8/2019 | Velev | |
| 2019/0261244 A1 | 8/2019 | Jung et al. | |
| 2019/0274032 A1 | 9/2019 | Chatterjee et al. | |
| 2019/0313437 A1* | 10/2019 | Jung | H04L 5/0042 |
| 2020/0106573 A1 | 4/2020 | Cirik et al. | |
| 2020/0145280 A1 | 5/2020 | Cirik et al. | |
| 2020/0146059 A1 | 5/2020 | Cirik et al. | |
| 2020/0221499 A1 | 7/2020 | Hofstrom et al. | |
| 2021/0084650 A1* | 3/2021 | Fan | H04L 5/0098 |

OTHER PUBLICATIONS

Mar. 4, 2020—European Extended Search Report—EP 19206713.0.
R1-1804643 3GPP TSG-RAN WG1 Meeting #92bis, Sanya, China, Apr. 16-20, 2018, Source: Panasonic, Title: On support of faster inter-bandwidth part hopping for increased reliability.
R1-1810128 3GPP TSG-RAN WG1 Meeting #94bis, Chengdu, China, Oct. 8-12, 2018, Source: Huawei, HiSilicon, Title: HARQ enhancements in NR unlicensed.
3GPP TS 38.104 V15.2.0 (Jun. 2018), Technical Specification, 3rd Generation Partnership Project; Technical Specification Group Radio Access Network; NR; Base Station (BS) radio transmission and reception (Release 15).
3GPP TS 38.133 V15.3.0 (Sep. 2018), Technical Specification, 3rd Generation Partnership Project; Technical Specification Group Radio Access Network; NR; Requirements for support of radio resource management (Release 15).
3GPP TS 38.211 V15.3.0 (Sep. 2018), Technical Specification, 3rd Generation Partnership Project; Technical Specification Group Radio Access Network; NR; Physical channels and modulation (Release 15).
3GPP TS 38.212 V15.3.0 (Sep. 2018), Technical Specification, 3rd Generation Partnership Project; Technical Specification Group Radio Access Network; NR; Multiplexing and channel coding (Release 15).
3GPP TS 38.213 V15.3.0 (Sep. 2018); Technical Specification; 3rd Generation Partnership Project; Technical Specification Group Radio Access Network; NR; Physical layer procedures for control (Release 15).
3GPP TS 38.214 V15.3.0 (Sep. 2018); Technical Specification; 3rd Generation Partnership Project; Technical Specification Group Radio Access Network; NR; Physical layer procedures for data (Release 15).
3GPP TS 38.300 V15.3.0 (Sep. 2018), Technical Specification, 3rd Generation Partnership Project; Technical Specification Group Radio Access Network; NR; NR and NG-RAN; Overall Description; Stage 2 (Release 15).
3GPP TS 38.321 V15.3.0 (Sep. 2018); Technical Specification; 3rd Generation Partnership Project; Technical Specification Group Radio Access Network; NR; Medium Access Control (MAC) protocol specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
R1-1709972 3GPP TSG-RAN WG1 NR Ad Hoc, Qingdao, China, Jun. 27-30, 2017, Source: Huawei, HiSilicon, Title: Overview of wider bandwidth operations.
R1-1710126 3GPP TSG-RAN WG1 NR Ad Hoc, Qingdao, China, Jun. 27-30, 2017, Source: ZTE, Title: Resource allocation for wideband operation.
R1-1710416 3GPP TSG-RAN WG1 NR Ad Hoc, Qingdao, China, Jun. 27-30, 2017, Source: AT&T, Title: Design considerations for NR operation with wide bandwidths.
R1-1710583 3GPP TSG-RAN WG1 NR Ad Hoc, Qingdao, China, Jun. 27-30, 2017, Source: Intel Corporation, Title: Open issues for wider bandwidth operations.
R1-1710761 3GPP TSG-RAN WG1 NR Ad Hoc, Qingdao, China, Jun. 27-30, 2017, Source: Samsung, Title: Wider Bandwidth Operations.
R1-1710883 3GPP TSG-RAN WG1 NR Ad Hoc, Qingdao, China, Jun. 27-30, 2017, Source: Nokia, Alcatel-Lucent Shanghai Bell, Title: On wider band aspects of NR.
R1-1711788 3GPP TSG-RAN WG1 NR Ad Hoc, Qingdao, China, Jun. 27-30, 2017, Source: Intel, AT&T, Huawei, HiSilicon, Title: Way forward on further details of bandwidth part operation.
R1-1712153 3GPP TSG RAN WG1 Meeting #90, Prague, Czech Republic, Aug. 21-25, 2017, Source: Huawei, HiSilicon, Title: Overview of bandwidth part.
R1-1712669 3GPP TSG RAN WG1 Meeting #90, Prague, Czech Republic, Aug. 21-25, 2017, Source: ZTE, Title: Resource allocation for wideband operation.
R1-1712728 3GPP TSG RAN WG1 Meeting #90, Prague, Czech Republic, Aug. 21-25, 2017, Source: AT&T, Title: Remaining details of bandwidth parts.
R1-1712870 3GPP TSG RAN WG1 Meeting #90, Prague, Czech Republic, Aug. 21-25, 2017, Source: vivo, Title: Discussion on the activation/deactivation of the bandwidth part.
R1-1712953 3GPP TSG RAN WG1 Meeting #90, Prague, Czech Republic, Aug. 21-25, 2017, Source: Ericsson, Title: On bandwidth parts.
R1-1713964 3GPP TSG RAN WG1 Meeting #90, Prague, Czech Republic, Aug. 21-25, 2017, Source: NTT DOCOMO, Inc., Title: Remaining issues on bandwidth parts for NR.
R1-1714094 3GPP TSG RAN WG1 Meeting #90, Prague, Czech Republic, Aug. 21-25, 2017, Source: Nokia, Nokia Shanghai Bell, Title: On the remaining wider-band aspects of NR.
Apr. 29, 2021—European Office Action—EP 19206713.0.

* cited by examiner

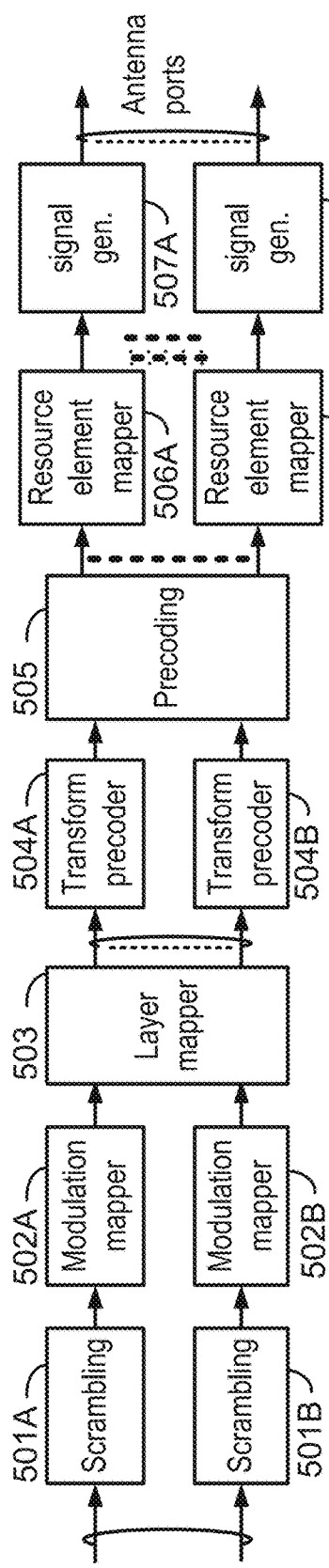
FIG. 5A Example uplink physical channel
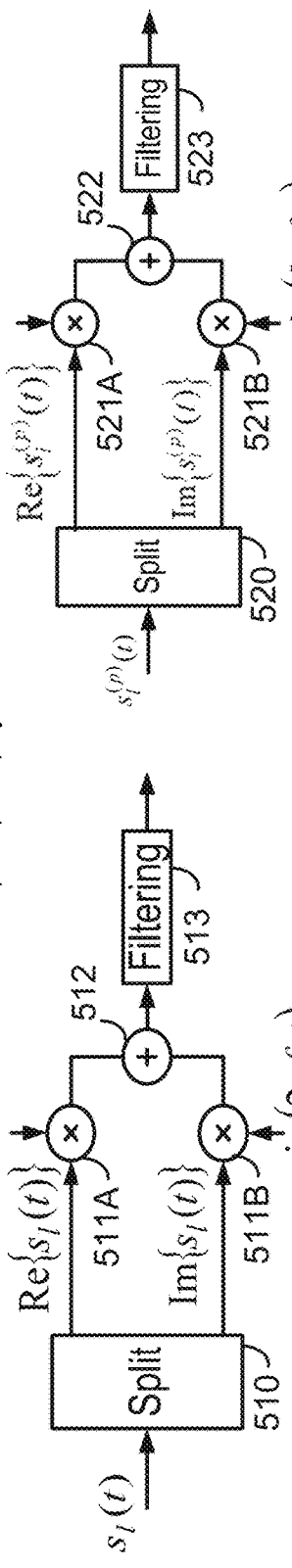
FIG. 5B Example uplink modulation
FIG. 5D Example downlink modulation
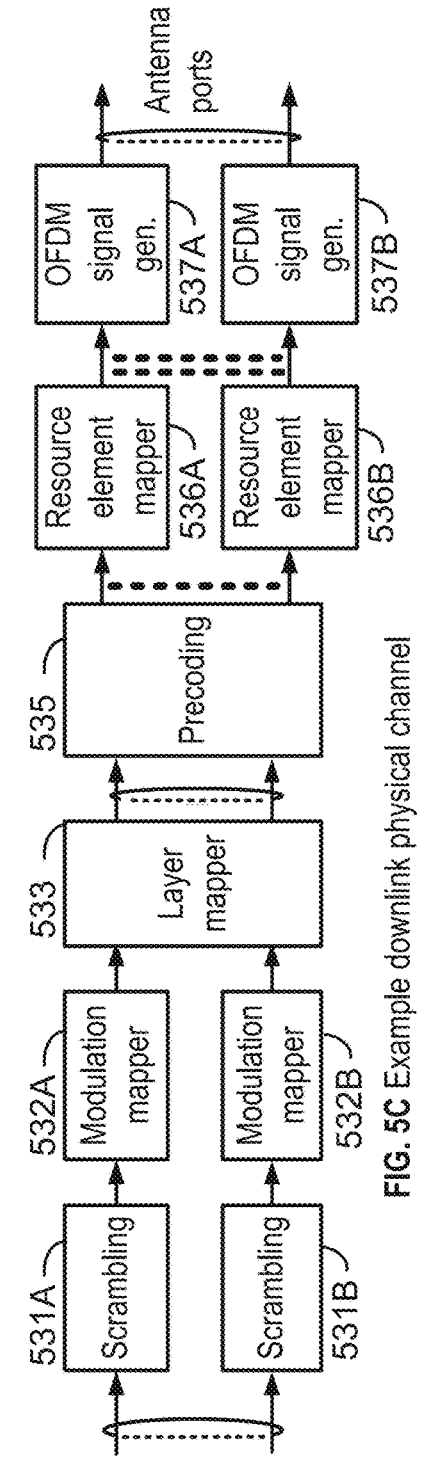
FIG. 5C Example downlink physical channel

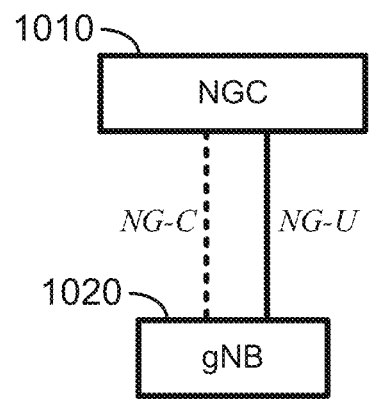
FIG. 10A gNB connected to NGC
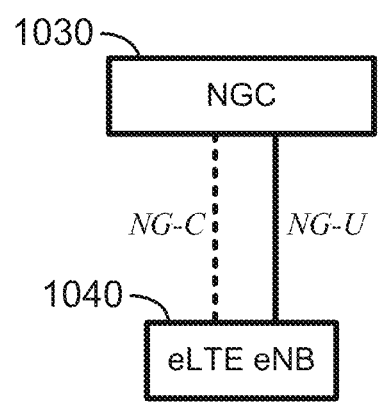
FIG. 10B eLTE eNB connected to NGC

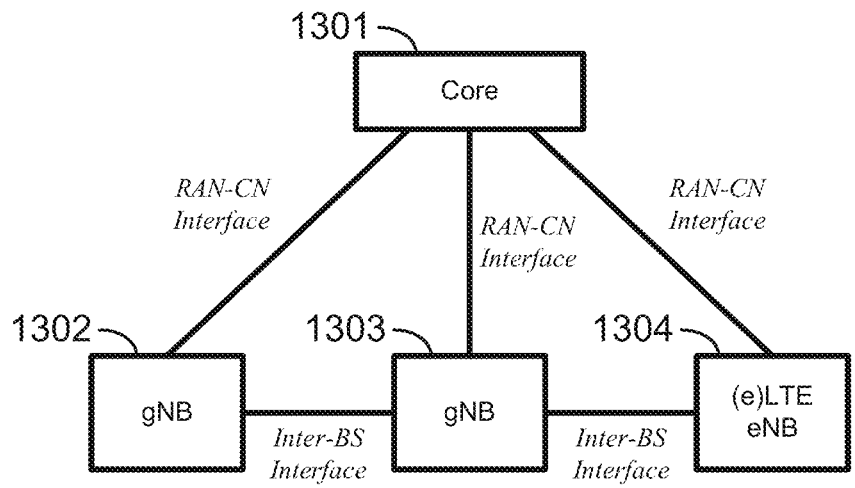
FIG. 13A Non-centralized deployment
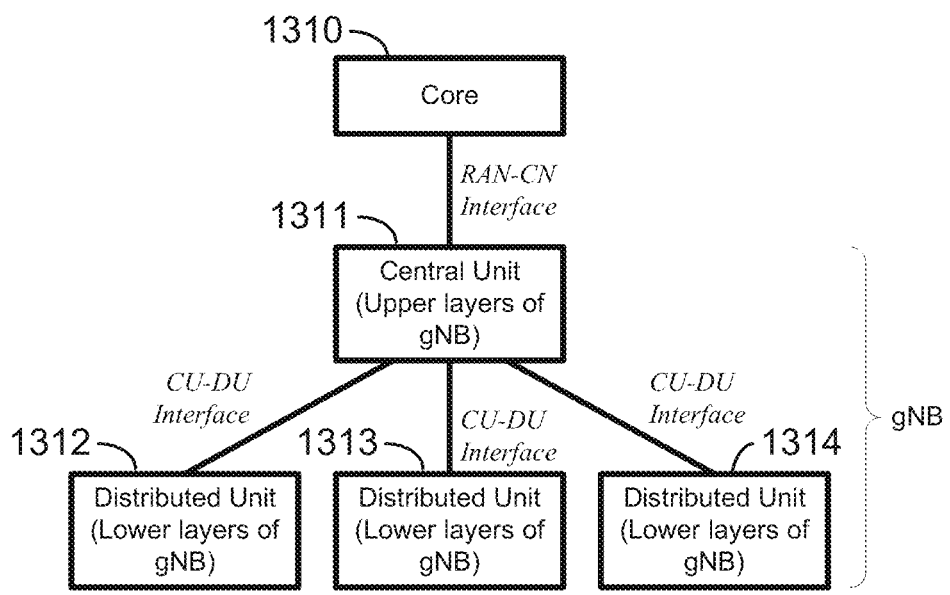
FIG. 13B Centralized deployment

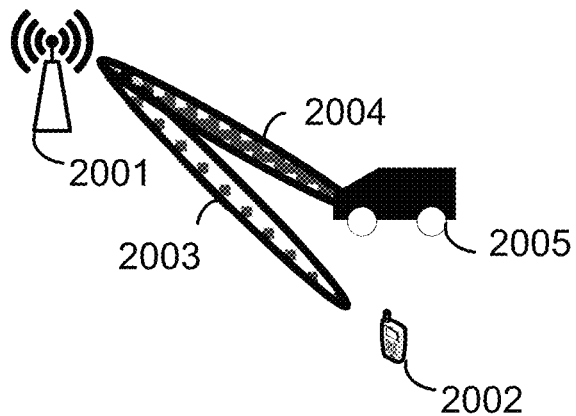
FIG. 20A Beam Failure in one TRP
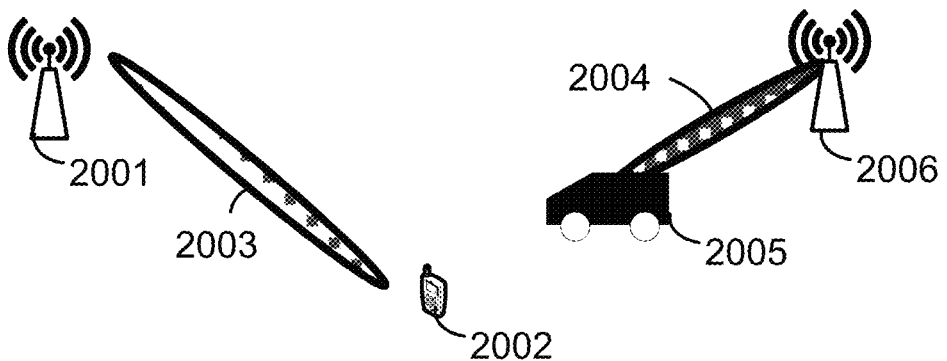
FIG. 20B Beam failure in multiple TRPs

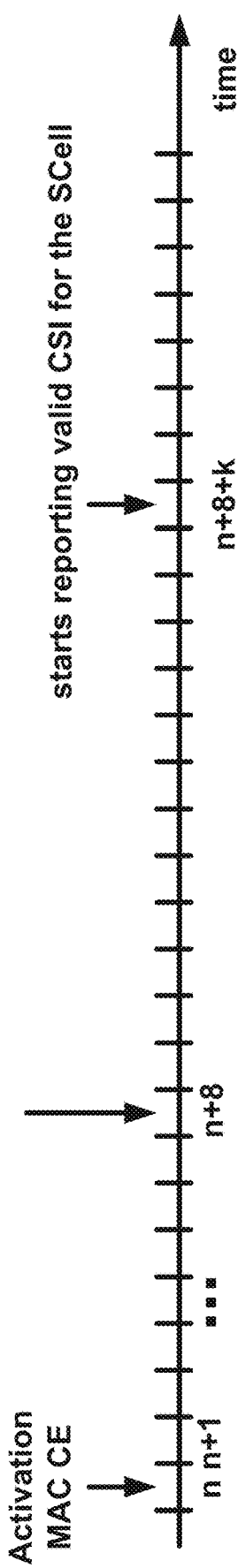
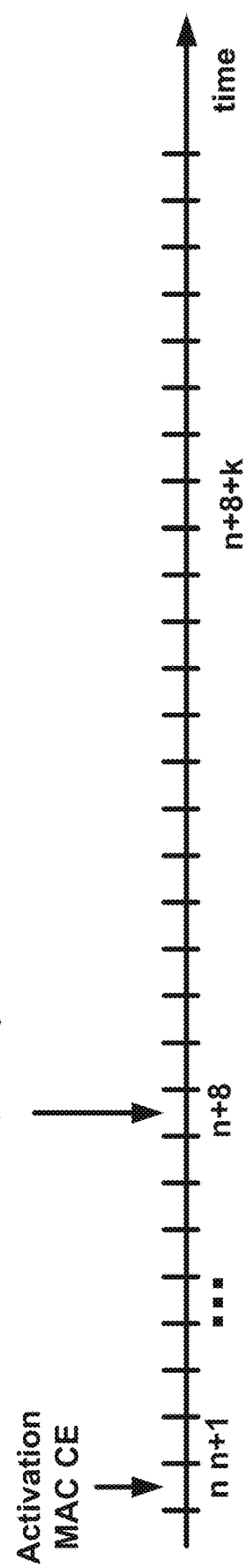
FIG. 22A
FIG. 22B

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
| Special | 3, 3A | 45 | Power control commands |
|  | 5 |  | Sidelink operation |
|  | 6-2 |  | Paging/direct indication for eMTC devices |

FIG. 23

| PUCCH resource indicator | PUCCH resource |
|---|---|
| '000' | 1st PUCCH resource identified by PUCCH resource identifier obtained from the 1st value of PUCCH resource list |
| '001' | 2nd PUCCH resource identified by PUCCH resource identifier obtained from the 2nd value of PUCCH resource list |
| '010' | 3rd PUCCH resource identified by PUCCH resource identifier obtained from the 3rd value of PUCCH resource list |
| '011' | 4th PUCCH resource identified by PUCCH resource identifier obtained from the 4th value of PUCCH resource list |
| '100' | 5th PUCCH resource identified by PUCCH resource identifier obtained from the 5th value of PUCCH resource list |
| '101' | 6th PUCCH resource identified by PUCCH resource identifier obtained from the 6th value of PUCCH resource list |
| '110' | 7th PUCCH resource identified by PUCCH resource identifier obtained from the 7th value of PUCCH resource list |
| '111' | 8th PUCCH resource identified by PUCCH resource identifier obtained from the 8th value of PUCCH resource list |

FIG. 26

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

FIG. 29

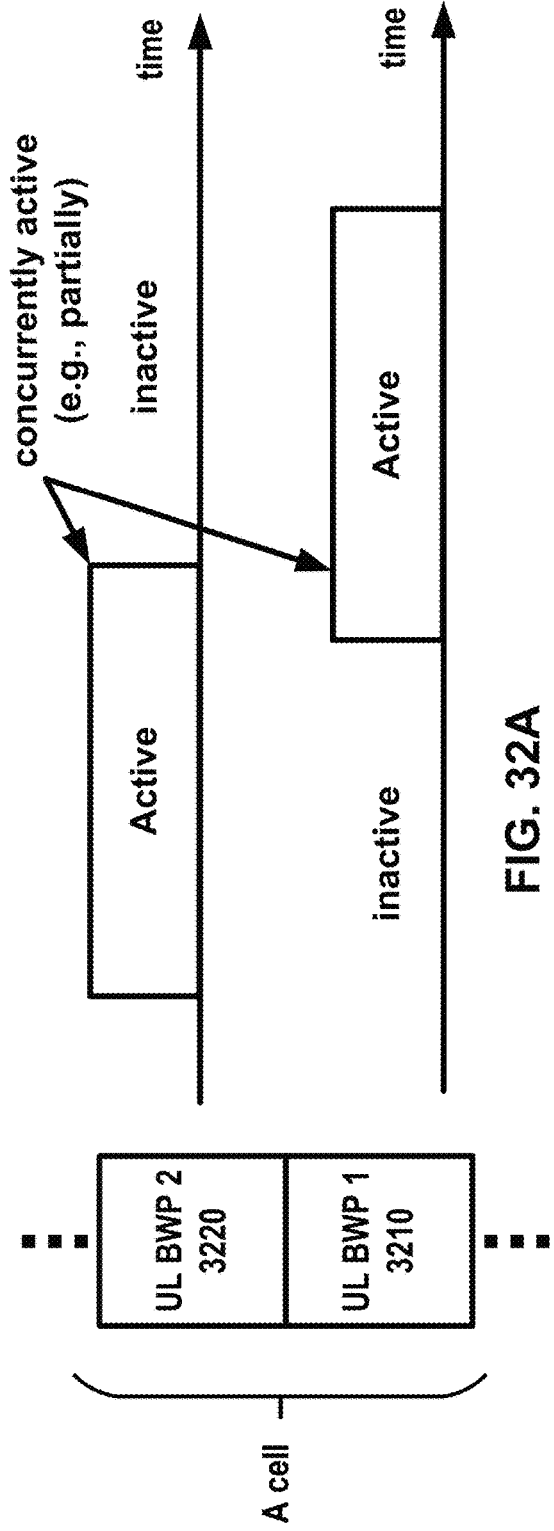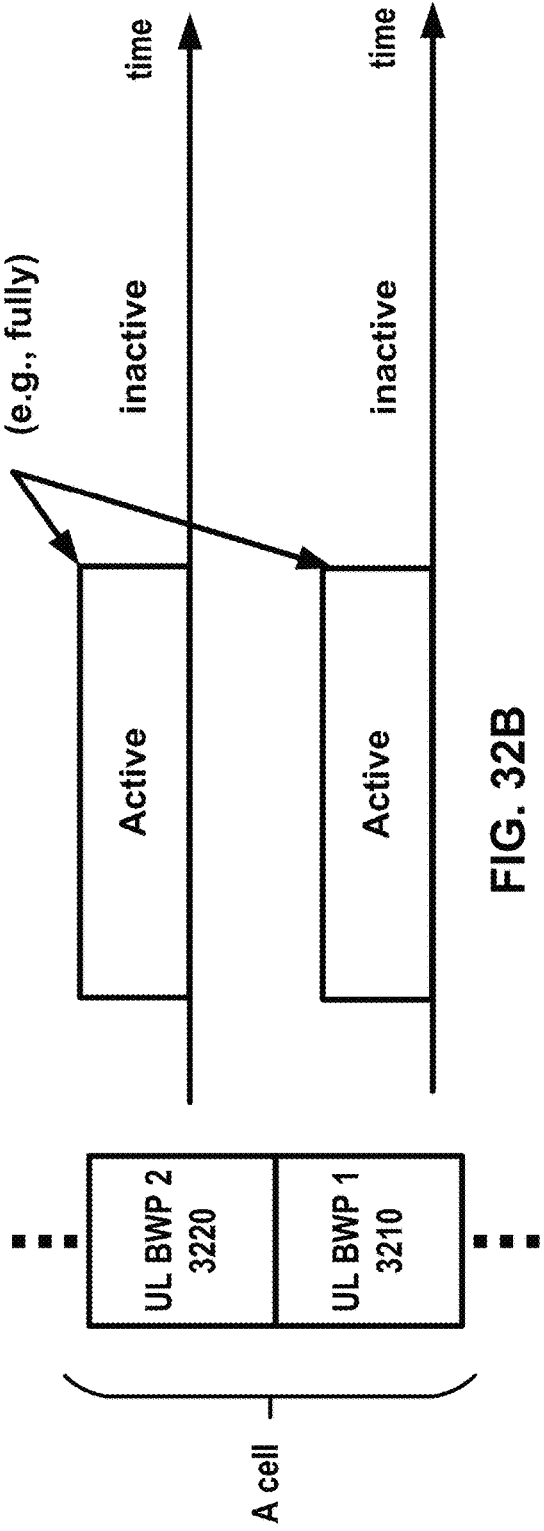
FIG. 32A
FIG. 32B

UPLINK TRANSMISSIONS USING MULTIPLE ACTIVE RESOURCES

CROSS-REFERENCE TO RELATED APPLICATIONS

This application is a continuation of U.S. application Ser. No. 16/671,691, filed Nov. 1, 2019, which claims the benefit of U.S. Provisional Application No. 62/754,259, titled "Transmission of Uplink Channels and Uplink Signals" and filed on Nov. 1, 2018, the disclosures of which are hereby incorporated by reference in their entirety.

BACKGROUND

A plurality of uplink (UL) wireless resources (e.g., bandwidth parts (BWPs)) may be active in a cell. A wireless device may not be able to determine which active uplink resource (e.g., BWP) is used for a transmission (e.g., a hybrid automatic repeat request (HARQ) transmission). The base station may not detect the transmission (e.g., HARQ acknowledgement (HARQ ACK)) transmitted by the wireless device, for example, if the base station monitors an uplink active resource (e.g., BWP) that is different from the uplink active resource (e.g., BWP) that the wireless device selects for the transmission (e.g., HARQ ACK transmission). This detection failure may result in misalignment between the base station and the wireless device. Additionally, a wireless device may not transmit information (e.g., HARQ ACK information), for example, if the wireless device fails a listen-before-talk procedure on an active uplink resource (e.g., BWP). The active uplink resource (e.g., BWP) may be one of a plurality of uplink resources (e.g., BWPs) active in a cell operating an unlicensed frequency band. By not transmitting the acknowledgement information (e.g., HARQ ACK information), transmission latency may be increased and/or system throughput may be reduced.

SUMMARY

The following summary presents a simplified summary of certain features. The summary is not an extensive overview and is not intended to identify key or critical elements.

Systems, apparatuses, and methods are described for transmitting acknowledgement information (e.g., HARQ ACK information) if a plurality of UL resources (e.g., BWPs) are active in a cell. A base station may transmit downlink control information (DCI) in a format that may include a downlink resource indicator, an uplink resource indicator, a resource allocation, and/or a resource allocation for acknowledgement transmission. The wireless device may select an uplink active resource for the acknowledgement transmission, for example, based on, or in response to, the uplink resource indicator received in the DCI. The base station may dynamically indicate an uplink active resource for acknowledgement transmission. The wireless device may select an active uplink resource on which a listen-before-talk (LBT) procedure indicates a clear channel. The wireless device may transmit acknowledgement information via a resource allocation of the selected uplink active resource.

The base station may transmit a resource hopping indicator (e.g., BWP hopping indicator). The resource hopping indicator may indicate whether the wireless device is allowed (e.g., permitted) to switch between two active uplink resources of a cell for transmissions. The wireless device may transmit a first quantity of transmissions on a first active uplink resource, for example, based on or in response to receiving the resource hopping indicator. The wireless device may then transmit a second quantity of transmissions on a second active uplink resource, for example, based on or in response to receiving the resource hopping indicator. By using a resource hopping indicator, the transmission quality may be improved, for example, when multiple uplink resources are active in a cell.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 13A and FIG. 13B show examples for gNodeB (gNB) deployment.

FIGS. 20A and 20B show an examples of a beam failure.

FIGS. 21A and 21B show examples of a secondary activation/deactivation medium access control control element (MAC CE).

FIGS. 22A and 22B shows examples of timing diagrams for a CSI report when activating a secondary cell.

FIG. 23 shows an example of downlink control information (DCI) formats.

FIG. 26 shows an example of PUCCH resource configuration and indication.

FIG. 29 shows an example of channel access priority class configurations.

FIGS. 32A and 32B show examples of multiple concurrent active BWPs.

DETAILED DESCRIPTION

Figure 1:
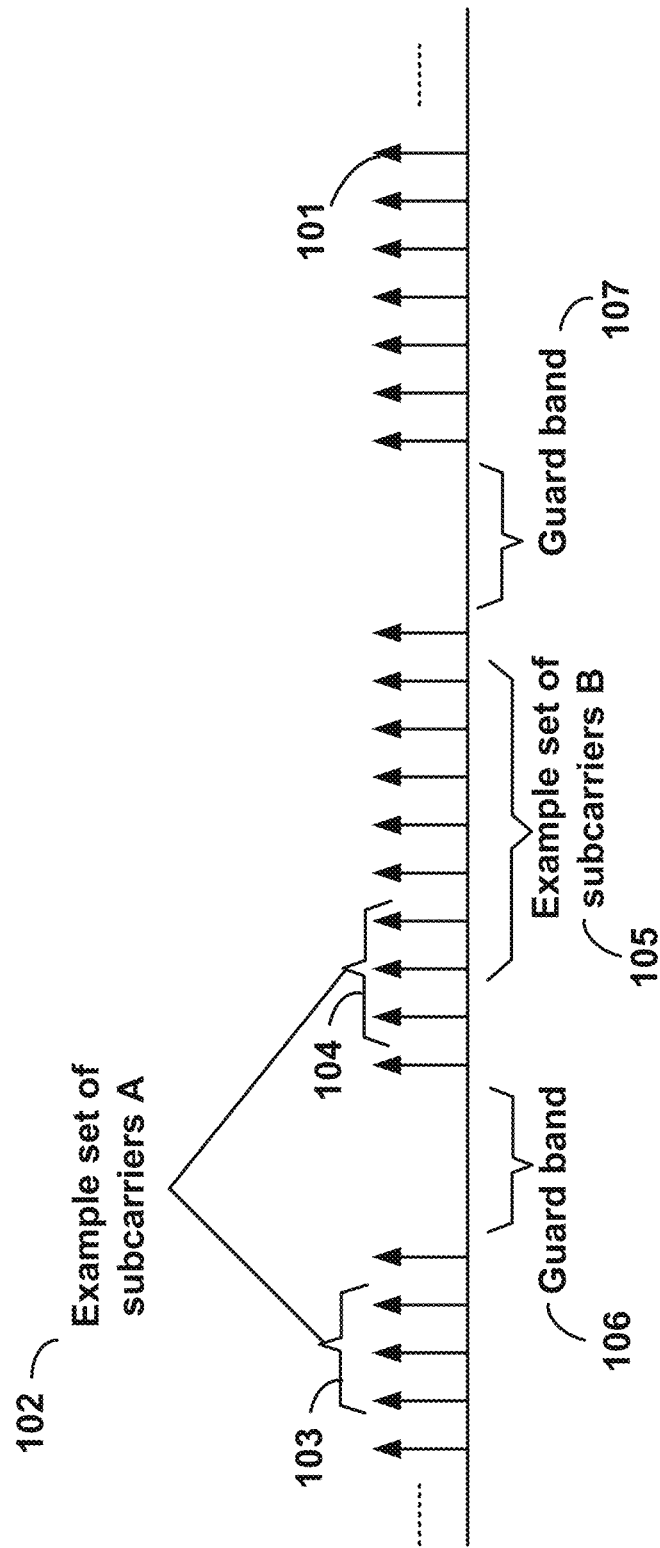
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to beam management procedures with a discontinuous reception configuration in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, 1024-QAM and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the quantity (e.g., number) of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
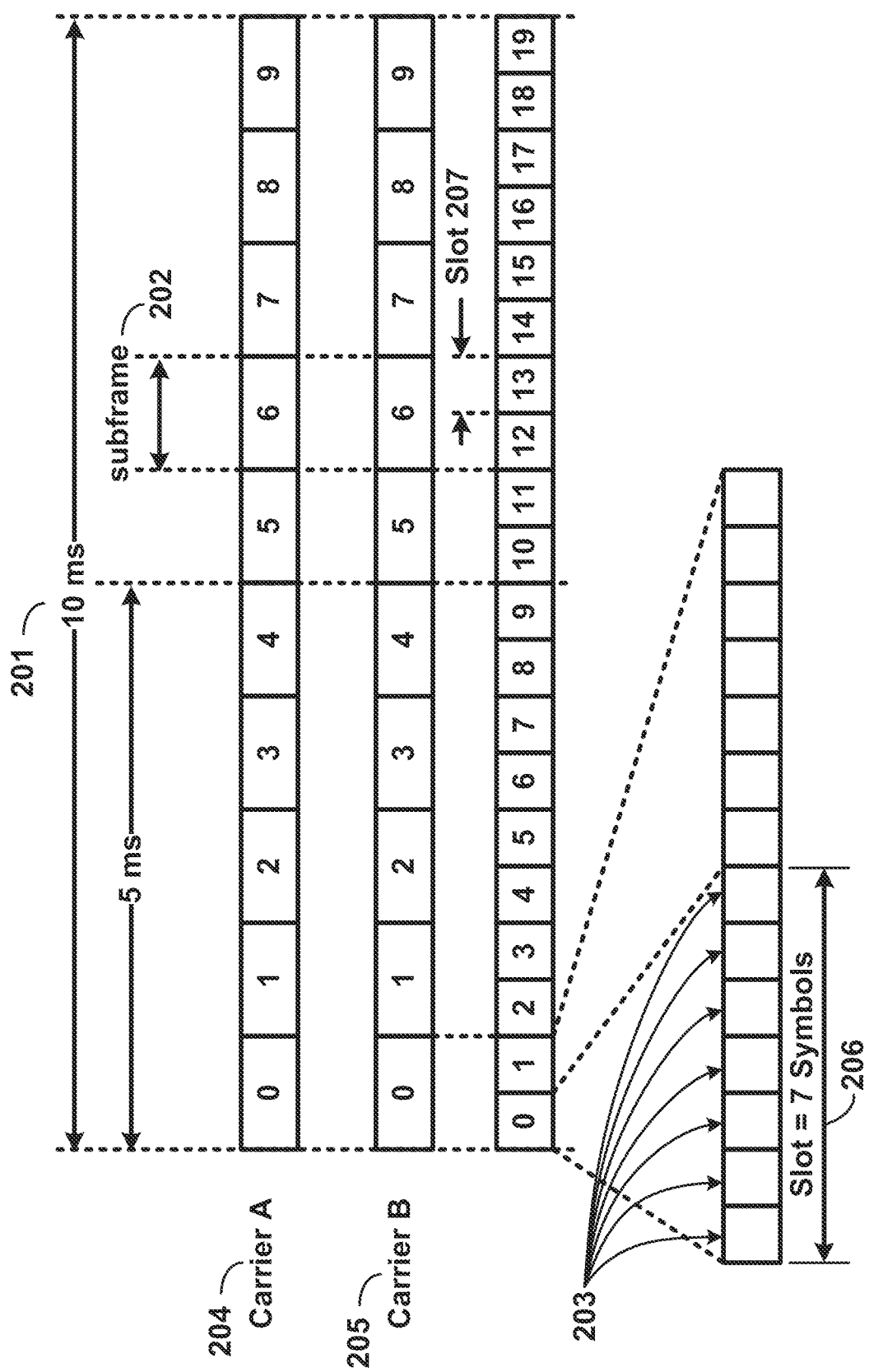
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The quantity (e.g., number) of OFDM symbols 203 in a slot 206 may depend on the cyclic prefix length and subcarrier spacing.

Figure 3:
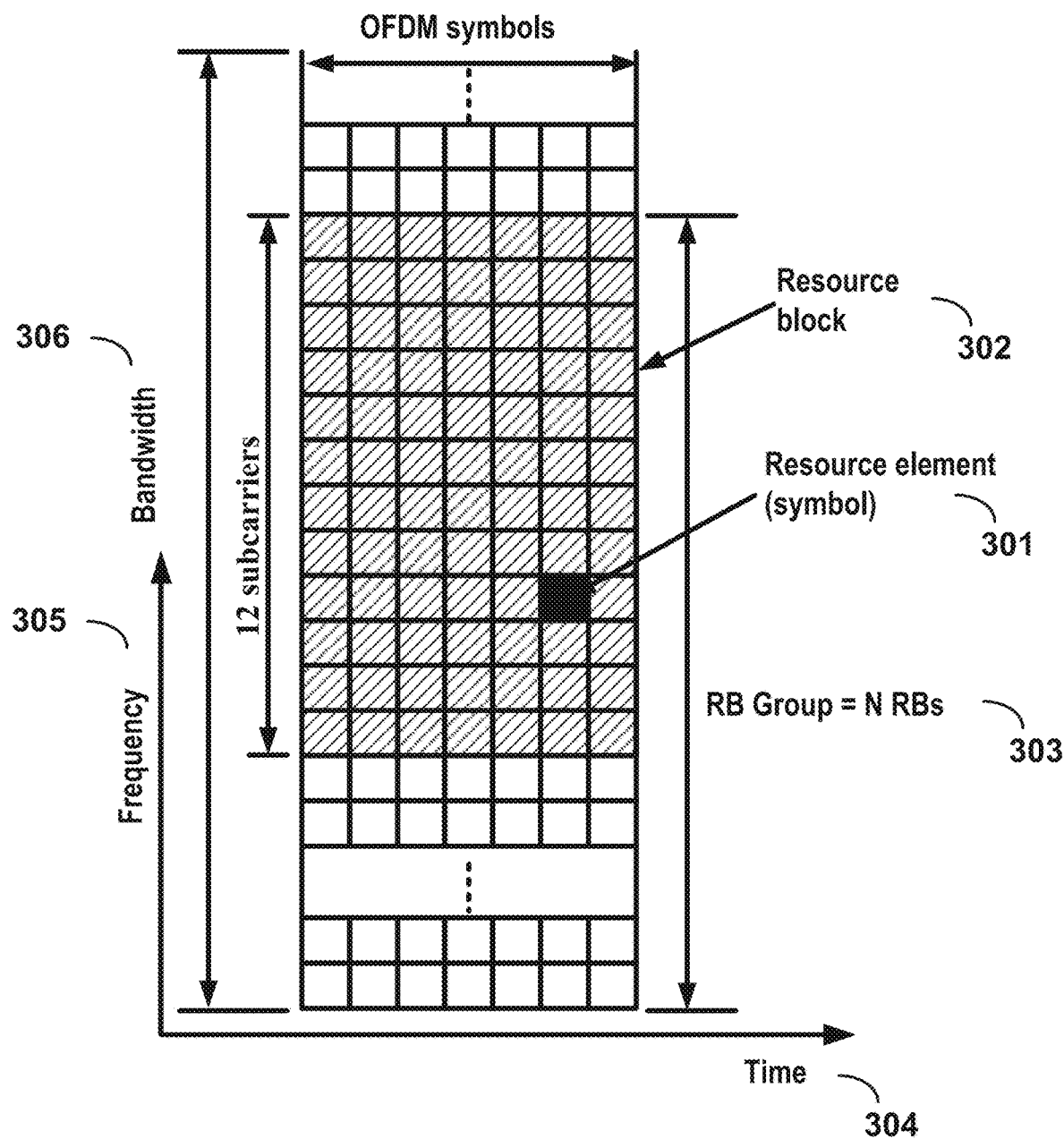
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
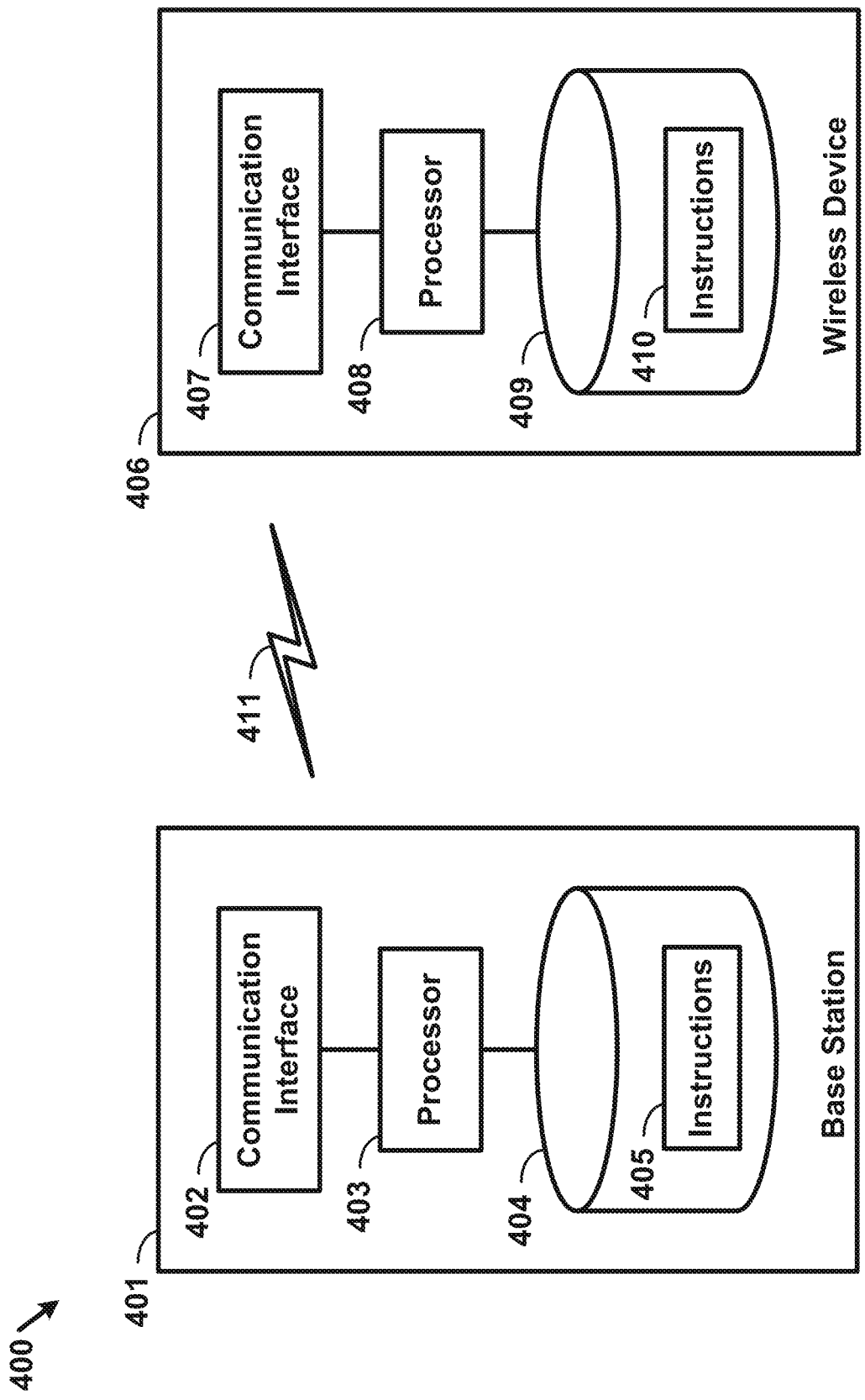
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay devices (e.g., nodes), and/or the like. Examples for radio technology implemented in the communication interfaces 402, 407 and the wireless link 411 are shown in FIG. 1, FIG. 2, FIG. 3, FIG. 5, and associated text. The communication network 400 may comprise any quantity (e.g., number) and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a device (e.g., a node), a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as WO, may be split, by a signal splitter 510, into real and imaginary components, $\text{Re}\{s_1(t)\}$ and $\text{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 535 configured to perform precoding of the complex-valued modulation symbols on each layer for transmission on the antenna ports; one or more resource element mappers 536A and 536B configured to perform mapping of complex-valued modulation symbols for each antenna port to resource elements; one or more OFDM signal generators 537A and 537B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $\text{Re}\{s_1^{(p)}(t)\}$ and $\text{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
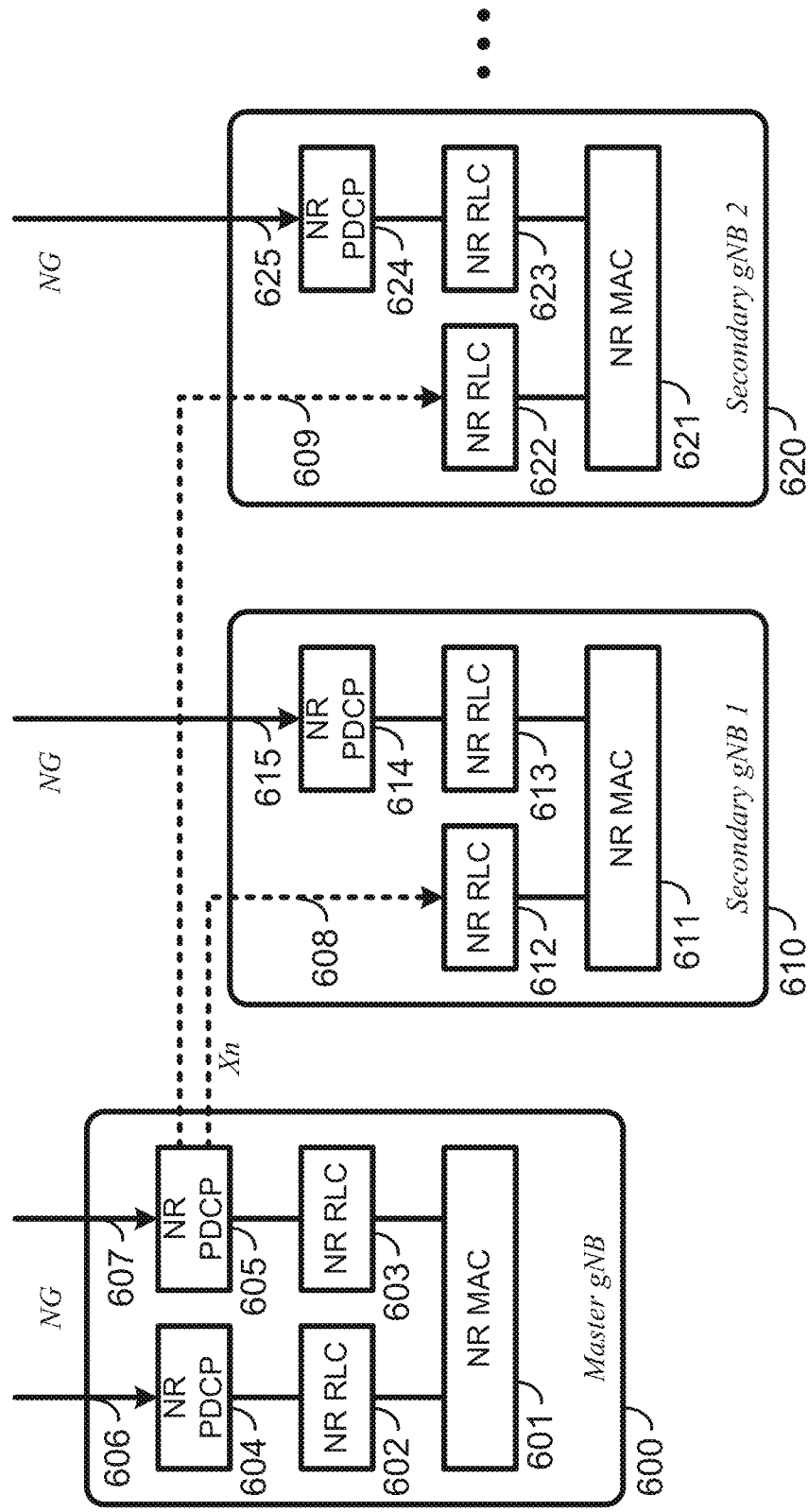
FIG. 6 shows an example protocol structure with multi-connectivity.
Figure 7:
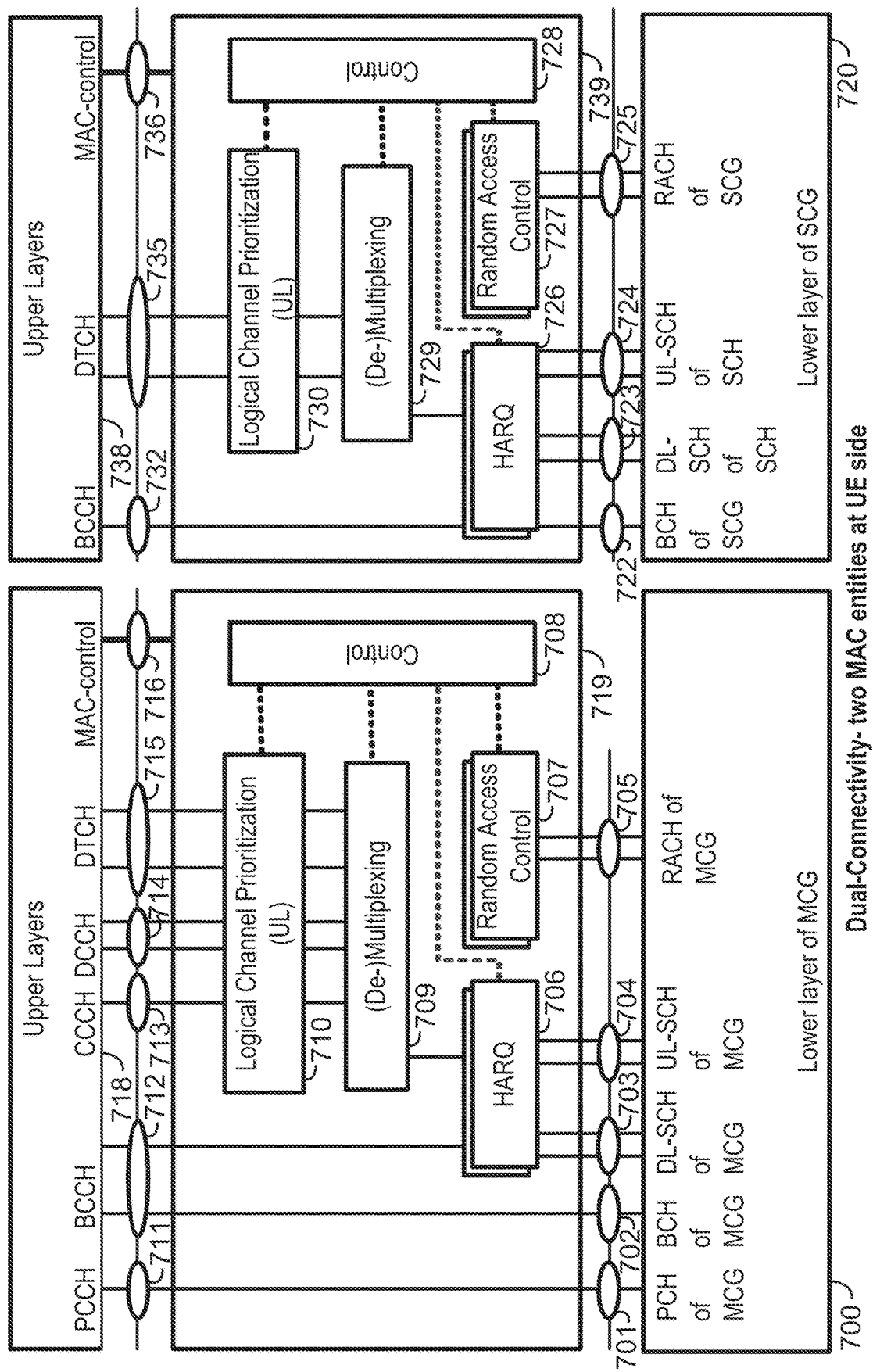
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 620 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum quantity (e.g., number) of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
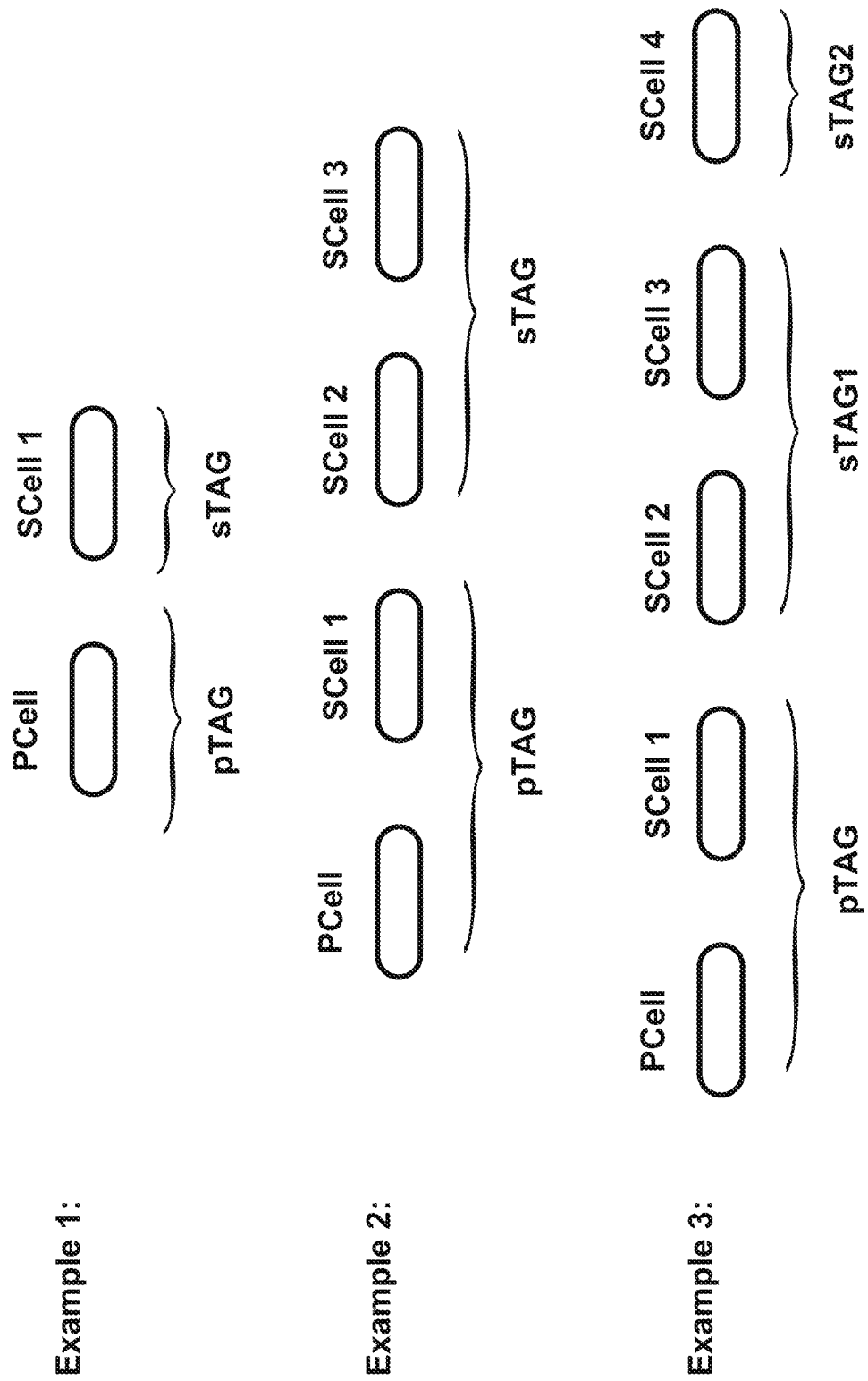
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
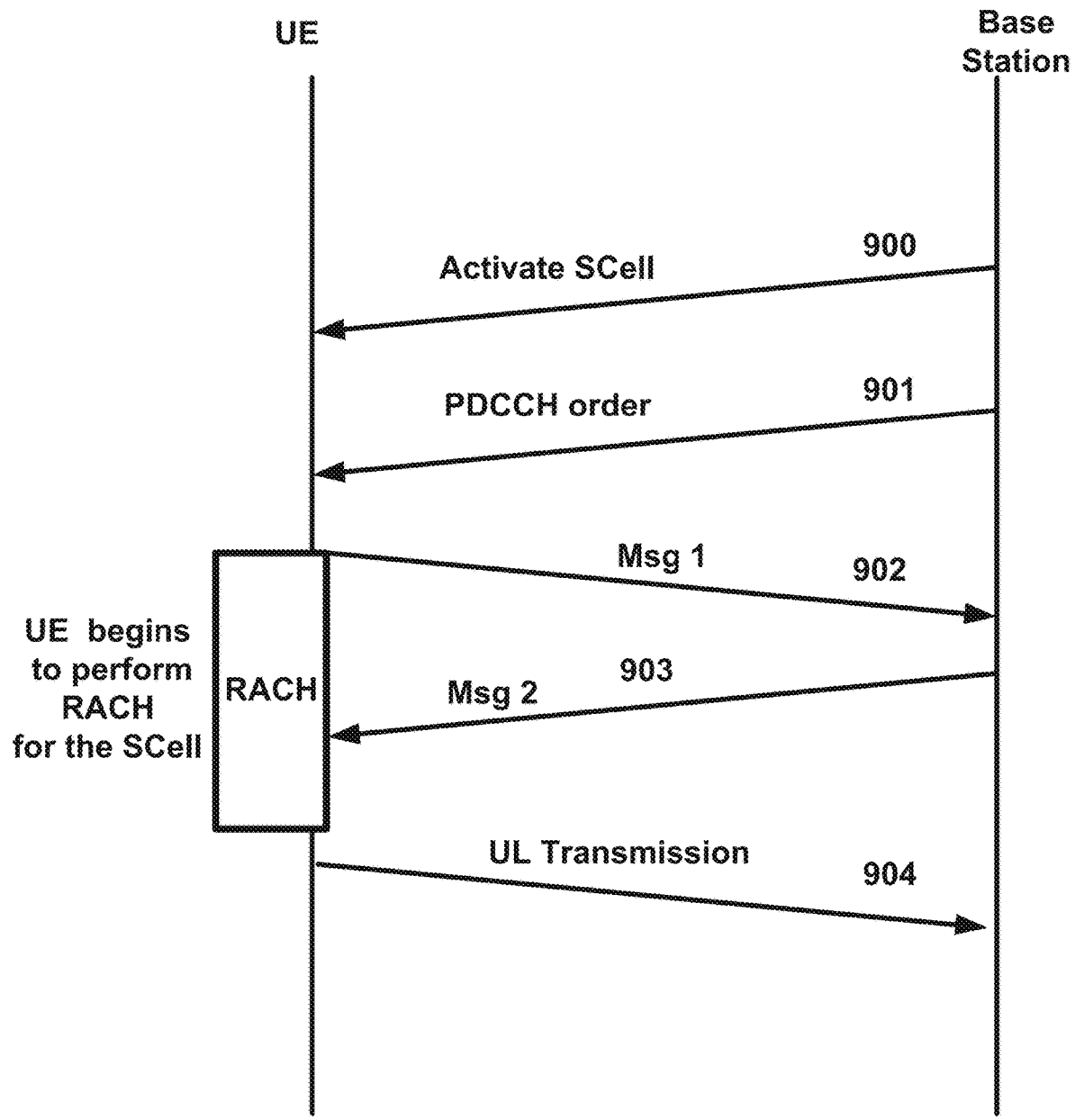
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDCCH order 901 to the wireless device, which may be transmitted, for example, after the activation command 900. The wireless device may begin to perform a RACH process for the SCell, which may be initiated, for example, after receiving the PDCCH order 901. A wireless device may transmit to the base station (e.g., as part of a RACH process) a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command $N_{TA}$ (amount of timing advance) within a random access response window. The start of the random access preamble may be aligned with the start of a corresponding uplink subframe at the wireless device assuming $N_{TA}=0$. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the quantity (e.g., number) of CA capable wireless devices increase, and as the quantity (e.g., number) of aggregated carriers increase, the quantity (e.g., number) of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally, or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

Figures 11A, 11B:
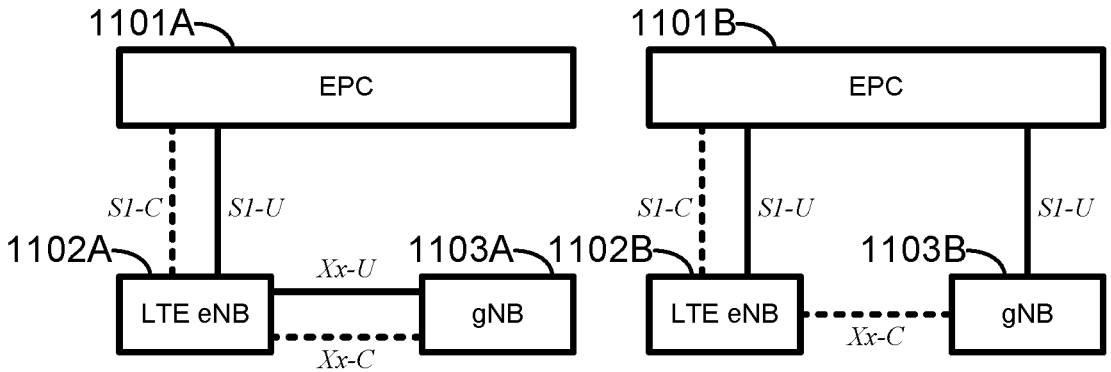
FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 11A shows LTE eNB connected to EPC with non-standalone gNB. FIG. 11A also shows gNB user plane connected to EPC via LTE eNB. FIG. 11B shows LTE eNB connected to EPC with non-standalone gNB. FIG. 11B also shows gNB user plane connected to EPC directly. A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

Figures 11C, 11D:
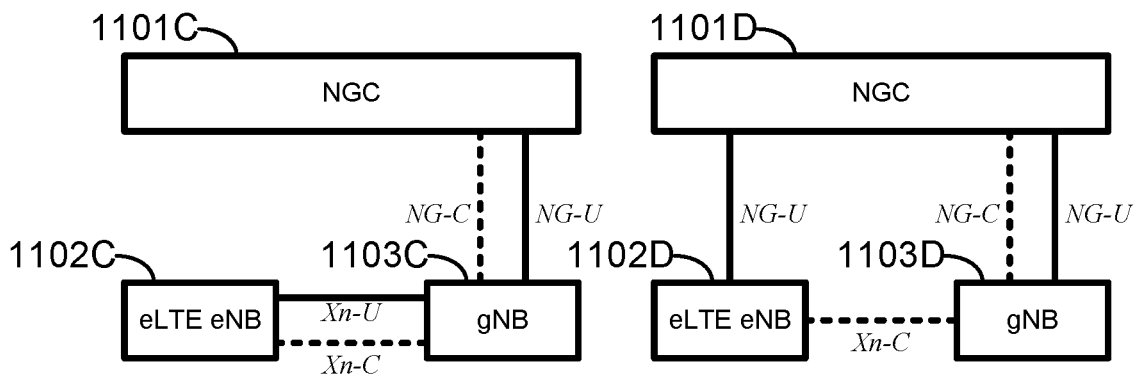

FIG. 11C shows gNB connected to NGC with non-standalone eLTE eNB. FIG. 11C shows eLTE eNB user plane connected to NGC via gNB. FIG. 11D shows gNB connected to NGC with non-standalone eLTE eNB. FIG. 11D also shows eLTE eNB user plane connected to NGC directly. A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

Figures 11E, 11F:
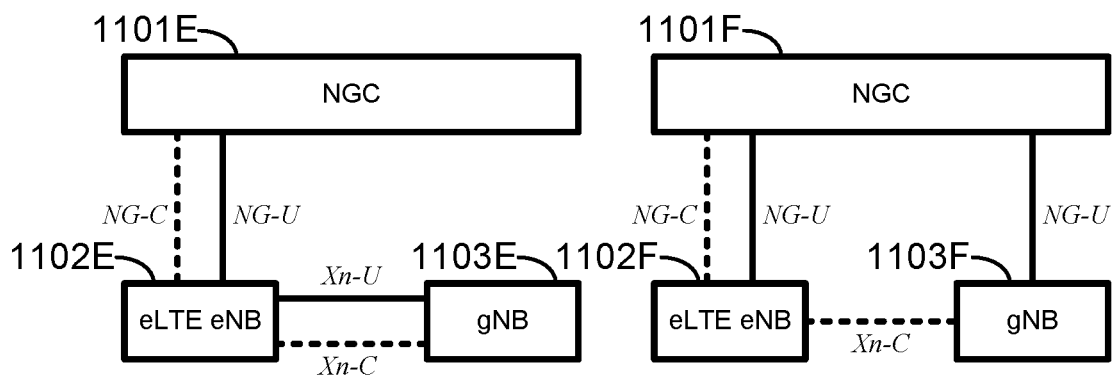

FIG. 11E shows eLTE eNB connected to NGC with non-standalone gNB. FIG. 11E also shows gNB user plane connected to NGC via eLTE eNB. FIG. 11F shows eLTE eNB connected to NGC with non-standalone gNB. FIG. 11F also shows gNB user plane connected to NGC directly. A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

Figure 12A:
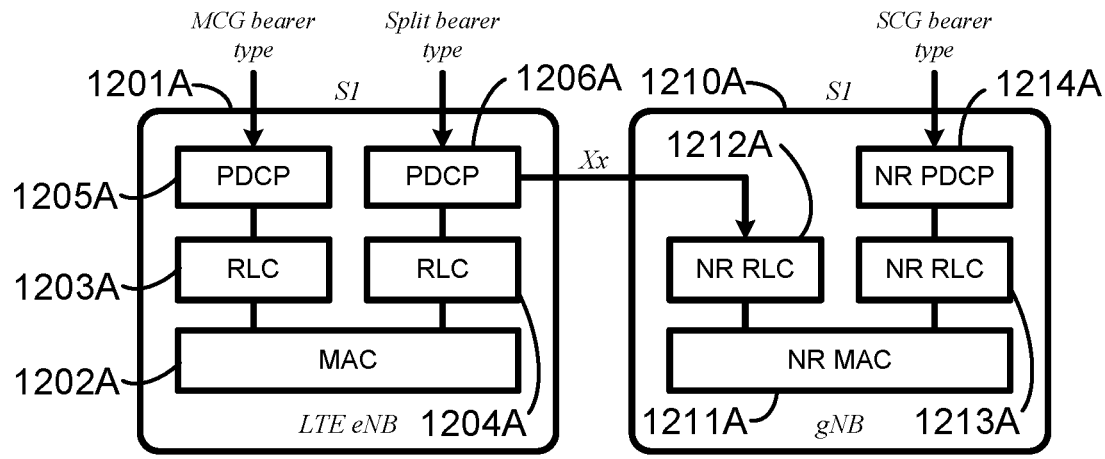
FIG. 12A, FIG. 12B, and FIG. 12C show examples for radio protocol structures of tight interworking bearers.
Figure 12B:
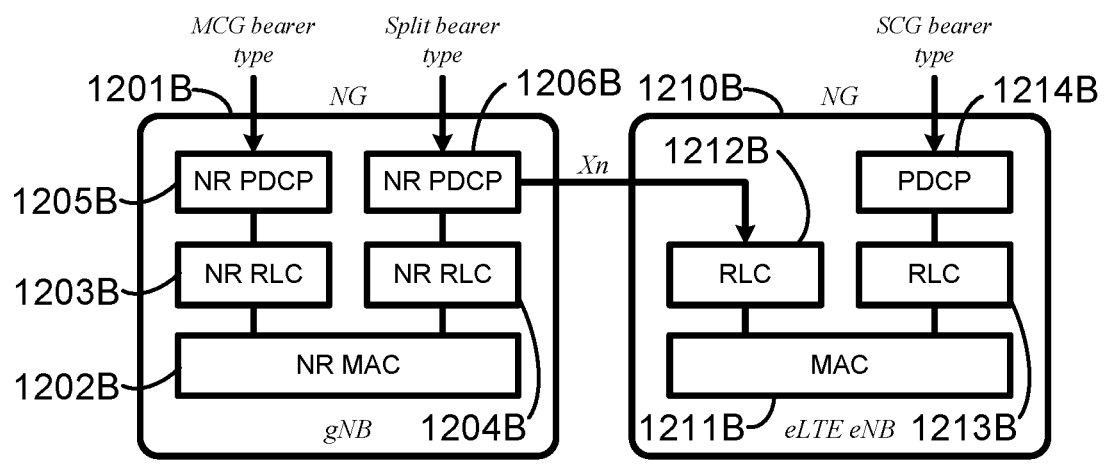
Figure 12C:
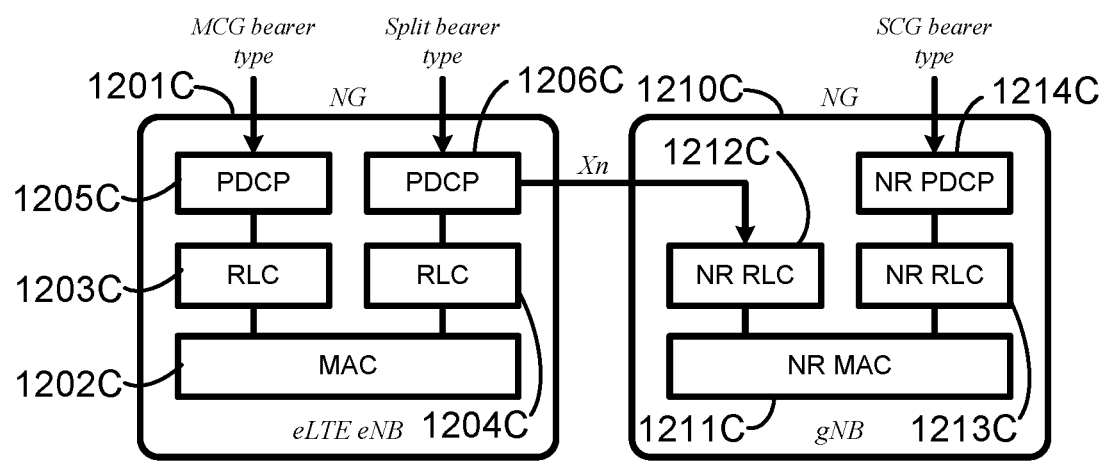

FIG. 12A, FIG. 12B, and FIG. 12C are examples for radio protocol structures of tight interworking bearers.

FIG. 12A shows radio protocol architecture for split bearer and SCG bearer. FIG. 12A also shows LTE eNB connected to EPC with non-standalone gNB. An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

FIG. 12B shows radio protocol architecture for split bearer and SCG bearer. FIG. 12B also shows gNB connected to NGC with non-standalone eLTE eNB. A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B FIG. 12C shows radio protocol architecture for split bearer and SCG bearer. FIG. 12C also shows eLTE eNB connected to NGC with non-standalone gNB. An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum quantity (e.g., number) of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 13121313, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
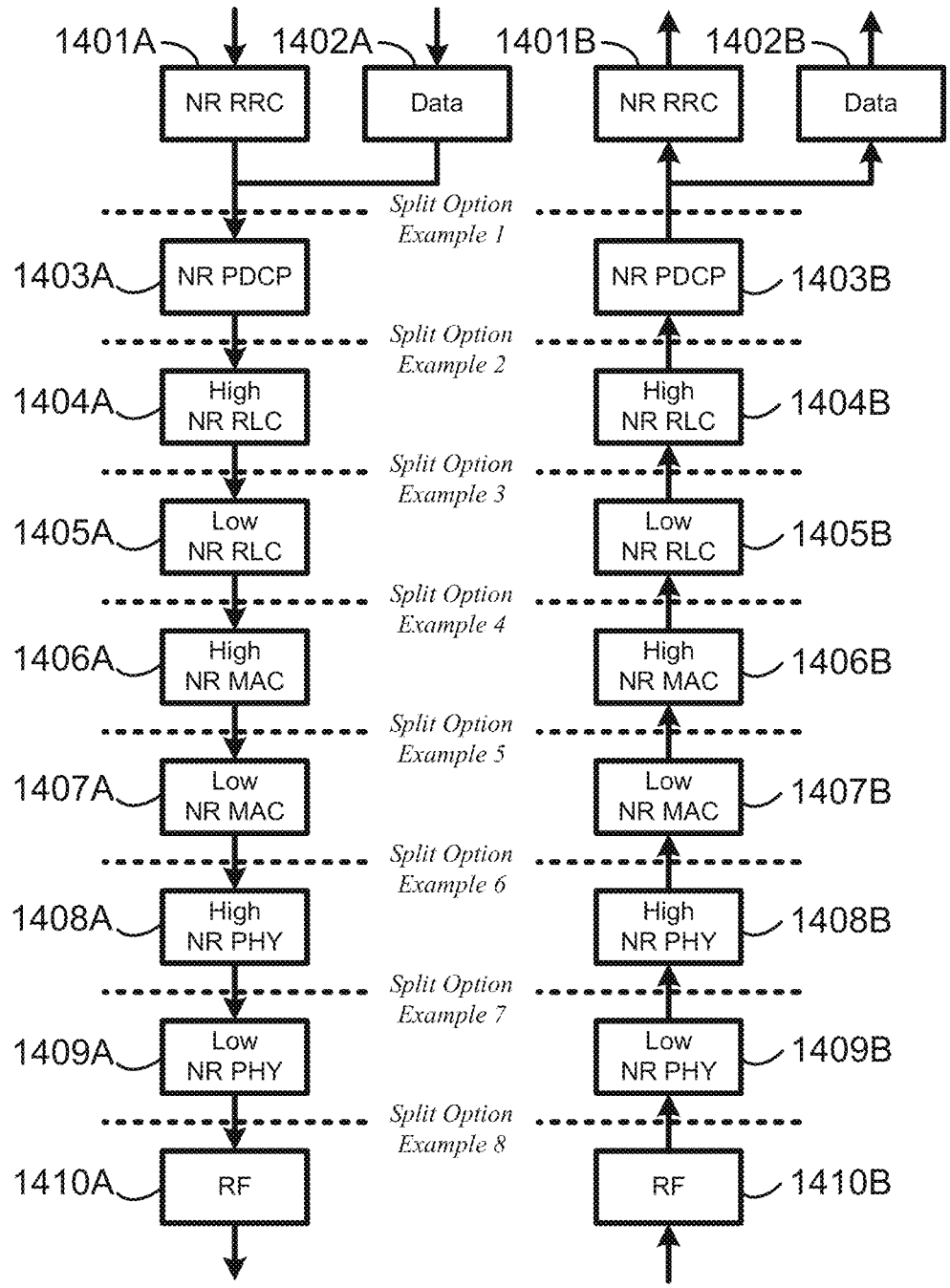
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The quantity (e.g., number) of users and/or devices is increasing and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may be performed by the transmitting entity. For example, Category 2 (e.g., LBT without random back-off)

may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from a base station (e.g., an eNB, gNB, etc.) perspective. If a base station (e.g., an eNB, gNB, etc.) is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A base station may transmit a plurality of beams to a wireless device. A serving beam may be determined, from the plurality of beams, for the wireless communications between the base station and the wireless device. One or more candidate beams may also be determined, from the plurality of beams, for providing the wireless communications if a beam failure event occurs, for example, such that the serving beam becomes unable to provide the desired communications. One or more candidate beams may be determined by a wireless device and/or by a base station. By determining and configuring a candidate beam, the wireless device and base station may continue wireless communications if the serving beam experiences a beam failure event.

Single beam and multi-beam operations may be supported, for example, in a NR (New Radio) system. In a multi-beam example, a base station (e.g., gNB) may perform a downlink beam sweep to provide coverage for downlink Synchronization Signals (SSs) and common control channels. Wireless devices may perform uplink beam sweeps for uplink direction to access a cell. For a single beam, a base station may configure time-repetition within one SS block. This time-repetition may comprise, for example, one or more of a primary synchronization signal (PSS), a secondary synchronization signal (SSS), or a physical broadcast channel (PBCH). These signals may be in a wide beam. In a multi-beam example, a base station may configure one or more of these signals and physical channels, such as in an SS block, in multiple beams. A wireless device may identify, for example, from an SS block, an OFDM symbol index, a slot index in a radio frame, and a radio frame number from an SS block.

Figure 15:
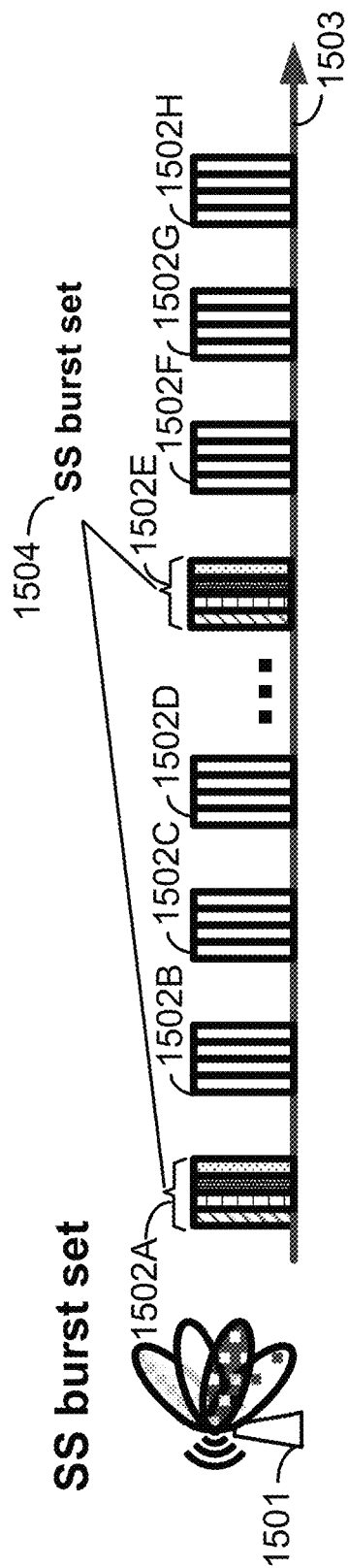
FIG. 15 shows an example of configuration of a synchronization signal burst set.

In an RRC_INACTIVE state or in an RRC_IDLE state, a wireless device may assume that SS blocks form an SS burst and an SS burst set. An SS burst set may have a given periodicity. SS blocks may be transmitted together in multiple beams (e.g., in multiple beam examples) to form an SS burst. One or more SS blocks may be transmitted via one beam. A beam may have a steering direction. If multiple SS bursts transmit beams, these SS bursts together may form an SS burst set, such as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any quantity (e.g., number) of a plurality of SS bursts 1502A to 1502H. Each SS burst within an SS burst set may be transmitted at a fixed or variable periodicity during time periods 1503.

In a multi-beam example, one or more of PSS, SSS, or PBCH signals may be repeated for a cell, for example, to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise system information block type 2 (SIB2). SIB2 may carry a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier that may be associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

Figure 16:
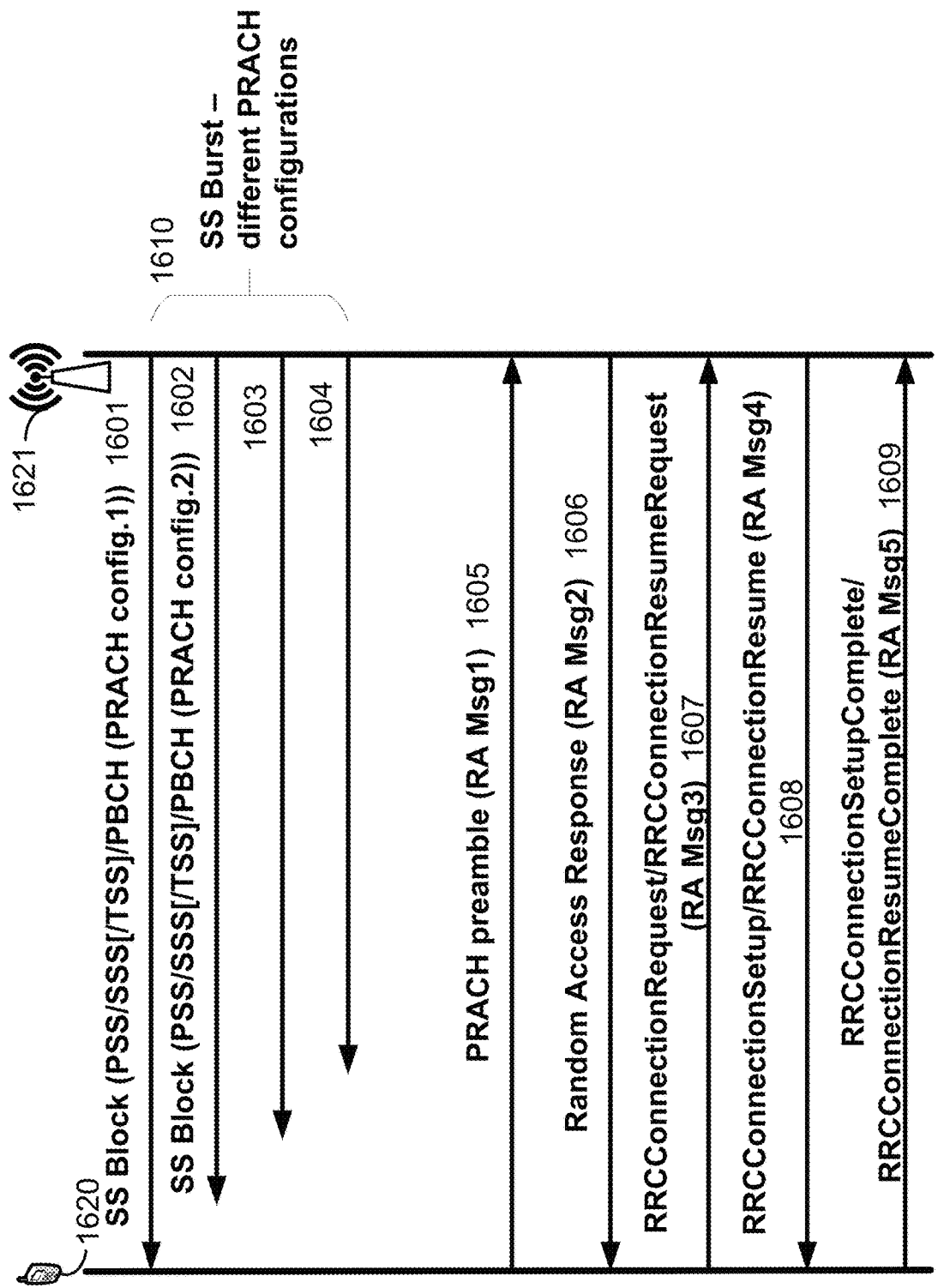
FIG. 16 shows an example of a random access procedure.

FIG. 16 shows an example of a random access procedure (e.g., via a RACH) that may include sending, by a base station, one or more SS blocks. A wireless device 1620 (e.g., a UE) may transmit one or more preambles to a base station 1621 (e.g., a gNB in NR). Each preamble transmission by the wireless device may be associated with a separate random access procedure, such as shown in FIG. 16. The random access procedure may begin at step 1601 with a base station 1621 (e.g., a gNB in NR) sending a first SS block to a wireless device 1620 (e.g., a UE). Any of the SS blocks may comprise one or more of a PSS, SSS, tertiary synchronization signal (TSS), or PBCH signal. The first SS block in step 1601 may be associated with a first PRACH configuration. At step 1602, the base station 1621 may send to the wireless device 1620 a second SS block that may be associated with a second PRACH configuration. At step 1603, the base station 1621 may send to the wireless device 1620 a third SS block that may be associated with a third PRACH configuration. At step 1604, the base station 1621 may send to the wireless device 1620 a fourth SS block that may be associated with a fourth PRACH configuration. Any quantity (e.g., number) of SS blocks may be sent in the same manner in addition to, or replacing, steps 1603 and 1604. An SS burst may comprise any quantity (e.g., number) of SS blocks. For example, SS burst 1610 comprises the three SS blocks sent during steps 1602-1604.

The wireless device 1620 may send to the base station 1621 a preamble, at step 1605, for example, after or in response to receiving one or more SS blocks or SS bursts. The preamble may comprise a PRACH preamble, and may be referred to as RA Msg 1. The PRACH preamble may be transmitted in step 1605 according to or based on a PRACH configuration that may be received in an SS block (e.g., one of the SS blocks from steps 1601-1604) that may be determined to be the best SS block beam. The wireless device 1620 may determine a best SS block beam from among SS blocks it may receive prior to sending the PRACH preamble. The base station 1621 may send a random access response (RAR), which may be referred to as RA Msg2, at step 1606, for example, after or in response to receiving the PRACH preamble. The RAR may be transmitted in step 1606 via a DL beam that corresponds to the SS block beam associated with the PRACH configuration. The base station 1621 may determine the best SS block beam from among SS blocks it previously sent prior to receiving the PRACH preamble. The base station 1621 may receive the PRACH preamble according to or based on the PRACH configuration associated with the best SS block beam.

The wireless device 1620 may send to the base station 1621 an RRCConnectionRequest and/or RRCConnectionResumeRequest message, which may be referred to as RA Msg3, at step 1607, for example, after or in response to receiving the RAR. The base station 1621 may send to the wireless device 1620 an RRCConnectionSetup and/or RRCConnectionResume message, which may be referred to as RA Msg4, at step 1608, for example, after or in response to receiving the RRCConnectionRequest and/or RRCConnectionResumeRequest message. The wireless device 1620 may send to the base station 1621 an RRCConnectionSetupComplete and/or RRCConnectionResumeComplete message, which may be referred to as RA Msg5, at step 1609, for example, after or in response to receiving the RRCConnectionSetup and/or RRCConnectionResume. An RRC connection may be established between the wireless device 1620 and the base station 1621, and the random access procedure may end, for example, after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, for example, via common RRC signaling. Additionally, or alternatively, a CSI-RS resource may be configured in a wireless device-specific way, for example, via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, for example, cell-specific, device-specific, periodic, aperiodic, multi-shot, or other terms. Different purposes may include, for example, beam management, CQI reporting, or other purposes.

Figure 17:
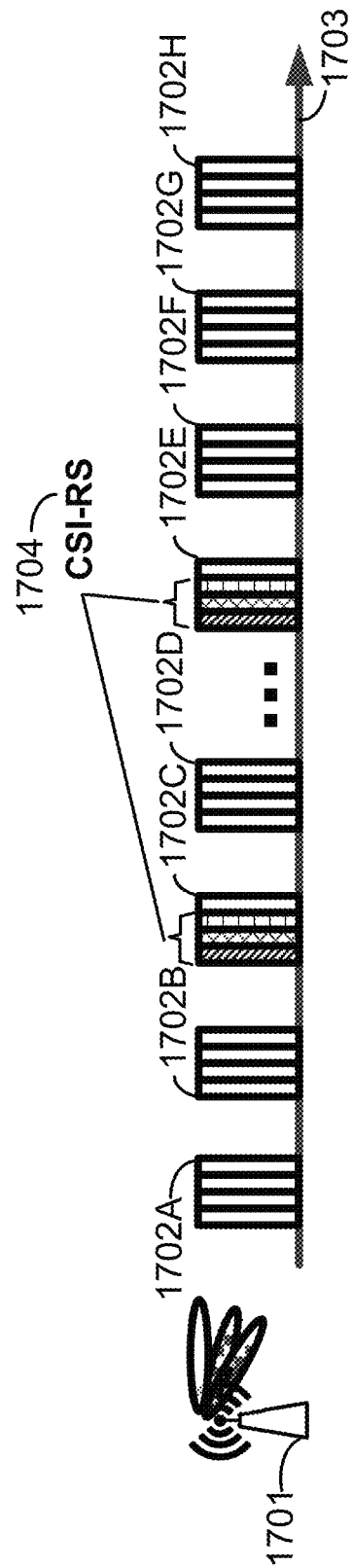
FIG. 17 shows an example of transmitting channel state information reference signals for a beam.

FIG. 17 shows an example of transmitting CSI-RSs periodically for a beam. A base station 1701 may transmit a beam in a predefined order in the time domain, such as during time periods 1703. Beams used for a CSI-RS transmission, such as for CSI-RS 1704 in transmissions 1702C and/or 1703E, may have a different beam width relative to a beam width for SS-blocks transmission, such as for SS blocks 1702A, 1702B, 1702D, and 1702F-1702H. Additionally, or alternatively, a beam width of a beam used for a CSI-RS transmission may have the same value as a beam width for an SS block. Some or all of one or more CSI-RSs may be included in one or more beams. An SS block may occupy a quantity (e.g., number) of OFDM symbols (e.g., 4), and a quantity (e.g., number) of subcarriers (e.g., 240), carrying a synchronization sequence signal. The synchronization sequence signal may identify a cell.

Figure 18:
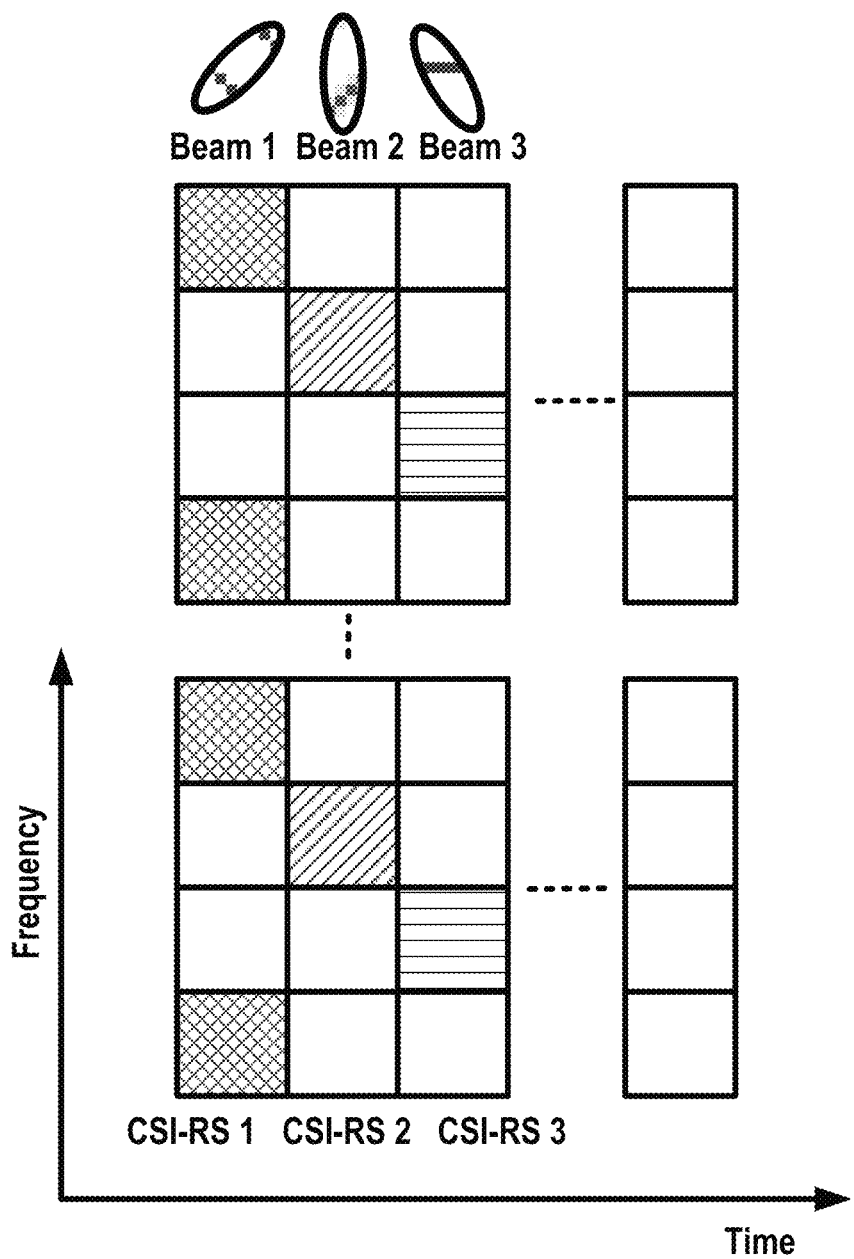
FIG. 18 shows an example of channel state information reference signal mapping.

FIG. 18 shows an example of a CSI-RS that may be mapped in time and frequency domains. Each square shown in FIG. 18 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RSsubframe configuration (e.g., subframe location, offset, and periodicity in a radio frame), CSI-RS power parameter, CSI-RSsequence parameter, code division multiplexing (CDM) type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

CSI-RS may be configured using common parameters, for example, when a plurality of wireless devices receives the same CSI-RSsignal. CSI-RS may be configured using wireless device dedicated parameters, for example, when a CSI-RS is configured for a specific wireless device. CSI-RSs may be included in RRC signaling. A wireless device may be configured, for example, depending on different MIMO beamforming types (e.g., CLASS A or CLASS B), with one or more CSI-RS resource configurations per each CSI process.

CSI-RS resources may be activated or deactivated (e.g., for some types of MIMO beamforming) by using MAC signaling. A device (e.g., a base station) communicating in a network may activate and/or deactivate configured CSI-RS resources of a serving cell by sending an activation/deactivation CSI-RS resources MAC control element. The configured CSI-RS resources may be initially deactivated, for example, during configuration and/or after a handover.

The activation/deactivation CSI-RS resources MAC control element may be identified by a MAC subheader with LCID. The activation/deactivation CSI-RS resources MAC control element may have a variable size that may be based on the quantity (e.g., number) of CSI processes configured with CSI-RS-NZP-Activation by RRC (N). The N number of octets each of which may comprise a number of A fields (e.g., A1 to Ai, described below), may be included in ascending order of a CSI process ID, such as the CSI-ProcessId.

An activation/deactivation CSI-RS command may activate and/or deactivate CSI-RS resources for a CSI process. For example, for a wireless device that is configured with transmission mode 9, N equals 1. Transmission mode 9 may be a transmission mode in which a base station may transmit data packets with up to 8 layers, for example, if configured with multiple antennas. A wireless device may receive the data packets based on multiple DMRSs (e.g., up to 8 DMRSs (or DMRS ports)). The activation/deactivation CSI-RS resources MAC control element may apply to the serving cell on which the wireless device may receive the activation/deactivation of CSI-RS resources MAC control element.

Activation/deactivation CSI-RS resources MAC control elements may comprise an octet of fields, shown as fields A1 to A8, that may indicate the activation/deactivation status of the CSI-RS resources configured by upper layers for the CSI process. A1 may correspond to the first entry in a list of CSI-RS, which may be specified by CSI-RS-ConfigNZP-ApList configured by upper layers. A2 may correspond to the second entry in the list of CSI-RS, and each of A3 through A8 may correspond to the third through eighth entry, respectively, in the list of CSI-RS. The Ai field may be set to "1" to indicate that the $i^{th}$ entry in the list of CSI-RS, which may be specified by CSI-RS-ConfigNZP-ApList, shall be activated. The Ai field may be set to "0" to indicate that the $i^{th}$ entry in the list shall be deactivated. For each CSI process, the number of Ai fields (e.g., i=1, 2, . . . , 8) which are set to "1" may be equal to the value of a higher-layer parameter, such as activatedResources.

A wireless device may be triggered with aperiodic CSI reporting, for example, after receiving a RRC for CSI-RS configuration and a MAC layer signaling for CSI-RS activation. The aperiodic CSI reporting may be associated with the CSI-RS resources indicated in a DCI, for example, with DCI format 0C. A CSI request field in DCI format 0C may indicate for which CSI process and/or CSI-RS resource the CSI reporting is configured.

FIG. 18 shows three beams that may be configured for a wireless device, for example, in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally, or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, for example, one or more beam identifications, RSRP, PMI, CQI, and/or RI, of a subset of configured beams.

A base station and/or a wireless device may perform a downlink L1/L2 beam management procedure. One or more downlink L1/L2 beam management procedures may be performed within one or multiple transmission and receiving points (TRPs), such as shown in FIG. 20A and FIG. 20B, respectively.

Figure 19:
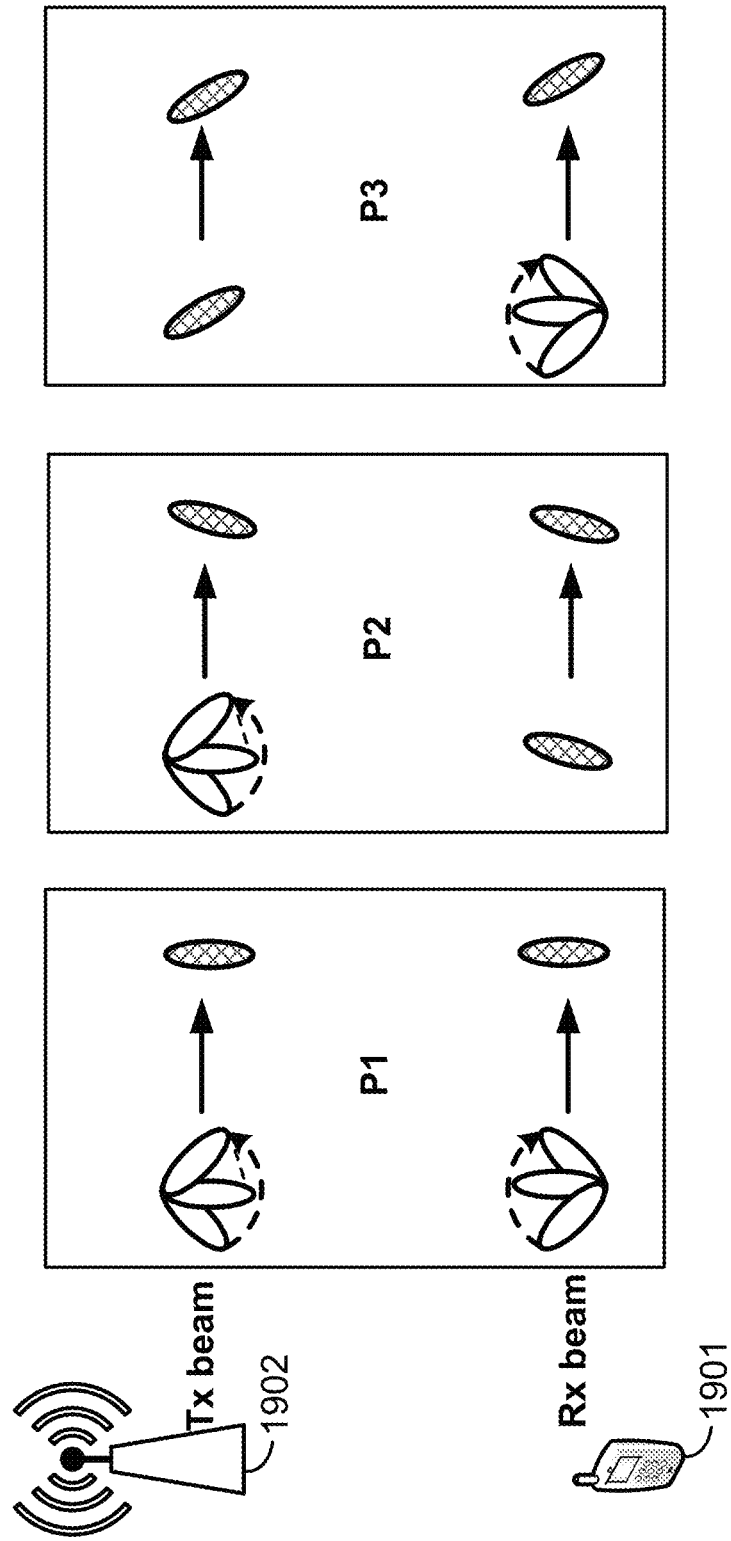
FIG. 19 shows an example for downlink beam management.

FIG. 19 shows examples of three beam management procedures, P1, P2, and P3. Procedure P1 may be used to enable a wireless device measurement on different transmit (Tx) beams of a TRP (or multiple TRPs), for example, to support a selection of Tx beams and/or wireless device receive (Rx) beam(s) (shown as shaded ovals in the top row and bottom row, respectively, of P1). Beamforming at a TRP (or multiple TRPs) may include, for example, an intra-TRP and/or inter-TRP Tx beam sweep from a set of different beams (shown, in the top rows of P1 and P2, as unshaded ovals rotated in a counter-clockwise direction indicated by the dashed arrow). Beamforming at a wireless device 1901, may include, for example, a wireless device Rx beam sweep from a set of different beams (shown, in the bottom rows of P1 and P3, as unshaded ovals rotated in a clockwise direction indicated by the dashed arrow). Procedure P2 may be used to enable a wireless device measurement on different Tx beams of a TRP (or multiple TRPs) (shown, in the top row of P2, as unshaded ovals rotated in a counter-clockwise direction indicated by the dashed arrow), for example, which may change inter-TRP and/or intra-TRP Tx beam(s). Procedure P2 may be performed, for example, on a smaller set of beams for beam refinement than in procedure P1. P2 may be a particular example of P1. Procedure P3 may be used to enable a wireless device measurement on the same Tx beam (shown as shaded oval in P3), for example, to change a wireless device Rx beam if the wireless device 1901 uses beamforming.

Based on a wireless device's beam management report, a base station may transmit, to the wireless device, a signal indicating that one or more beam pair links are the one or more serving beams. The base station may transmit PDCCH and/or PDSCH for the wireless device using the one or more serving beams.

A wireless device 1901 (e.g., a UE) and/or a base station 1902 (e.g., a gNB) may trigger a beam failure recovery mechanism. The wireless device 1901 may trigger a beam failure recovery (BFR) request transmission, for example, if a beam failure event occurs. A beam failure event may include, for example, a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 1901 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 1902 may indicate that an RS resource, for example, that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 1901, and the channel characteristics from a transmission via a control channel to the wireless device, are similar or the same under a configured criterion.

FIG. 20A shows an example of a beam failure event involving a single TRP. A single TRP such as at a base station 2001 may transmit, to a wireless device 2002, a first beam 2003 and a second beam 2004. A beam failure event may occur if, for example, a serving beam, such as the second beam 2004, is blocked by a moving vehicle 2005 or other obstruction (e.g., building, tree, land, or any object) and configured beams (e.g., the first beam 2003 and the second beam 2004), including the serving beam, are received from the single TRP. The wireless device 2002 may trigger a mechanism to recover from beam failure when a beam failure occurs.

FIG. 20B shows an example of a beam failure event involving multiple TRPs. Multiple TRPs, such as at a first base station 2001 and at a second base station 2006, may transmit, to a wireless device 2002, a first beam 2003 (e.g., from the first base station 2001) and a second beam 2004 (e.g., from the second base station 2006). A beam failure event may occur when, for example, a serving beam, such as the second beam 2004, is blocked by a moving vehicle 2005 or other obstruction (e.g., building, tree, land, or any object) and configured beams (e.g., the first beam 2003 and the second beam 2004) are received from multiple TRPs. The wireless device 2002 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, for example, via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, for example, after or in response to receiving the beam failure recovery request. A beam recovery mechanism may be, for example, an L1 scheme, or a higher layer scheme.

A base station may transmit one or more messages comprising, for example, configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A base station may send (e.g., transmit) a confirmation message to a wireless device, for example, based on or in response to receiving one or more BFR requests. The confirmation message may be a L1 control information. The confirmation message may include a CRI associated with a candidate beam the wireless device indicates in the one or more BFR requests.

In carrier aggregation (CA), two or more component carriers (CCs) may be aggregated. CCs may be organized into cells. For example, CCs may be organized into a primary cell (PCell) and/or one or more secondary cells (SCells). A wireless device may simultaneously receive and/or transmit on one or more CCs, depending on the capabilities of the wireless device. For example, a wireless device may support CA for contiguous CCs and/or for non-contiguous CCs. Additionally, or alternatively, a wireless device may have an RRC connection with a network, for example, when the wireless device is configured for CA. A cell providing NAS mobility information may be a serving cell, for example, during an RRC connection establishment, re-establishment, handover, etc. Additionally, or alternatively, a cell providing a security input may be a serving cell, for example, during an RRC connection re-establishment, handover procedure, etc. The serving cell may be a PCell. The base station may transmit one or more messages to a wireless device. The one or more message may comprise configuration parameters for one or more of the SCells.

A base station and/or a wireless device may employ an activation/deactivation mechanism for an SCell, for example, if the base station and/or wireless device is configured with CA. The activation/deactivation mechanism may improve battery and/or power consumption of the wireless device. A base station may activate and/or deactivate at least one of the one or more SCells, for example, if a wireless device is configured with one or more SCells. One of the one or more SCell may be deactivated, for example, based on receiving one or more messages for configuring the SCell. The SCell may not be deactivated, for example, based on an SCell state associated with the SCell being set to an activated state and/or a dormant state.

A base station may transmit one or more messages to a wireless device. The one or more messages may indicate an SCell timer (e.g., sCellDeactivationTimer). A wireless device may deactivate an SCell, for example, based on or in response to an expiry of the SCell timer.

A wireless device may activate and/or deactivate an SCell, for example, based on or in response to receiving an SCell Activation/Deactivation MAC CE. The wireless device may activate an SCell, for example, based on the wireless device receiving an SCell Activation/Deactivation MAC CE that activates the SCell. The wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell, for example, based on or in response to activating the SCell.

The wireless device may start and/or restart a first SCell timer (e.g., sCellDeactivationTimer) associated with the SCell, for example, based on in response to the activating the SCell. The wireless device may start and/or restart the first SCell timer in the slot, for example, based on or in response to receiving an SCell Activation/Deactivation MAC CE that activates the SCell. The wireless device may (re-)initialize one or more suspended configured uplink grants of a configured grant Type 1 associated with the SCell according to a stored configuration, for example, based on or in response to the activating the SCell. The wireless device may trigger PHR, for example, based on or in response to the activating the SCell.

The wireless device may deactivate the activated SCell, for example, based on or in response to receiving an SCell Activation/Deactivation MAC CE for deactivating an activated SCell. The wireless device may deactivate the activated SCell, for example, based on or in response to a first SCell timer (e.g., sCellDeactivationTimer) associated with an activated SCell expiring. The wireless device may stop the first SCell timer associated with the activated SCell, for example, based on or in response to deactivating the activated SCell. The wireless device may clear one or more configured downlink assignments and/or one or more configured uplink grants of a configured uplink grant Type 2 associated with the activated SCell, for example, based on or in response to the deactivating the activated SCell. The wireless device may suspend one or more configured uplink grants of a configured uplink grant Type 1 associated with the activated SCell, for example, based on or in response to deactivating the activated SCell. Additionally, or alternatively, the wireless device may flush HARQ buffers associated with the activated SCell, for example, based on or in response to deactivating the activated SCell. Additionally, a wireless device may not perform operations, for example, if an SCell is deactivated. For example, the wireless device may not transmit SRS on the SCell, report CQI/PMI/RI/CRI for the SCell, transmit on UL-SCH on the SCell, transmit on RACH on the SCell, monitor at least one first PDCCH on the SCell, monitor at least one second PDCCH for the SCell, and/or transmit a PUCCH on the SCell. A wireless device may stop (e.g., abort, terminate, cease, etc.) an ongoing random access procedure on the SCell, for example, based on or in response to the SCell being deactivated.

A wireless device may restart a first SCell timer (e.g., sCellDeactivationTimer) associated with an activated SCell, for example, based on at least one first PDCCH on an activated SCell indicating an uplink grant and/or a downlink assignment. A wireless device may restart the first SCell timer (e.g., sCellDeactivationTimer) associated with the activated SCell, for example, based on at least one second PDCCH on a serving cell (e.g. a PCell or an SCell configured with PUCCH) indicating an uplink grant and/or a downlink assignment for the activated SCell.

Figures 21A, 21B:
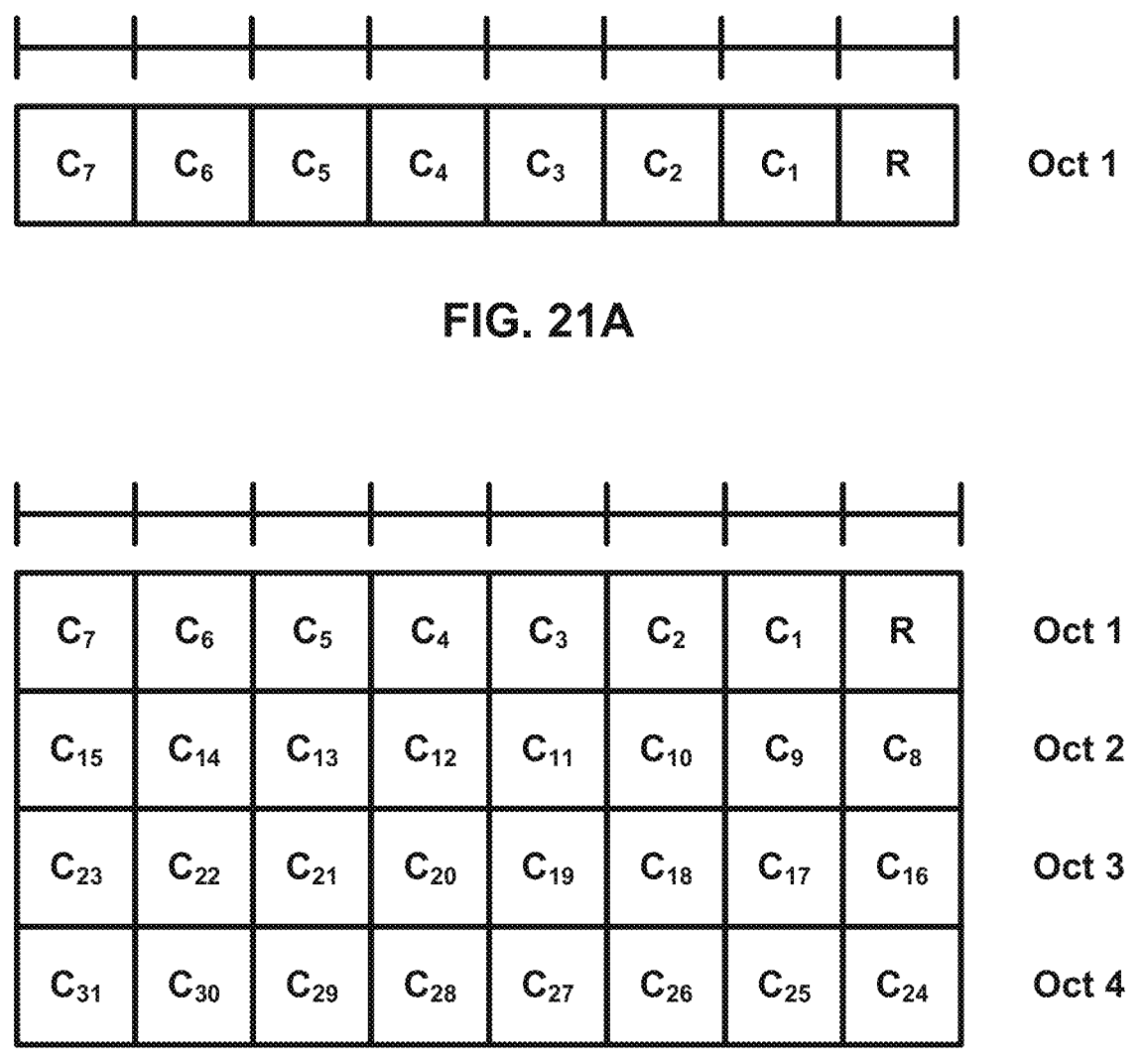

FIGS. 21A and 21B show examples of an SCell Activation/Deactivation MAC CE. FIG. 21A shows an example of an SCell Activation/Deactivation MAC CE that comprises one octet. A first MAC PDU subheader with a first LCID (e.g., "111010") may identify the SCell Activation/Deactivation MAC CE of one octet. The SCell Activation/Deactivation MAC CE of one octet may have a fixed size (e.g., 8 bits). The SCell Activation/Deactivation MAC CE of one octet may comprise a single octet. The single octet may comprise a first quantity (e.g., number) of C-fields (e.g., seven) and a second quantity (e.g., number) of R-fields (e.g., one). FIG. 21B shows an example of an SCell Activation/Deactivation MAC CE that comprises four octets. A second MAC PDU subheader with a second LCID (e.g., "111001") may identify the SCell Activation/Deactivation MAC CE of four octets. The SCell Activation/Deactivation MAC CE of four octets may have a fixed size (e.g., 32 bits). The SCell Activation/Deactivation MAC CE of four octets may comprise four octets. The four octets may comprise a third quantity (e.g., number) of C-fields (e.g., 31) and a fourth quantity (e.g., number) of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one (e.g., "1"). Similarly, an SCell with an SCell index i may be deactivated, for example, if the $C_i$ field is set to zero (e.g. "0"). The wireless device may ignore the $C_i$ field, for example, if there is no SCell configured with SCell index i. The R field may indicate a reserved bit and may be set to zero (e.g., "0").

FIGS. 22A and 22B show examples of timelines during which a wireless device may receive a MAC activation command. If a wireless device receives a MAC activation command for a secondary cell in subframe n, the corresponding actions in the MAC layer may be applied no later than a minimum requirement (e.g., such as indicated in 3GPP TS 36.133, TS 38.133, and/or any other requirement) and/or no earlier than a particular time period (e.g., no earlier than subframe n+8), except, for example, for the following: the actions related to CSI reporting and/or the actions related to the sCellDeactivationTimer associated with the secondary cell (e.g., which may be applied in subframe n+8). If a wireless device receives a MAC deactivation command for a secondary cell and/or the sCellDeactivationTimer associated with the secondary cell expires in subframe n, the corresponding actions in the MAC layer may apply no later than a minimum requirement (e.g., as indicated in 3GPP TS 36.133, TS 38.133, and/or any other requirement), except, for example, for the actions related to CSI reporting (e.g., which may be applied in subframe n+8).

If a wireless device receives a MAC activation command for a secondary cell in subframe n, the actions related to CSI reporting and the actions related to the sCellDeactivationTimer associated with the secondary cell, may be applied in subframe n+8. If a wireless device receives a MAC deactivation command for a secondary cell and/or other deactivation conditions are met (e.g. the sCellDeactivationTimer associated with the secondary cell expires) in subframe n, the actions related to CSI reporting may be applied in subframe n+8. The wireless device may start reporting invalid and/or valid CSI for the SCell at the $(n+8)^{th}$ subframe, and start and/or restart the sCellDeactivationTimer if receiving the MAC CE activating the SCell in the $n^{th}$ subframe. A wireless device may report an invalid CSI (e.g., out-of-range CSI) at the $(n+8)^{th}$ subframe, for example, if the wireless device has a slow activation. A wireless device may report a valid CSI at the $(n+8)^{th}$ subframe, for example, if the wireless device has a quick activation.

If a wireless device receives a MAC activation command for an SCell in subframe n, the wireless device may start reporting CQI/PMI/RI/PTI for the SCell at subframe n+8 and may start and/or restart the sCellDeactivationTimer associated with the SCell at subframe n+8. The timing of these actions may be defined for both the wireless device and the base station. For example, sCellDeactivationTimer may be maintained in the base station and/or the wireless device. The wireless device and the base station may stop, start, and/or restart this timer (e.g., sCellDeactivationTimer) in the same TTI. Otherwise, the sCellDeactivationTimer in the wireless device may not be in-sync with the corresponding sCellDeactivationTimer in the base station. Also, the base station may start monitoring and/or receiving CSI (CQI/PMI/RI/PTI) according to the predefined timing in the same TTI and/or after the wireless device starts transmitting the CSI. Network operation may result in inefficient operations and/or errors, for example, if the CSI timings in the wireless device and the base station are not coordinated based on a common standard and/or air interface signaling.

FIG. 23 shows an example of DCI formats. These DCI formats may be used, for example, in a system (e.g., an LTE system, a 5G-NR system, etc.) with 20 MHz FDD operation and two transmission ("Tx") antennas at the base station. At least some systems (e.g., LTE systems) may not support carrier aggregation. At least some systems (e.g., a 5G-NR system), the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of wireless devices of a slot format; DCI format 2_1 notifying a group of wireless devices of PRB(s) and OFDM symbol(s) where a wireless device may determine (e.g., assume, conclude, realize, etc.) no transmission is intended for the wireless device; DCI format 2_2 indicating transmission of TPC commands for PUCCH and PUSCH; and/or DCI format 2_3 indicating transmission of a group of TPC commands for SRS transmission by one or more wireless devices.

A base station may transmit DCI via a PDCCH for scheduling decision and power-control commands. The DCI may comprise at least one of: downlink scheduling assignments, uplink scheduling grants, and/or power-control commands. The downlink scheduling assignments may comprise at least one of: PDSCH resource indication, transport format, HARQ information, control information related to multiple antenna schemes, and/or a command for power control of the PUCCH used for transmission of ACK/NACK. The ACK/NACK may be transmitted, for example, in response to the downlink scheduling assignments. The uplink scheduling grants may comprise at least one of: PUSCH resource indication, transport format, HARQ related information, and/or a power control command of the PUSCH.

The different types of control information may correspond to DCIs of different sizes. For example, a DCI supporting spatial multiplexing with noncontiguous allocation of RBs in the frequency domain may require a larger scheduling message relative to a DCI for an uplink grant allowing for frequency-contiguous allocation. Each DCI may be categorized into different DCI formats, in which each format may correspond to a certain message size and/or usage.

A wireless device may monitor one or more PDCCH candidates to detect one or more DCIs. The one or more DCIs may be in one or more formats. The one or more PDCCH may be transmitted in a common search space and/or a wireless device-specific search space. A wireless device may monitor PDCCH for a limited set of DCI format to reduce power consumption. A wireless device may consume more power for each additional DCI formats to be monitored for and/or detected. For example, a wireless device may not be required to monitor for (e.g., detect) DCI format 6, which may be used for an LTE-A based eMTC wireless device or other wireless device. The one or more PDCCH candidates that a wireless device monitors may be defined in terms of PDCCH wireless device-specific search spaces. A PDCCH wireless device-specific search space at CCE aggregation level L (e.g., 1, 2, 4, 8, 16, or 32) may be defined by a set of PDCCH candidates for CCE aggregation level L. A wireless device may be configured by one or more higher layer parameters based on the corresponding DCI format. Each serving cell may be configured by a corresponding DCI format. The one or more higher layer parameters may indicate a quantity (e.g., number) of PDCCH candidates per CCE aggregation level L. A wireless device may monitor one or more PDCCH candidates in control resource set q, for example, in non-DRX mode operation. The one or more PDCCH candidates may be monitored according to a periodicity of $W_{PDCCH,q}$ symbols. The periodicity of $W_{PDCCH,q}$ symbols may be configured by one or more higher layer parameters for control resource set q. The carrier indicator field value may correspond to cif-InSchedulingCell, for example, if a wireless device is configured with a higher layer parameter (e.g., cif-InSchedulingCell).

The wireless device may monitor (e.g., detect, search for, etc.) one or more PDCCH candidates in a wireless device-specific search space of a serving cell. The wireless device may monitor the one or more PDCCH candidates without carrier indicator field, for example, if the wireless device is not configured with a carrier indicator field. Alternatively, the wireless device may monitor the one or more PDCCH candidates with carrier indicator field, for example, if the wireless device is configured with a carrier indicator field.

A wireless device may not monitor (e.g., detect, search for, etc.) one or more PDCCH candidates on a secondary cell, for example, if the wireless device is configured to monitor one or more PDCCH candidates with carrier indicator field corresponding to the secondary cell in another serving cell. The wireless device may monitor a serving cell for the one or more PDCCH candidates.

The information in the DCI formats used for downlink scheduling may be organized into different groups. The fields present in the DCI formats may vary. The fields may include at least one of: resource information comprising a carrier indicator (e.g., 0 or 3 bits) and/or an RB allocation; a HARQ process number; MCS, NDI, and/or RV (e.g., for the first TB); MCS, NDI and/or RV (e.g., for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication used to differentiate between DCI format 1A and 0; and/or padding, if necessary. The MIMO related information may comprise at least one of: PMI; precoding information; transport block swap flag; power offset between PDSCH and reference signal; reference-signal scrambling sequence; number of layers; and/or antenna ports for the transmission.

The information in the DCI formats used for uplink scheduling may be organized into different groups. The fields present in the DCI formats may vary. The fields may include at least one of: resource information consisting of carrier indicator, resource allocation type and RB allocation; MCS, NDI (e.g., for the first TB); MCS, NDI (e.g., for the second TB); phase rotation of the uplink DMRS; precoding information; CSI request requesting an aperiodic CSI report; SRS request (e.g., 2-bit) used to trigger aperiodic SRS transmission using one of up to three preconfigured settings; uplink index/DAI; TPC for PUSCH; DCI format 0/1A indication; and/or padding (e.g., if necessary).

A base station may perform CRC scrambling for a DCI. The base station may perform CRC scrambling before transmitting the DCI via a PDCCH. The base station may perform CRC scrambling by bit-wise addition (or Modulo-2 addition or exclusive OR (XOR) operation) of multiple bits of at least one wireless device identifier with the CRC bits of the DCI. The wireless device identifier may include, for example, C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI. The wireless device may check the CRC bits of the DCI, for example, if receiving (e.g., detecting) the DCI. The wireless device may receive the DCI, for example, if the CRC is scrambled by a sequence of bits that is the same as the at least one wireless device identifier.

In at least some systems (e.g., a 5G-NR system), a base station may transmit one or more PDCCH in different control resource sets, for example, in order to support wide bandwidth operation. A base station may transmit one or more RRC messages. The one or more RRC message may comprise configuration parameters of one or more control resource sets. At least one of the one or more control resource sets may comprise at least one of: a first OFDM symbol; a number of consecutive OFDM symbols; a set of resource blocks; a CCE-to-REG mapping; and/or a REG bundle size, for example, in case of interleaved CCE-to-REG mapping.

Figure 24:
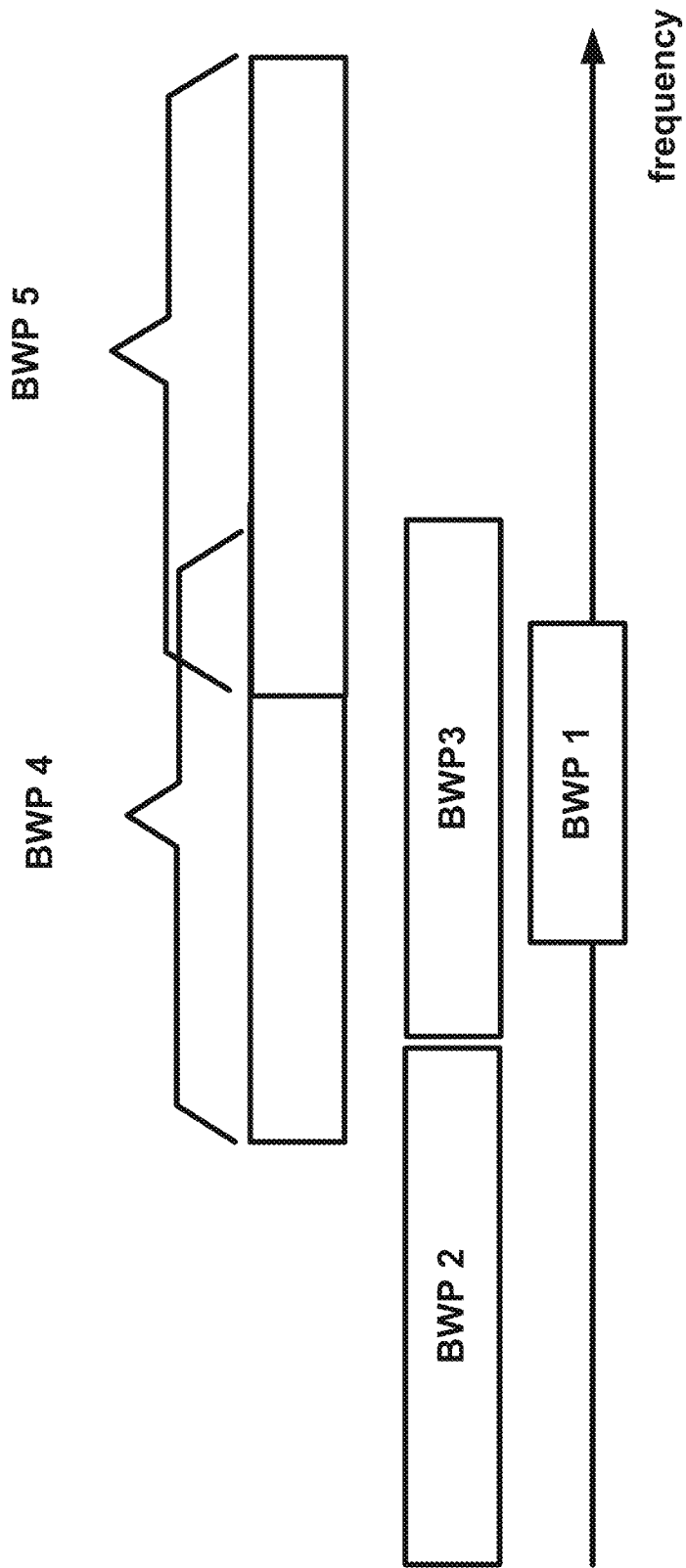
FIG. 24 shows an example of bandwidth part (BWP) configurations.

FIG. 24 shows an example of a multiple BWP configuration. A base station may transmit one or more messages. The one or more messages may comprise configuration parameters of one or more bandwidth parts (BWP) of a cell. The cell may be a PCell or a SCell. The one or more BWPs may have different numerologies. A base station may send (e.g., transmit) control information for cross-BWP scheduling to a wireless device. The control information may be transmitted in one or more messages. In some examples, a first BWP may overlap a second BWP in the frequency domain.

A base station may transmit one or more messages to a wireless device. The one or more messages may comprise configuration parameters for one or more DL BWPs and/or one or more UL BWPs for a cell. The wireless device may be configured with a plurality of parameters for each DL BWP and/or UL BWP in a set of DL BWPs and/or UL BWPs. The plurality of parameters may comprise: a subcarrier spacing provided by a higher layer parameter (e.g., subcarrierSpacing); a cyclic prefix (e.g., cyclicPrefix); a first PRB and a number of contiguous PRBs (e.g., locationAndBandwidth) that is interpreted as RIV, wherein the first PRB may be a PRB offset relative to the PRB (e.g., offsetToCarrier and subcarrierSpacing); an index in the set of DL BWPs or UL BWPs by respective a higher layer parameter (e.g., bwp-Id); and/or a set of BWP-common and a set of BWP-dedicated parameters by higher layer parameters (e.g., bwp-Common and bwp-Dedicated). A BWP may be configured with: a subcarrier spacing, a cyclic prefix, a number of contiguous PRBs, an offset of the first PRB in the number of contiguous PRBs relative to the first PRB, and/or Q control resource sets (e.g., if the BWP is a DL BWP). An SCell might not have an initial active BWP since the initial access is performed on the PCell. The initially activated DL BWP and/or UL BWP may be configured or reconfigured by RRC signaling, for example, if the SCell is activated. The default active BWP of an SCell may be configured, or reconfigured, by RRC signaling.

At least one BWP may be the active DL BWP and/or UL BWP. Further, there may be no active BWP to serve as either the default DL BWP and/or the default UL BWP. Alternatively, there may be one active BWP that serves as the default DL BWP and/or default UL BWP. The active DL BWP for the PCell may be the DL BWP on which the wireless device may monitor one or more PDCCH and/or receive PDSCH. The active UL BWP may be the UL BWP on which the UE may send (e.g., transmit) one or more uplink signals. The active DL BWP for an SCell may be the DL BWP on which the wireless device may monitor one or more PDCCH and/or receive PDSCH. The active DL BWP for the SCell may be active, for example, if the SCell is configured. The SCell may be configured (e.g., activated), for example, if the SCell receives a MAC activation/deactivation CE. The active UL BWP for the SCell may be the UL BWP on which the wireless device may send (e.g., transmit) PUCCH (if configured) and/or PUSCH. The SCell may be configured (e.g., activated), for example, if the SCell receives a MAC activation/deactivation CE. Configuration and use of multiple BWPs may be reduce a wireless device's power consumption. A wireless device configured with an active BWP and/or a default BWP may switch to the default BWP, for example, if there is no activity on the active BWP. A default BWP may be configured with a narrow bandwidth range, for example, if an active BWP may be configured with a wide bandwidth range. The wireless device may switch the active BWP to the default BWP, for example, if there are no signals being transmitted and/or received on the active BWP. By switching to the default BWP when there are no signals being transmitted and/or received on the active BWP, the wireless device may reduce power consumption and/or extend its battery life.

Switching BWPs may be triggered by DCI and/or a timer. A wireless device may monitor PDCCH and/or receive PDSCH on a new BWP, for example, if the wireless device receives DCI indicating DL BWP switching from a first DL BWP (e.g., active DL BWP) to a second DL BWP (e.g., new DL BWP part). The wireless may transmit PUCCH (e.g., if configured) and/or PUSCH on a new UL BWP, for example, if the wireless receives DCI indicating UL BWP switching from a first active UL BWP (e.g., active UL BWP) to a second active UL BWP (e.g., new active BWP). A base station may transmit one or more messages to the wireless device. The one or more messages may comprise a BWP inactivity timer. The wireless device may start (or restart) the timer, for example, if the wireless device switches from a first active DL BWP to a second active DL BWP. The second active DL BWP may be a DL BWP other than the default DL BWP. The wireless device may restart the timer to an initial value, for example, if the wireless device successfully decodes DCI to schedule PDSCH(s) in its active DL BWP. The wireless device may switch from a first active DL BWP to the default DL BWP, for example, if the BWP inactivity timer expires.

A base station may configure a wireless device-specific default DL BWP other than initial active BWP. The base station may configure the wireless device-specific default DL BWP after an RRC connection, for example, for load balancing purposes. The default BWP may support other connected mode operations (e.g., besides operations supported by an initial active BWP). For example, the other connected mode operations may include a fall back and/or a connected mode paging. The default BWP may comprise a common search space, for example, at least a search space for monitoring for a pre-emption indication. A DL BWP may be configured as the default DL BWP for a wireless device.

The default DL BWP may be a DL BWP that is different from the initial active DL BWP. The default DL BWP may be reconfigured, for example, due to load balancing and/or different numerologies employed for active DL BWP and/or initial active DL BWP.

DL and UL BWPs may be independently activated, for example, in a paired spectrum. DL and UL BWPS may be jointly activated, for example, in an unpaired spectrum. A joint activation of a new downlink BWP and new UL BWP may occur in an unpaired spectrum, for example, if the bandwidth of the active DL BWP may be changed (e.g., in the case of bandwidth adaptation). In bandwidth adaptation, a new DL/UL BWP pair may be established in which the bandwidth of the UL BWPs may remain the same (e.g., the DL BWP changes, but there is no change to the UL BWP). An association between a DL BWP and a UL BWP may allow one activation/deactivation command to switch both the DL and the UL BWPs (e.g., at the same time or at substantially the same time such as within a threshold time period). Otherwise, separate BWP switching commands may be necessary to effectuate the switching.

PUCCH resources may be configured for a configured UL BWP, a default UL BWP, and/or both. The wireless device may tune, retune, to the default UL BWP for transmitting an SR, for example, if the PUCCH resources are configured for the default UL BW. The wireless device may send (e.g., transmit) an SR in the current active BWP without retuning, for example, if the PUCCH resources are configured per BWP. Alternatively, the wireless device may send (e.g., transmit) an SR in the current active BWP without retuning, for example, if the PUCCH resources are configured for a BWP other than the default BWP.

There may be at most one active DL BWP and at most one active UL BWP at a given time for a serving cell. A BWP of a cell may be configured with a specific numerology and/or TTI. A logical channel and/or logical channel group may trigger SR transmission, for example, while the wireless device operates in one active BWP. A corresponding SR may remain triggered, for example, based on or in response to BWP switching.

A configured downlink assignment may be initialized (e.g., if not active) or re-initialized (e.g., if already active) using PDCCH, for example, if a new BWP is activated. A wireless device may be configured with at least one UL BWP, at least one DL BWP, and/or one or more configured grants for a cell, for example, via one or more RRC messages/signaling. The one or more configured grants may be semi-persistent scheduling (SPS), Type 1 grant-free (GF) transmission/scheduling, and/or Type 2 GF transmission/scheduling. The one or more configured grants may be configured by UL BWP. One or more radio resources associated with one or more configured grants may not be defined (e.g., assigned, allocated, etc.) across two or more UL BWPs.

An BWP may be inactive during a period of time, for example, if a BWP inactivity timer is running. A base station may send (e.g., transmit) one or more control messages to a wireless device. The one or more control messages may configure a first timer value of an BWP inactivity timer. The first timer value may determine a length for which a BWP inactivity timer runs. That is, the first timer value may define a period of time that a BWP inactivity timer runs. The BWP inactivity timer may be a count-down timer. The BWP inactivity timer may decrement from the first timer value down to a value (e.g., zero). Alternatively, the BWP inactivity timer may be implemented as a count-up timer. The BWP inactivity timer may increment from a first value (e.g., zero) to the first timer value. The BWP inactivity timer may be implemented as a down-counter from the first timer value down to a value (e.g., zero). The BWP inactivity timer may be implemented as a count-up counter from a first value (e.g., zero) up to the first timer value. A wireless device may start/restart a BWP inactivity timer (e.g., UL BWP and/or DL BWP inactivity timers), for example, if the wireless device receives (e.g., decodes) a DCI to schedule PDSCH(s) in its active BWP (e.g., its active UL BWP, its active DL BWP, and/or UL/DL BWP pair).

Figure 25:
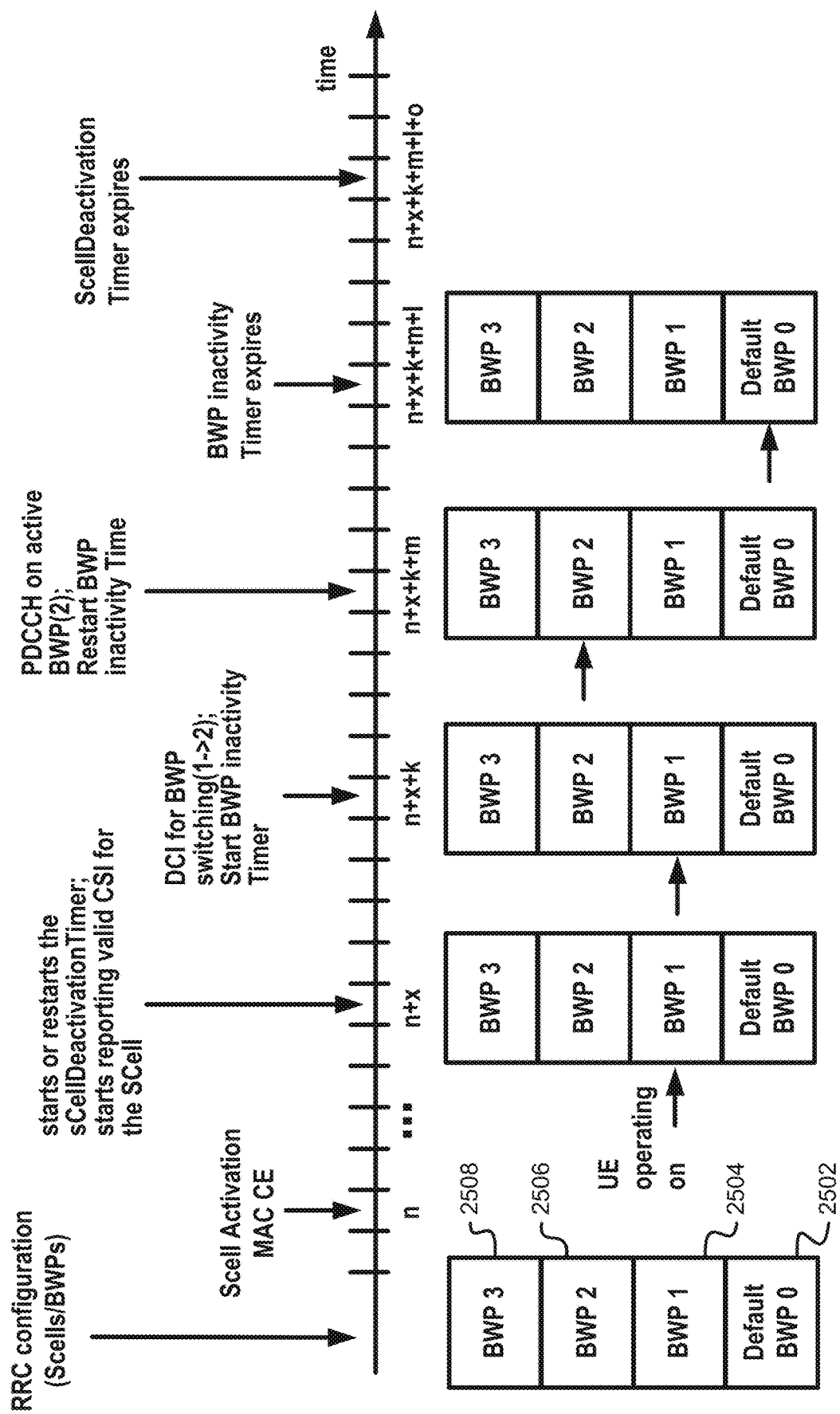
FIG. 25 shows an example of BWP operation in a secondary cell.

FIG. 25 shows an example of BWP switching. A wireless device may receive one or more RRC messages. The one or more RRC messages may comprise one or more parameters for a SCell and/or one or more BWP configuration parameters associated with the SCell. The RRC message may be a RRC connection reconfiguration message (e.g., RRCReconfiguration); a RRC connection reestablishment message (e.g., RRCRestablishment); and/or a RRC connection setup message (e.g., RRCSetup). At least one BWP of the plurality of BWPs may be configured as a first active BWP (e.g., BWP 2504 (e.g., BWP 1)). Similarly, one BWP of the plurality of BWPs may be configured as the default BWP (e.g., BWP 2502 (e.g., BWP 0)). At the $n^{th}$ time slot, the wireless device may receive a MAC CE indicating an activation of the SCell. At the $(n+x)^{th}$ time slot, the wireless device may start an SCell deactivation timer (e.g., sCellDeactivationTimer), start CSI related actions for the SCell, and/or start CSI related actions for the first active BWP of the SCell.

At the $(n+x+k)^{th}$, the wireless device may start the BWP inactivity timer, for example, based on or in response to receiving a DCI that indicates a BWP switch from BWP 2504 (e.g., BWP 1) to BWP 2506 (e.g., BWP 2). At the $(n+x+k+m)^{th}$ time slot, the wireless device may restart the BWP inactivity timer, for example, based on or in response to receiving a PDCCH indicating DL scheduling on BWP 2506 (e.g., BWP 2). At the $(n+x+k+m+1)^{th}$ time slot, the wireless device may switch to the default BWP, BWP 2502 (e.g., BWP 0). The wireless device may set (e.g., designate) the default BWP 2502 as the active BWP, for example, if the BWP inactivity timer expires. The wireless device may deactivate the SCell, for example, if the BWP inactivity time (e.g., sCellDeactivationTimer) expires. The BWP inactivity timer may reduce the wireless device's power consumption when the wireless device is configured with multiple cells and each cell is configured with a wide bandwidth (e.g., 1 GHz). The wireless device may transmit on and/or receive from a narrow-bandwidth BWP (e.g., 5 MHz) on the PCell and/or SCell, for example, if there is no activity on an active BWP.

A wireless device may transmit one or more uplink control information (UCI) to a base station. The one or more UCI may be transmitted via one or more PUCCH resources. The one or more UCI may comprise at least one of: HARQ ACK information; scheduling request (SR); and/or CSI report. A PUCCH resource may be identified by at least: frequency location (e.g., starting PRB) and/or a PUCCH format. The PUCCH format may be configured with an initial cyclic shift value of a base sequence and a time domain location parameter (e.g., starting symbol index). A PUCCH format may comprise at least one of PUCCH format 0, PUCCH format 1, PUCCH format 2, PUCCH format 3, and/or PUCCH format 4. A PUCCH format 0 may have a length of 1 or 2 OFDM symbols and be less than or equal to 2 bits. A PUCCH format 1 may be between 4 and 14 OFDM symbols and be less than or equal to 2 bits. A PUCCH format 2 may occupy 1 or 2 OFDM symbols and be greater than 2 bits. A PUCCH format 3 may be between 4 and 14 OFDM symbols and be greater than 2 bits. A PUCCH format 4 may be between 4 and 14 of OFDM symbols and be greater than 2 bits. The PUCCH resource may be configured on a PCell and/or a PUCCH secondary cell.

A base station may transmit one or more RRC messages to a wireless device, for example, if the base station is configured with a plurality UL BWPs. The one or more RRC messages may comprise configuration parameters of one or more PUCCH resource sets (e.g., 1, 2, 3, 4, or greater than 4) on an UL BWP of the plurality UL BWPs. Each PUCCH resource set may be configured with a PUCCH resource set index, a list of PUCCH resources with each PUCCH resource being identified by a PUCCH resource identifier (e.g., pucch-Resourceid), and/or a maximum quantity (e.g., number) of UCI information bits a wireless device may transmit using one of the list of PUCCH resources in the PUCCH resource set.

A wireless device may select one of the one or more PUCCH resource sets, for example, if configured with one or more PUCCH resource sets. The wireless device may select the PUCCH resource set, for example, based on a bit length of UCI information bits (e.g., HARQ-ARQ bits, SR, and/or CSI) the wireless device may transmit. For example, the wireless device may select a first PUCCH resource set with the PUCCH resource set index equal to "0," for example, if the bit length of UCI information bits is less than or equal to 2. In another example, the wireless device may select a second PUCCH resource set with the PUCCH resource set index equal to "1," for example, if the bit length of UCI information bits is greater than 2 and less than or equal to a first configured value. In yet another example, the wireless device may select a third PUCCH resource set with the PUCCH resource set index equal to "2," for example, if the bit length of UCI information bits is greater than the first configured value and less than or equal to a second configured value. In yet a further example, the wireless device may select a fourth PUCCH resource set with the PUCCH resource set index equal to "3," for example, if the bit length of UCI information bits is greater than the second configured value and less than or equal to a third value (e.g., 1706).

A wireless device may determine, a PUCCH format from a plurality of PUCCH formats, for example, based on a quantity (e.g., number) of uplink symbols of UCI transmission and/or a quantity (e.g., number) of UCI bits. The plurality of PUCCH formats may comprise PUCCH format 0, PUCCH format 1, PUCCH format 2, PUCCH format 3 and/or PUCCH format 4. The wireless device may transmit UCI in a PUCCH using PUCCH format 0, for example, if the transmission is over 1 symbol or 2 symbols and/or the quantity (e.g., number) of HARQ ACK information bits with positive or negative SR (HARQ ACK/SR bits) is 1 or 2. PUCCH format 0 may be based on DFT-spread OFDM, for example, to reduce cubic metric. The wireless device may transmit UCI in a PUCCH using PUCCH format 1, for example, if the transmission is over 4 or more symbols and/or the quantity (e.g., number) of HARQ ACK/SR bits is 1 or 2. PUCCH format 1 may be based on DFT-spread OFDM, for example, to reduce cubic metric. The wireless device may transmit UCI in a PUCCH using PUCCH format 2, for example, if the transmission is over 1 symbol or 2 symbols and/or the quantity (e.g., number) of UCI bits is more than 2. PUCCH format 2 may be based on OFDM. The wireless device may transmit UCI in a PUCCH using PUCCH format 3, for example, if the transmission is over 4 or more symbols, the quantity (e.g., number) of UCI bits is more than 2 and/or the PUCCH resource does not include an orthogonal cover code. PUCCH format 3 may be based on DFT-spread OFDM, for example, to reduce cubic metric. The wireless device may transmit UCI in a PUCCH using PUCCH format 4, for example, if the transmission is over 4 or more symbols, the quantity (e.g., number) of UCI bits is more than 2, and/or the PUCCH resource includes an orthogonal cover code. PUCCH format 4 may be based on DFT-spread OFDM, for example, to reduce cubic metric.

A wireless device may determine the PUCCH resource from a PUCCH resource set, for example, to transmit HARQ ACK information on a PUCCH resource. The PUCCH resource set may be determined as discussed above. The wireless device may determine the PUCCH resource, for example, based on a PUCCH resource indicator field in a DCI (e.g., with a DCI format 1_0 or DCI for 1_1) received on a PDCCH. The PUCCH resource indicator field may be three bits or any other quantity of bits. Additionally, the PUCCH resource indicator field may indicate one of eight PUCCH resources in the PUCCH resource set. The wireless device may transmit the HARQ ACK information in a PUCCH resource indicated by the PUCCH resource indicator field.

FIG. 26 shows an example of mapping a PUCCH resource indication field value to a PUCCH resource in a PUCCH resource set. As noted above, the PUCCH resource indication field (e.g., PUCCH resource identifier) may be three bits (or any other quantity of bits). In this regard, the PUCCH resource set may include up to 8 PUCCH resources (or a corresponding quantity of PUCCH resources based on a quantity of bits). The wireless device may determine a PUCCH resource indicated (e.g., identified) by the PUCCH resource identifier (e.g., pucch-Resourdceid) with a first value in the PUCCH resource list of the PUCCH resource set, for example, if the PUCCH resource indicator field in the DCI (e.g., DCI format 1_0 or 1_1) is "000." The wireless device may determine a PUCCH resource indicated (e.g., identified) by the PUCCH resource identifier (e.g., pucch-Resourdceid) with a second value in the PUCCH resource list of the PUCCH resource set, for example, if the PUCCH resource indicator in the DCI (e.g., DCI format 1_0 or 1_1) is "001." The wireless device may determine an appropriate PUCCH resource, for example, by mapping the value in the PUCCH resource indicator to the corresponding value in the table illustrated, for example, in FIG. 26. Similarly, the wireless device may determine the PUCCH resource based on at least the PUCCH resource indicator in a DCI (e.g., DCI format 1_0/1_1), for example, to transmit HARQ ACK information, SR and/or CSI multiplexed in the PUCCH. The wireless device may transmit one or more UCI bits via a PUCCH resource of an active UL BWP of a PCell or a PUCCH secondary cell. The PUCCH resource indicated in the DCI may be a PUCCH resource on the active UL BWP of the cell since only one active UL BWP in a cell may be supported for a wireless device.

Figure 27:
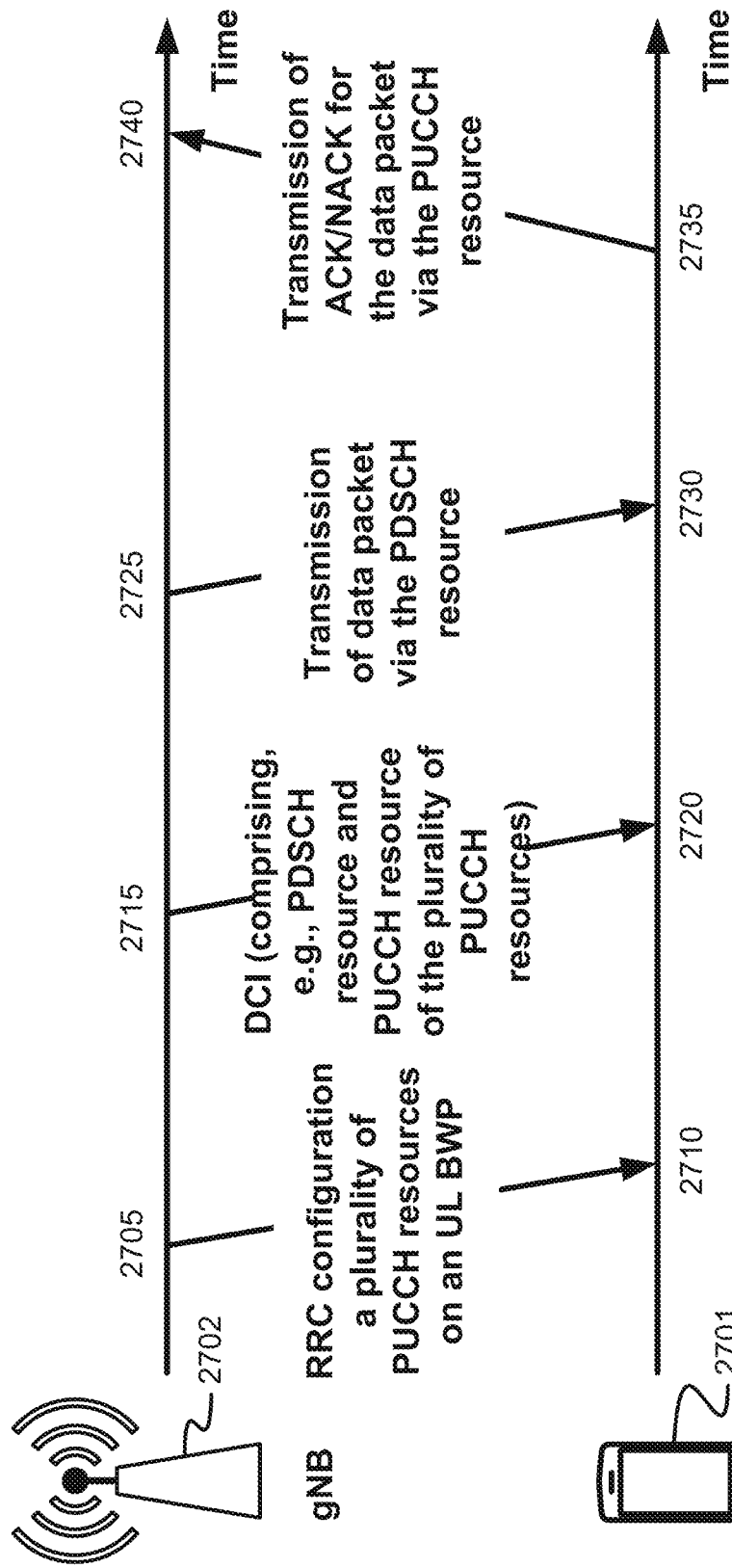
FIG. 27 shows an example of UL ACK/NACK transmissions.

FIG. 27 shows an example downlink data packet receiving procedure. A base station 2702 may transmit to a wireless device 2701 one or more RRC messages at time 2705. At time 2710, the wireless device 2701 may receive the one or more RRC messages transmitted by the base station 2702. The one or more RRC messages may comprise one or more configuration parameters of a plurality of PUCCH resources on an UL BWP of a plurality of UL BWPs of a cell. The cell may be a PCell or a PUCCH secondary cell. The wireless device 2701 may transmit uplink control information on the PCell, for example, if the wireless device is configured with carrier aggregation. Two PUCCH groups may be configured by the base station 2702, for example, to avoid overloading the PCell. Each of the PUCCH groups may comprise a group of cells. The wireless device 2701 may transmit UCI for the first PUCCH group on the PCell. The wireless device 2701 may transmit UCI for the second PUCCH group on a PUCCH secondary cell.

A PUCCH resource may be indicated (e.g., identified) by a PUCCH resource identifier (or index). The one or more configuration parameters of PUCCH resource may comprise at least one of: a start PRB index; an intra-slot frequency hopping indicator; a second hop PRB index; and/or a PUCCH format indicator. The base station 2702 may communicate with the wireless device 2701 on an active DL BWP and/or an active UL BWP on the cell. The active UL BWP may be one of the plurality of UL BWPs. At time 2715, the base station may send (e.g., transmit) DCI (e.g., DCI format 1 0/1_1) on the active DL BWP at a first time (e.g., a symbol/slot/mini-slot). At time 2720, the wireless device 2701 may receive the DCI. The DCI may comprise at least: one or more resource allocation parameters of a PDSCH; a PDSCH-to-HARQ feedback timing indicator; a TPC command for a scheduled PUCCH; and/or a PUCCH resource indicator. At time 2725, the base station 2702 may transmit a data packet via the PDSCH, for example, based on or in response to the DCI. At time 2730, the wireless device 2702-2701 may receive the data packet via the PDSCH. The wireless device 2701 may then decode the data packet. The wireless device 2701 may determine acknowledgement information for the data packet. The wireless device 2701 may determine the acknowledgement information is a positive acknowledgement (e.g., an ACK), for example, based on or in response to successfully decoding (e.g., detecting) the data packet. Alternatively, the wireless device 2701 may determine the acknowledgement information is a negative acknowledgment (e.g., a NACK), for example, based on or in response to unsuccessfully decoding (e.g., unsuccessfully detecting) the data packet. At time 2735, the wireless device 2701 may transmit the acknowledgement information (e.g., an ACK/NACK) for the data packet via a PUCCH resource (on the active UL BWP) indicated by the PUCCH resource indicator. Time 2735 may be a second time (e.g., symbol/slot/mini-slot) that occurs an amount of time after the first time (e.g., time 2730). The amount of time may be indicated by the PDSCH-to-HARQ feedback timing indicator. At time 2740, the base station 2702 may receive the acknowledgement information transmitted by the wireless device 2701.

A base station may request (e.g., indicate) that a wireless device transmit one or more SRS communications for channel quality estimation (e.g., CSI acquisition, uplink beam management). The channel quality estimation may enable frequency-selective scheduling on the uplink. Transmission of SRS communications may be used to enhance power control and/or to support various startup functions for wireless devices that have not been scheduled recently. These startup functions may include, for example, initial MCS (Modulation and Coding Scheme) selection, initial power control for data transmissions, timing advance, and/or frequency semi-selective scheduling.

A base station may request (e.g., indicate) that a wireless device to transmit at least one types of SRS communication. Types of SRS communications may include: periodic SRS transmission (type 0); aperiodic SRS transmission (type 1); and/or semi-persistent SRS transmission. Subframes in which SRSs may be transmitted may be indicated by cell-specific broadcast signaling, and/or UE-specific signaling, for example for period SRS transmission.

Figure 28A:
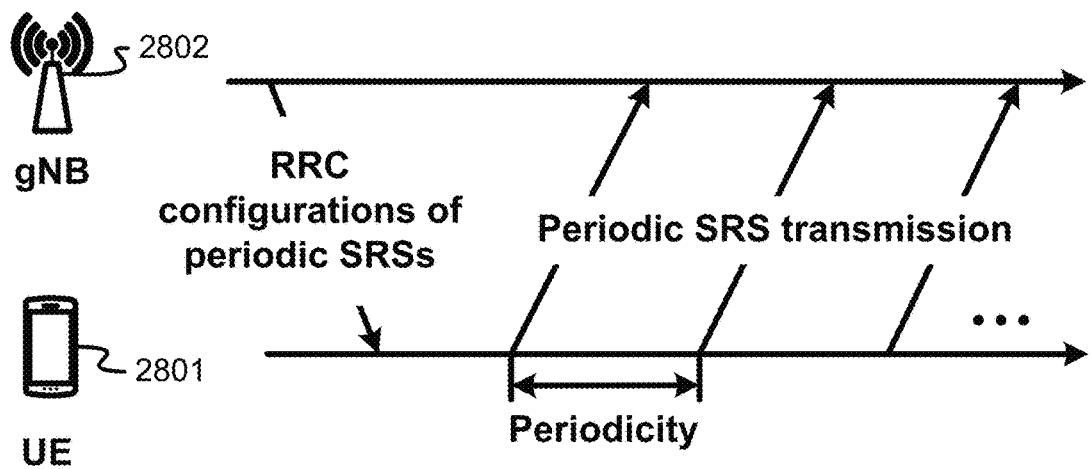
FIGS. 28A-28C show examples of SRS transmissions.
Figure 28B:
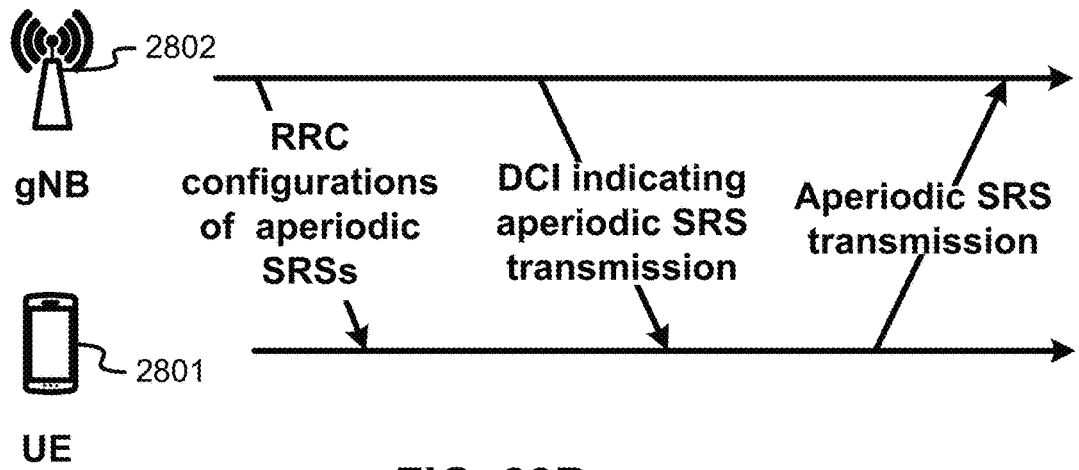
Figure 28C:
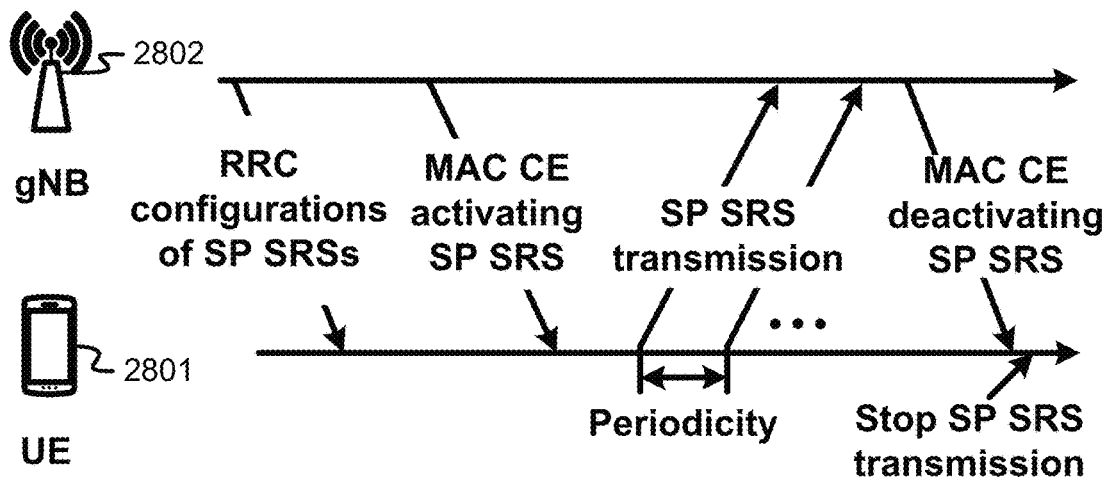

FIGS. 28A-28C show examples of SRS transmissions. FIG. 28A shows an example of periodic SRS transmission.

Periodicity of the periodic SRS transmission may be any time value. For example, periodic SRS transmission may occur frequently (e.g., every 2 ms or other duration). Alternatively, periodic SRS transmissions may occur more infrequently (e.g., once every 160 ms or other duration). A wireless device 2801 may transmit SRSs in SC-FDMA or OFDM symbols (e.g., last 1~3 symbols in a subframe or other quantity of symbols in a subframe) in the configured subframes. FIG. 28B shows an example of aperiodic SRS transmission. A wireless device 2801 may transmit SRS aperiodically, for example, based on or in response to receiving DCI indicating the aperiodic SRS transmission. FIG. 28C shows an example of SP SRS transmission. A wireless device 2801 may receive one or more configuration parameters for SP SRS transmission. The configuration parameters may comprise at least one of: a periodicity of the SP SRS transmission; a time/frequency radio resource; cyclic shift parameters; and/or other radio parameters (e.g., bandwidth, frequency hopping, transmission comb and offset, frequency-domain position). The wireless device 2801 may transmit the SP SRS, for example, based on or in response to receiving a first MAC CE activating the SP SRS. The wireless device 2801 may repeat the SP SRS transmission based on a periodicity. The wireless device 2801 may stop (e.g., cease, terminate, etc.) the repeat SP SRS transmissions, for example, based on or in response to receiving a second MAC CE deactivating the SP SRS. The wireless device 2801 may deactivate the SP SRS and stop the SP SRS transmission, for example, based on or in response to receiving the second MAC CE deactivating the SP SRS.

A base station and a wireless device may communicate via an unlicensed spectrum provided by LAA technologies. A listen-before-talk (e.g., for clear channel assessment) procedure may be performed (e.g., implemented) prior to transmission in a cell implementing LAA technologies. In a listen-before-talk (LBT) procedure, equipment (e.g., a base station, a wireless device, etc.) may apply a clear channel assessment (CCA) check before using the channel. For example, the equipment, may determine the presence and/or absence of other signals on a channel in order to determine whether a channel is occupied and/or clear by employing the CCA to detect energy. In this regard, European and Japanese regulations mandate the usage of LBT in unlicensed bands. In addition to regulatory requirements, carrier sensing, via LBT, may be one technique for equitable sharing of an unlicensed spectrum. Discontinuous transmission on an unlicensed carrier with a limited maximum transmission duration may be enabled.

Some of these functions may be supported by one or more signals. The one or more signals may be transmitted from the beginning of a discontinuous LAA downlink transmission. Channel reservation may be achieved (e.g., enabled) by the transmission of signals, for example, after gaining channel access via a successful LBT operation. Channel reservation may be performed by an LAA node (e.g., a base station, a wireless device). Other nodes that receive the one or more transmitted signals with an energy above a certain threshold may sense that the channel is occupied. LAA operation with discontinuous downlink transmission may include one or more of the following functions: detection of the LAA downlink transmission (including cell identification) by wireless devices and/or time & frequency synchronization of wireless devices.

A DL LAA design may employ subframe boundary alignment. The subframe boundary alignment may be according to LTE-A carrier aggregation timing relationships across serving cells. A base station may not begin transmitting at the start of the subframe boundary. Instead, LAA may support a base station transmitting PDSCH, for example, if only a subset of (e.g., <all) OFDM symbols are available for transmission in a subframe according to LBT. LAA may also support delivery of control information for the PDSCH.

An LBT procedure may be employed for coexistence of LAA with other operators and technologies operating in an unlicensed spectrum. Before a node may attempt to transmit on a carrier in an unlicensed spectrum, the node may be required to perform a clear channel assessment to determine, for example, if the channel is free. The clear channel assessment may be part of an LBT procedure performed by a node attempting to transmit on a carrier in an unlicensed spectrum. The LBT procedure may involve using energy detection to determine (e.g., detect), for example, if the channel is in use. For example, regulatory requirements in some regions (e.g., Europe) may specify (e.g., define, set, etc.) an energy detection threshold. The node may determine (e.g., assume) that the channel is not free, for example, if the node detects (e.g., receives) energy greater than the energy detection threshold. While some nodes may follow regulatory requirements, other nodes may use a lower threshold for energy detection than the energy detection threshold specified by regulatory requirements. LAA may employ a mechanism to adaptively change the energy detection threshold. For example, LAA may employ a mechanism to adaptively change (e.g., lower, raise) the energy detection threshold. The mechanism may not preclude static, or semi-static, setting of the threshold. For example, a Category 4 LBT mechanism, or other type of LBT mechanisms, may be implemented to change the energy detection threshold.

As noted above, various LBT mechanisms may be implemented. In some instances, no LBT procedure may performed by the transmitting entity, for example, for some signals, in some implementation scenarios, in some situations, and/or in some frequencies. A Category 2 LBT mechanism (e.g. LBT without random back-off) may be implemented. A transmitting entity in a Category 2 LBT mechanism may determine (e.g., sense) the channel is idle for a period of time (e.g., duration of time). A lack of traffic on a channel for a period of time may be deterministic that the channel is idle. The transmitting entity may transmit, for example, based on or in response to determining that the channel is idle. A Category 3 LBT mechanism (e.g. LBT with random back-off with a contention window of fixed size) may be implemented. The transmitting entity in a Category 3 LBT mechanism may draw a random number (e.g., N) within a contention window. The contention window may be a fixed size. The size of the contention window may be determined (e.g., specified) by a minimum value of N drawn by a first transmitting entity and a maximum value of N drawn by a second transmitting entity. The random number N may be used to determine the period of time (e.g., duration of time) that the channel may be idle before the transmitting entity is permitted (e.g., allowed) to transmit on the channel. A Category 4 LBT mechanism (e.g. LBT with random back-off with a contention window of variable size) may be implemented. A transmitting entity may draw a random number (e.g., N) within a contention window. The transmitting entity may vary the size of the contention window, for example, if drawing the random number N. The size of the contention window may be determined (e.g., specified) by the minimum value of N drawn by the first transmitting entity and the maximum value of N drawn by the second transmitting entity. The random number N may be used to determine the period of time (e.g., duration of time) that the channel may be idle before the transmitting entity is permitted (e.g., allowed) to transmit on the channel.

A wireless device may employ uplink (UL) LBT, for example, if configured with a LAA cell. The UL LBT scheme may be different from the DL LBT scheme. For example, the UL LBT may use different LBT mechanisms and/or different parameters than the DL LBT. For example, the LAA UL may be based on a scheduled access which may affect a wireless device's channel contention opportunities. Another consideration for implementing a different UL LBT scheme may include multiplexing of multiple UEs in a single subframe.

A DL transmission burst may be a continuous transmission from a DL transmitting node with no transmission immediately before or after from the same node on the same CC. UL transmission burst may be defined from a wireless device's perspective. An UL transmission burst from the wireless device perspective may be a continuous transmission from the wireless device with no transmission immediately before or after from the same wireless device on the same CC. Additionally, or alternatively, an UL transmission burst may be defined from a base station's perspective. DL transmission burst(s) and/or UL transmission burst(s) on LAA may be scheduled in a TDM manner over a same unlicensed carrier, for example, if the base station is operating DL+UL LAA over the same unlicensed carrier. For example, an instant in time may be part of a DL transmission burst and/or an UL transmission burst.

Single DL to UL and UL to DL switching within a shared channel occupancy time (COT) may be supported. Additionally, multiple DL to UL and UL to DL switching within the shared COT may also be supported. Gap length and/or single or multiple switching points may have different LBT requirements. For example, LBT may not be used for a gap less than 16 µs. One-shot LBT may be used, for example, for gaps greater than 16 µs and less than 24 µs. For example, one-shot LBT may be used for a single switching point and/or if the gap from DL transmission to UL transmission exceeds 25 µs. Similarly, one-shot LBT may be used, for example, for multiple switching points and/or if the gap from DL transmission to UL transmission exceeds 25 µs.

A base station and/or a wireless device may support both CBRA and/or CFRA on a PCell and/or a PSCell operating in an unlicensed band. Carrier aggregation between a primary NR cell in a licensed band (e.g., NR PCell) and a secondary NR cell in an unlicensed band (e.g., NR-U SCell) may be supported. NR-U SCell may have both DL and UL, or DL-only. Dual connectivity between a primary LTE cell in a licensed band (e.g., LTE PCell) and a primary secondary NR cell in an unlicensed band (e.g., NR-U PSCell) may be supported. Stand-alone NR-U (e.g., in which all carriers are in an unlicensed spectrum) may be supported. An NR cell with DL in an unlicensed band and UL in a licensed band may be supported. Dual connectivity between a primary NR cell in a licensed band (e.g., NR PCell) and a primary secondary NR cell in an unlicensed band (e.g., NR-U PSCell) may be supported.

A base station may attempt to gain access to a channel to transmit DCI via a PDCCH, for example, to schedule an uplink data packet on a PUSCH. The base station may schedule the uplink data packet on the PUSCH via an unlicensed carrier. A wireless device may perform LBT prior to transmitting data packets on the PUSCH, for example, based on or in response to receiving the DCI via the PDCCH. Performing LBT prior to transmitting data packets on the PUSCH may increase latency of data transmissions, for example, if the channel may be occupied by other devices (e.g., Wi-Fi terminals). A mechanism for autonomous uplink transmission may be used to improve the latency of data transmissions. In autonomous uplink transmission, a wireless device may be pre-allocated a resource for transmission, similar to UL semipersistent scheduling (SPS). The wireless device may perform LBT, for example, prior to using the resource. Autonomous uplink transmission may be based on one or more configured grants (e.g., a type 1 configured grant and/or a type 2 configured grant).

A wireless device may transmit a HARQ process identity, for example, as UCI. The wireless device may use the first available transmission opportunity, for example, based on or in response to transmitting the HARQ process identity. The wireless device may use the first available transmission opportunity irrespective of the HARQ process. UCI on PUSCH may be used to carry HARQ process ID, NDI, and/or RV ID.

A UL dynamic grant scheduled transmission for an unlicensed band may increase a transmission delay and/or transmission failure, for example, based on at least a first LBT of a base station and/or a second LBT of a wireless device. A pre-configured grant may be used for NR-U. The pre-configured grant may be a such as configured grant in NR. The pre-configured grant may reduce (e.g., decrease) the quantity (e.g., number) of LBTs performed. Additionally, the pre-configured grant may reduce control signaling overhead. An uplink grant may be provided by RRC, for example, in a Type 1 configured grant. The uplink grant may be stored as a configured uplink grant. An uplink grant may be provided by PDCCH, for example, in a Type 2 configured grant. The uplink configured grant may be stored and/or cleared as the configured uplink grant, for example, based on L1 signaling indicating activation and/or deactivation of the configured grant.

There may not be a dependency between HARQ process information and timing. For example, UCI on PUSCH may carry HARQ process ID, NDI, RVID, etc. A wireless device may select a HARQ process ID. The base station may indicate (e.g., inform) the wireless device of which HARQ process ID to select, for example, by UCI.

A wireless device may perform non-adaptive retransmission with the configured uplink grant. The wireless device may try to transmit in a next available resource with a configured grant, for example, if a dynamic grant for the configured grant retransmission is blocked due to LBT.

Downlink Feedback Information (DFI) may be transmitted, for example, using DCI. DFI may include HARQ feedback for a configured grant transmission. The wireless device may perform transmission/retransmission using the configured grant, for example, based on the HARQ feedback included in the DFI. A wideband carrier with more than one channel may supported by a NR-based, unlicensed cell.

There may be one active BWP in a carrier. A BWP with multiple channels may be activated. LBT may be performed, for example, if absence of Wi-Fi cannot be guaranteed (e.g., by regulation). LBT may be performed in units of 20 MHz. There may be multiple parallel LBT procedures for the BWP with multiple channels. The actual transmission bandwidth may be subject to sub-band with LBT success, which may result in dynamic bandwidth transmission within this active wideband BWP. A single wideband BWP within a component carrier may be activated for a wireless device. The bandwidth of the wideband BWP may be in a unit of a sub-band for LBT. The wideband BWP bandwidth may comprise multiple 20 MHz bands, for example, if the sub-band for LBT is a 20 MHz band in a 5 GHz band. The actual transmission bandwidth may be subject to sub-band with LBT success, which may result in dynamic bandwidth transmission within this active wideband BWP.

Active BWP switching may be achieved, for example, by use of scheduling DCI. A network may indicate to a wireless device a new active BWP to use for an upcoming data transmissions and/or receptions. The network may indicate that the new active BWP may be used for subsequent data transmissions and/or receptions. The wireless device may monitor multiple, configured BWPs to determine which has been acquired for DL transmissions by the base station. The wireless device may be configured to monitor periodicity and/or offset for each configured BWP. The wireless device may attempt to determine, for example, if a BWP has been acquired by the base station during the monitoring occasions. The wireless device may maintain an active state of the active BWP, for example, based on or in response to a successful determination that the base station has acquired the channel. The active BW may be maintained in the active state until indicated otherwise and/or a Maximum Channel Occupancy Time (MCOT) has been reached. The wireless device may attempt blind detection of PDCCH in configured CORESETs, for example, if the wireless device has determined that a BWP is active. Additionally, or alternatively, the wireless device may perform measurements on aperiodic and/or SPS resources, for example, if the wireless device has determined that a BWP is active.

A wireless device may be configured with multiple UL resources, for example, for UL transmissions. The multiple UL resources may be in different BWPs. The wireless device may have multiple LBT configurations. Each LBT configuration may be associated with (e.g., tied to) a BWP. Additionally, or alternatively, each LBT configuration may be associated with (e.g., tied to) a beam pair link. The wireless device may be granted UL resources associated with (e.g., tied to) one or more LBT configurations. Similarly, the wireless device may be provided with multiple autonomous uplink (AUL)/grant-free resources. Each AUL/grant-free resources may require the use of a different LBT configuration. By having a plurality of AUL resources associated with a plurality of BWPs, the wireless device may attempt to transmit in a second AUL resource in a second BWP, for example, if a first LBT configuration for a first AUL resource in a first BWP fails. The plurality of AUL resources associated with the plurality of BWPs may reduce channel access latency and make better over-all use of the unlicensed carrier.

Carrier aggregation with at least one SCell operating in an unlicensed spectrum may be referred to as LAA or NR-U (e.g., new radio unlicensed). In LAA, the configured set of serving cells for a wireless device may include at least one SCell. The at least one SCell may operate in the unlicensed spectrum according to a first frame structure (e.g., frame structure Type 3). The SCell may be called LAA SCell.

The maximum frequency separation between any two carrier center frequencies on which LAA SCell transmissions may be performed may be less than or equal to 62 MHz, for example, if the absence of at least some devices (e.g., IEEE802.11n/11ac-compliant devices) sharing the carrier cannot be guaranteed on a long term basis (e.g., by level of regulation). Additionally, or alternatively, the maximum frequency separation between any two carrier center frequencies on which LAA SCell transmissions may be performed may be less than or equal to 62 MHz, for example, if the maximum quantity (e.g., number) of unlicensed channels that the network may simultaneously transmit on is equal to or less than 4 (e.g., 1, 2, 3, 4). The wireless device may be required to support frequency separation.

A base station and/or a wireless device may apply LBT before performing a transmission on a LAA SCell. The transmitter (e.g., base station, wireless device) may monitor (e.g., listen to, sense) the channel to determine whether the channel is free or busy, for example, if LBT is applied. The transmitter may perform the transmission, for example, if the channel is determined to be idle (e.g., free, clear, etc.). The transmitter may not perform the transmission, for example, if the channel is determined to be busy (e.g., occupied). The base station may continue to meet the LAA maximum energy detection threshold requirement, for example, if the base station uses channel access signals of other technologies for the purpose of channel access.

A base station may signal to a wireless device which LBT type (e.g., type 1 or type 2 uplink channel access) to apply. The base station may signal the wireless device, for example, via an uplink grant for an uplink PUSCH transmission on LAA SCells. The LBT may not be signaled in the uplink grant, for example, for AUL transmissions.

FIG. 29 shows an example of channel access parameters of channel access priority classes. A base station may signal the channel access priority class for a logical channel, for example, for type 1 uplink channel access on AUL. The wireless device may select the highest channel access priority class (e.g., the lowest number in FIG. 29) from the logical channel(s) signaled by the base station. The logical channel may have MAC SDU multiplexed into the MAC PDU. MAC CEs may use the lowest channel access priority class. Padding BSR may not use the lowest channel access priority class. The wireless device may select logical channels corresponding to any channel access priority class, for example, for type 2 uplink channel access on AUL. The UL transmission in the subframes signaled by the base station may be provided in common downlink control signaling.

The base station may not grant (e.g., schedule) the wireless device more subframes than the minimum necessary to transmit the traffic corresponding to the selected channel access priority class or lower (e.g., with a lower number in FIG. 29), for example, for uplink LAA operation if type 1 uplink channel access procedure is signaled to the wireless device. Additionally, or alternatively, the base station may not grant (e.g., schedule) the wireless device more subframes than the channel access priority class signaled in an UL grant, for example, based on the latest BSR and/or received uplink traffic from the wireless device if type 1 uplink channel access procedure is signaled to the wireless device. The base station may not grant (e.g., schedule) the wireless device more subframes than the minimum necessary to transmit the traffic corresponding to the channel access priority class used by the base station, for example, based on the downlink traffic, the latest BSR, and/or received UL traffic from the wireless device if type 2 uplink channel access procedure is signaled to the wireless device.

A first quantity (e.g., number, such as four) of channel access priority classes may be used if performing uplink and/or downlink transmissions in LAA carriers. FIG. 29 shows which Channel Access Priority Class may be used by traffic belonging to different standardized QCIs. A non-standardized QCI (e.g., Operator specific QCI) may use a suitable channel access priority class. The suitable channel access priority class may be any channel access priority class that matches the traffic class of the non-standardized QCI.

AUL may be supported on the SCells. In some examples, one or more AUL configurations may be supported for each SCell. A plurality of AUL configurations may be active simultaneously, for example, if there is more than one SCell.

An information element (e.g., LBT-Config) in an RRC message may indicate one or more parameters for LBT operations at the wireless device. An energy detection threshold (e.g., maxEnergyDetectionThreshold) may indicate a maximum energy detection threshold value. The units for the energy detection threshold (e.g., maxEnergyDetectionThreshold) may be in decibel-milliwatts (dBm). For example, a value of −85 may correspond to −85 dBm, a value of −84 may correspond to −84 dBm, and so on (e.g., in steps of 1 dBm). The wireless device may use a default maximum energy detection threshold value, for example, if the field (e.g., maxEnergyDetectionThreshold) is not configured. An energy detection threshold offset (e.g., energyDetectionThresholdOffset) may indicate an offset to the default maximum energy detection threshold value. The units for the offset to energy detection threshold offset (e.g., energyDetectionThresholdOffset) may be in decibels (dB). For example, a value of −13 may correspond to −13 dB, a value of −12 may correspond to −12 dB, and so on (e.g., in steps of 1 dB).

An information element (e.g., laa-SCellSubframeConfig) may indicate a bit-map. The bit-map may indicate an unlicensed SCell subframe configuration. For example, a "1" in the bit-map information element may indicate (e.g., denote) that the corresponding subframe is allocated as an MBSFN subframe. The bit-map information element may be read (e.g., interpreted) as follows: starting with the most significant bit (e.g., from the first/leftmost bit in the bit-map), the allocation may apply to subframes #1, #2, #3, #4, #6, #7, #8, and/or #9. A cell and/or bandwidth part may be configured with an information element (e.g., CrossCarrierSchedulingConfigLAA). The information element may indicate a scheduling cell ID and/or a CIF value. An information element (e.g., schedulingCellId) may indicate which cell signals the downlink allocations and/or uplink grants for the concerned SCell. The scheduling cell may be part of the same cell group (e.g., MCG or SCG) as the scheduled cell, for example, if the wireless device is configured with DC. A scheduling cell (e.g., schedulingCellId) indicated in an information element (e.g., crossCarrierSchedulingConfig-LAA-UL) may indicate which cell signals the uplink grants, for example, if the wireless device is configured with the information element (e.g., crossCarrierSchedulingConfig-LAA-UL). An information element (e.g., cifInSchedulingCell) may indicate the CIF value used in the scheduling cell to indicate the cell.

A base station may schedule UL transmissions for a wireless device. The wireless device and/or the base station may perform one of a plurality of channel access procedures for the wireless device to access the channel(s) on which the unlicensed SCell(s) transmission(s) are performed. The wireless device may access a carrier on which unlicensed SCell(s) UL transmission(s) are performed, for example, based on one of the plurality of channel access procedures. The plurality of channel access procedures may comprise a first Type and/or a second Type channel access procedures. The wireless device may use the first type channel access procedure for transmitting (e.g., sending) transmissions, for example, if an UL grant scheduling a PUSCH transmission indicates a first type channel access procedure. The transmissions may include a PUSCH transmission. A wireless device may use a first type channel access procedure for transmitting (e.g., sending) transmissions on autonomous UL resources. As noted above, the transmissions may include a PUSCH transmission. The wireless device may use the second type channel access procedure for transmitting (e.g., sending) transmissions, for example, if an UL grant scheduling a PUSCH transmission indicates a second type channel access procedure. The transmissions may include a PUSCH transmission.

Figure 30:
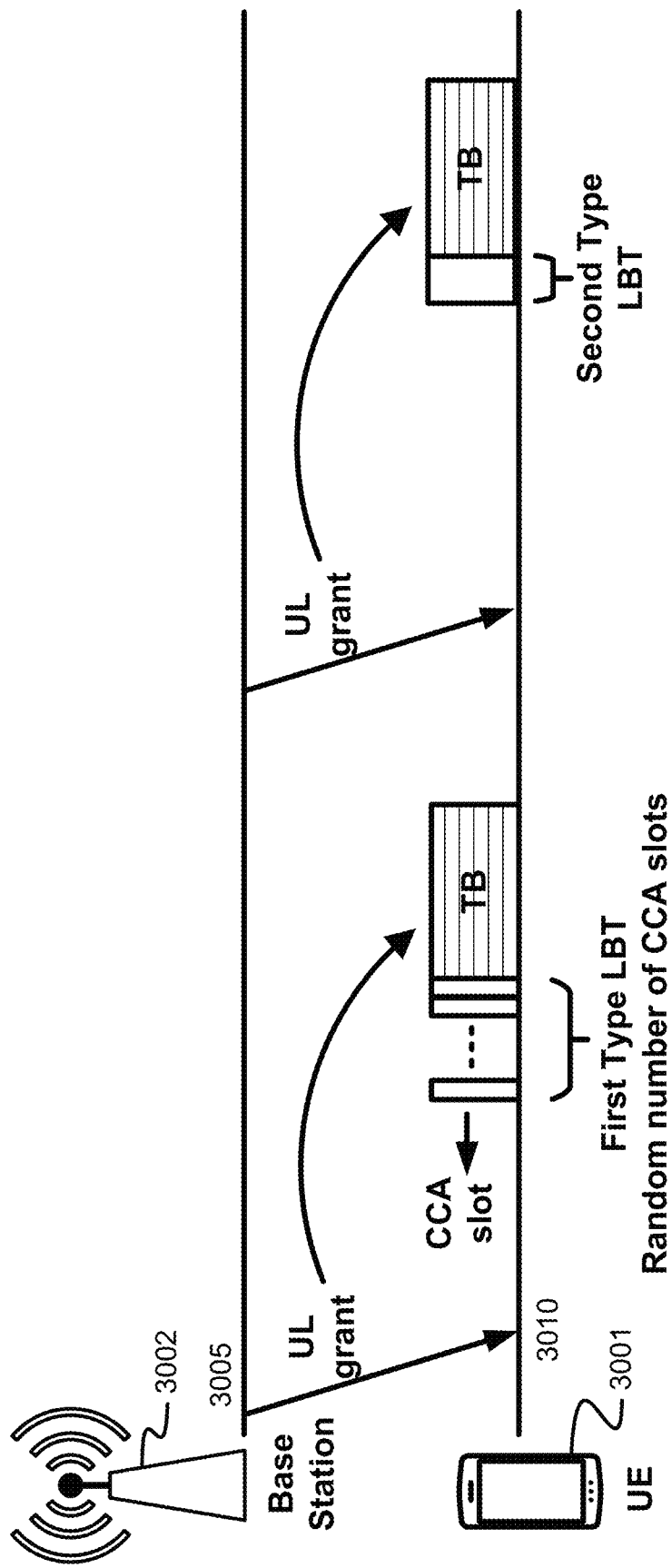
FIG. 30 shows an example of a listen-before-talk (LBT) procedure.

FIG. 30 shows an example of a channel access procedure for transmission in a LAA cell. At time 3005, a base station 3002 may transmit to a wireless device 3001 a command indicating a first PUSCH transmission based on a first type channel access procedure. The wireless device 3001 may receive the command at time 3010. The first type channel access procedure may be based on monitoring (e.g., sensing) the channel for a first quantity (e.g., number) of durations (e.g., CCA slots). The first number may be a first fixed value. The first quantity (e.g., number) may be based on a random number drawn from an interval based on a priority class. In some examples, channel access procedure for transmission of a second PUSCH may be based on a second type channel access procedure. The second type channel access procedure may be based on monitoring (e.g., sensing) the channel, for example, based on a second fixed duration. The wireless device 3001 may use the first type channel access procedure for transmitting SRS transmissions. The SRS transmissions may not include a PUSCH transmission. A first UL channel access priority class (e.g., p=1) may be used for SRS transmissions. The first UL channel access priority class may not be used for a PUSCH transmission.

The wireless device 3001 may attempt to send (e.g., transmit) an SRS transmission in a time duration (e.g., subframe/slot/mini-slot/TTI) n, for example, based on uplink channel access procedures specified for an SRS transmission. The wireless device 3001 may attempt to transmit the SRS transmission, for example, if the wireless device 3001 is scheduled to transmit PUSCH and/or SRS in subframe/slot/mini-slot/TTI n. Additionally, or alternatively, the wireless device 3001 may attempt to transmit the SRS transmission, for example, if the wireless device cannot access the channel for PUSCH transmission in the time duration (e.g., subframe/slot/mini-slot/TTI) n.

The wireless device 3001 accessing a carrier on which LAA SCell(s) transmission(s) are performed may set the energy detection threshold (e.g., $X_{Thresh}$) to be less than or equal to the maximum energy detection threshold (e.g., $X_{Thresh\_max}$). The maximum energy detection threshold (e.g., $X_{Thresh\_max}$) may be set to a value signaled by a higher layer parameter, for example, if the wireless device 3001 is configured with the higher layer parameter maxEnergyDetectionThreshold. The wireless device 3001 may determine the maximum energy detection threshold (e.g., $X'_{Thresh\_max}$), for example, based on a first procedure for determining energy detection threshold if the wireless device 3001 is not configured with the higher layer parameter. The maximum energy detection threshold (e.g., $X_{Thresh\_max}$) may be set by adjusting the maximum energy detection threshold (e.g., $X'_{Thresh\_max}$), for example, based on an offset value signaled by a higher layer parameter if the wireless device is configured with higher layer parameter (e.g., energyDetectionThresholdOffset). The wireless device 3001 may set $X_{Thresh\_max}=X'_{Thresh\_max}$, for example, if the wireless device 3001 is not configured with the higher layer parameter. The first procedure for determining the energy detection threshold may be as follows. If the higher layer parameter absenceOfAnyOtherTechnology indicates TRUE, $X'_{Thresh\_max}=\min(T_{max}+10\text{ dB}, X_r)$, where $X_r$ is a maximum energy detection threshold defined by regulatory requirements in dBm when such requirements are defined, otherwise $X_r=T_{max}+10$ dB. If the higher layer parameter absenceOfAnyOtherTechnology indicates false, $$X'_{Thres\_max} = \max\left\{ \begin{array}{l} -72 + 10\cdot\log10(BWMHz/20 \text{ MHz}) \text{ dBm,} \\ \min\left\{ \begin{array}{l} T_{max}, \\ T_{max} - T_A + (P_H + 10\cdot\log10(BWMHz/20 \text{ MHz}) - P_{TX}) \end{array} \right\} \end{array} \right\},$$

where $T_A$=10 dB, $P_H$=23 dBm, and $P_{TX}$ may be the set to the value of $P_{CMAX\_H,c}$.

Data transmission using different durations and/or different reliabilities (e.g., URLLC data and eMBB data) may be multiplexed in downlink communications for one or more wireless devices. A base station may transmit a group common signaling (e.g., a DCI with DCI format 2_1 and/or CRC scrambled by INT-RNTI) to a plurality of wireless devices, for example, if multiplexing a first type of data (e.g., a first type of URLLC data) for a first wireless device and a second type of data (e.g., a second type of URLLC data, or eMBB data) for a second wireless device. The group signaling may indicate whether one or more downlink radio resources in one or more slots are pre-empted. The base station may transmit the URLLC data (e.g. the first type of data) to the first wireless device on the one or more downlink radio resources, for example, based on the group common signaling.

A wireless device may have one or more URLLC data (e.g., with shorter transmission duration than eMBB data) for transmission in an uplink slot. The one or more URLLC data may be have a high priority (e.g., be very urgent). A base station may schedule an uplink radio resource for the one or more URLLC data in the uplink slot, for example, based on the priority of the one or more URLLC data. The one or more URLLC data may be scheduled with a higher priority than other data (e.g., eMBB), for example, if there are no available uplink radio resources in an uplink slot. In this regard, each of the uplink radio resources may have been allocated to other wireless devices. The wireless device may stop (e.g., abort, suspend) an ongoing uplink transmission (e.g., eMBB, or other data) on one or more uplink radio resources, for example, to schedule transmission of the one or more URLLC data. A base station may transmit a group common signaling to a plurality of wireless devices. The group common signaling may indicate whether one or more uplink radio resources are pre-empted and/or reserved for other transmission (e.g., URLLC transmission), for example, if the plurality of wireless devices are scheduling and/or transmitting uplink data on an uplink slot. The group common signaling may be a DCI with a DCI format and/or CRC scrambled by a group common RNTI.

A wireless device may transmit uplink data channel and/or control channel on an active UL BWP of the cell after the wireless device completes an LBT procedure successfully, for example, if communicating with a cell operating an unlicensed band. The wireless device may back-off for a period of time, for example, if a first LBT procedure on the active UL BWP failed. Additionally, or alternatively, the wireless device may perform a second LBT procedure, for example, if the first LBT procedure on the active UL BWP failed. The wireless device may transmit the uplink data channel and/or the control channel, for example, based on or in response to successfully completing the second LBT procedure. Delaying transmission of the uplink data channel and/or the control channel may not be allowed for certain services (e.g., URLLC, or V2X). A cell may simultaneously support a plurality active UL BWPs, for example, if operating an unlicensed band. The wireless device may perform a first LBT procedure and a second LBT procedure simultaneously, for example if a plurality of UL BWPs are active at the same time. The first LBT procedure and the second LBT procedure may be performed on a plurality UL active BWPs. The first LBT procedure and the second LBT procedure may be performed on an active BWP concurrently and/or consecutively. The wireless device may transmit the uplink data channel and/or the uplink control channel on an active BWP of the plurality of UL active BWPs on which the LBT procedure succeeded. The wireless device may select one of the plurality of UL active BWPs, for example, if more than one of the simultaneous LBT procedures succeed. The wireless device may perform LBT procedures on the multiple UL active BWPs sequentially, for example, if a plurality of UL BWPs are active simultaneously. The wireless device may perform a first LBT procedure on a first active BWP. The wireless device may perform a second LBT procedure on a second active BWP, for example, if the first LBT procedure fails. The wireless device may transmit the uplink data channel and/or the uplink control channel via an active BWP on which an LBT procedure succeeds.

A wireless device may transmit UCI on a PUCCH resource. The UCI may comprise at least one of: HARQ ACK; SR; and/or CSI. The UCI may comprise an ACK corresponding to message 4, for example, if the wireless device performs contention-based RACH procedure on the cell. The PUCCH resource may be indicated by an RRC message, a MAC CE, and/or a DCI. The wireless device may determine the PUCCH resource is on an active BWP of the cell, for example, if a DCI indicates the PUCCH resource. The wireless device may transmit the UCI on the PUCCH resource indicated by the DCI, for example, based on at least some systems (e.g., 5G-NR systems) supporting one active UL BWP in a cell. The wireless device may not able to determine which of the plurality of UL BWPs to transmit the UCI, for example, if multiple UL BWPs are in active state simultaneously. The base station may not detect the UCI, for example, if misalignment between the base station and the wireless device occurs. A base station and/or a wireless device may need to determine an active UL BWP from a plurality of active UL BWPs for UCI transmission, for example, if the base station and the wireless device communicate on a cell operating on an unlicensed band.

A wireless device may support a plurality of services (e.g., eMBB, URLLC, V2X, or mMTC). The plurality of services may have different service requirements (e.g., transmission latency, and/or transmission reliability). Multiplexing data transmissions of the plurality of services on an active BWP may cause interference and/or interruption. The wireless device may need to separate transmissions of the plurality of services on multiple active BWPs.

The wireless device may not able to determine on which UL BWP to transmit UCI, for example, if multiple UL BWPs are in an active state. An existing DCI format may not provide an indication of the UL BWP for transmission of UCI. The base station may not detect the UCI, for example, when misalignment between the base station and the wireless device occurs. The base station and/or the wireless device may need to determine an active UL BWP from a plurality of active UL BWPs for UCI transmission.

A wireless device may transmit HARQ ACK information, for example, based on receiving a transport block (TB) and/or at a transmission time determined based on receiving a DCI. The HARQ ACK information may be transmitted via an uplink active BWP of a cell, for example, based on or in response to receiving a TB on a DL active BWP of the cell. For a single cell, the uplink active BWP may be the only active BWP of the cell. However, the wireless device may not be able to determine which active uplink BWP should be used for HARQ ACK transmission, for example, if multiple uplink BWPs are active in the cell. Misalignment between the base station and the wireless device may occur, for example, if a method for determining an active uplink BWP has not been implemented for the base station and the wireless device. The base station may not detect the HARQ ACK, for example, if the base station monitors an uplink active BWP that is different from the uplink active BWP that the wireless device selects for HARQ ACK transmission.

Additionally, the wireless device may not be allowed to transmit the HARQ ACK information via multiple active BWPs of the cell. In some examples, the channel quality of PUCCH of an active BWP may not be reliable at the base station.

Further, a wireless device may not transmit HARQ ACK information, for example, if the wireless device fails a listen-before-talk procedure on an active uplink BWP. The active uplink BWP may be one of a plurality of uplink BWPs active in a cell operating an unlicensed frequency band. By not transmitting the HARQ ACK information, transmission latency may be increased and/or system throughput may be reduced.

A base station may transmit a DCI in a format, for example, which may improve HARQ ACK transmissions when multiple uplink BWPs are active. The DCI format may include one or more of: a downlink BWP indicator, an uplink BWP indicator, a PDSCH resource allocation, and/or a PUCCH resource allocation for HARQ ACK transmission. The wireless device may select an uplink active BWP from a plurality of uplink active BWPs of the cell, for example, based on, or in response to, the uplink BWP indicator received in the DCI. The uplink active BWP may be used for the HARQ ACK transmission. The wireless device may transmit the HARQ ACK information, for a TB received on a downlink BWP, via the selected active uplink BWP of the cell, for example, based on or in response to receiving a TB on a downlink BWP. The base station may dynamically indicate an uplink active BWP for HARQ ACK transmission. Additionally, or alternatively, the wireless device may select an active uplink BWP, from a plurality of active uplink BWPs, on which a listen-before-talk procedure indicates a clear channel. The wireless device may transmit HARQ ACK information via a PUCCH resource of the selected uplink active BWP. By allowing the wireless device to select an active uplink BWP, transmission latency may be reduced and/or system throughput may be increased.

The base station may transmit a BWP hopping indicator. The BWP hopping indicator may indicate whether the wireless device is allowed (e.g., permitted) to switch between two (or more) active uplink BWPs of a cell for HARQ ACK transmissions. The wireless device may transmit a first quantity (e.g., number) of HARQ ACK transmissions for a TB on a first active uplink BWP, for example, based on or in response to receiving the BWP hopping indicator. Additionally, or alternatively, the wireless device may transmit a second quantity (e.g., number) of HARQ ACK transmissions for the TB on a second active uplink BWP, for example, based on or in response to receiving the BWP hopping indicator. By using a BWP hopping indicator, the HARQ ACK transmission quality may be improved, for example, if multiple uplink BWPs are active in a cell.

As discussed in greater detail below, a base station and/or a wireless device may be provided mechanisms to determine an active UL BWP from a plurality of active UL BWPs for UCI transmission. Additionally, the base station and/or wireless device may be provided mechanisms to determine an active UL BWP from a plurality of active UL BWPs for uplink signal (e.g., SRS, and/or DMRS) transmission. These mechanisms may improve transmission latency and/or transmission reliability in cells configured with a plurality of active UL BWPs.

Figure 31A:
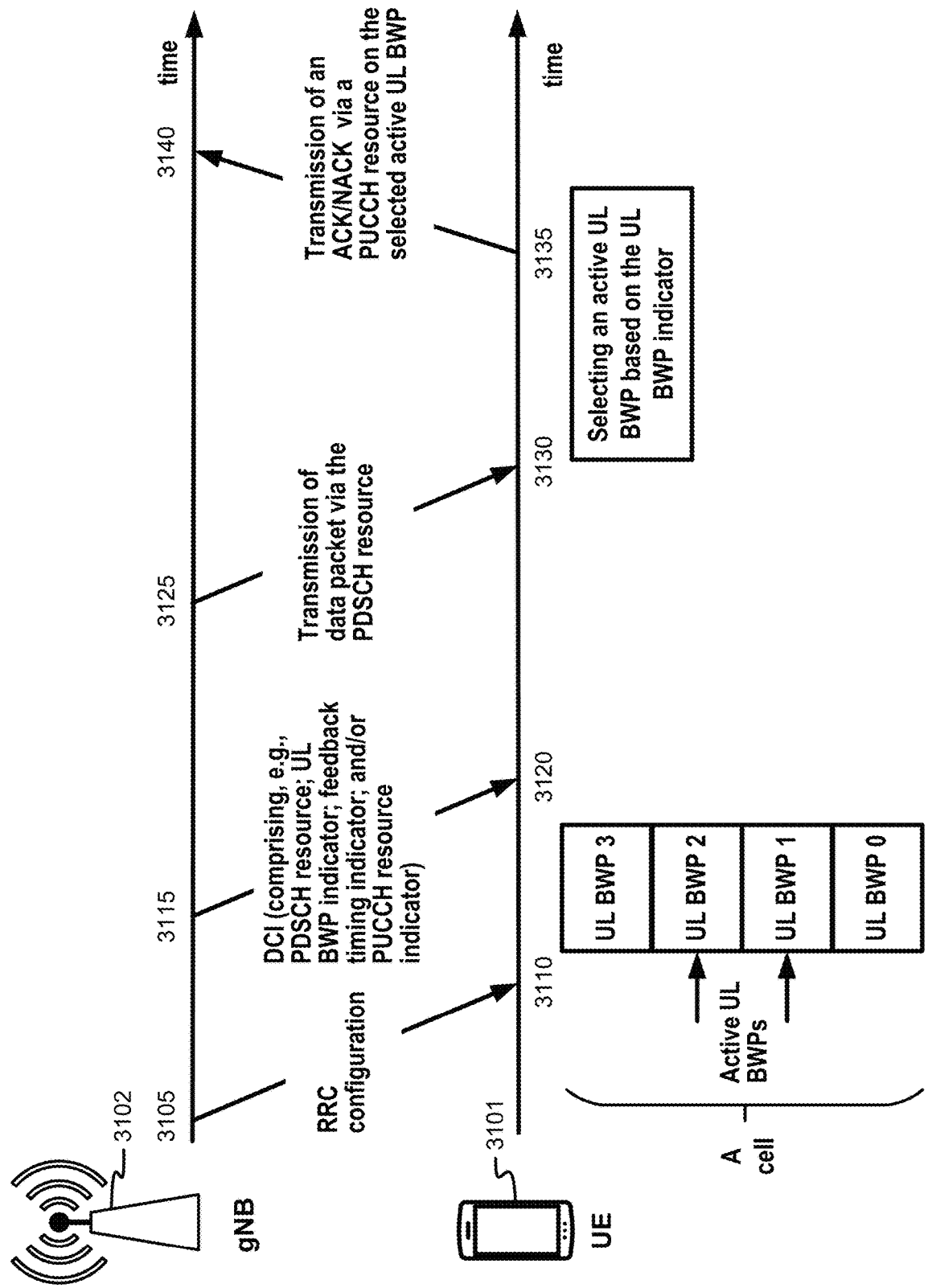
FIGS. 31A and 31B show an example of a UCI transmission in an active UL BWP.
Figure 31B:
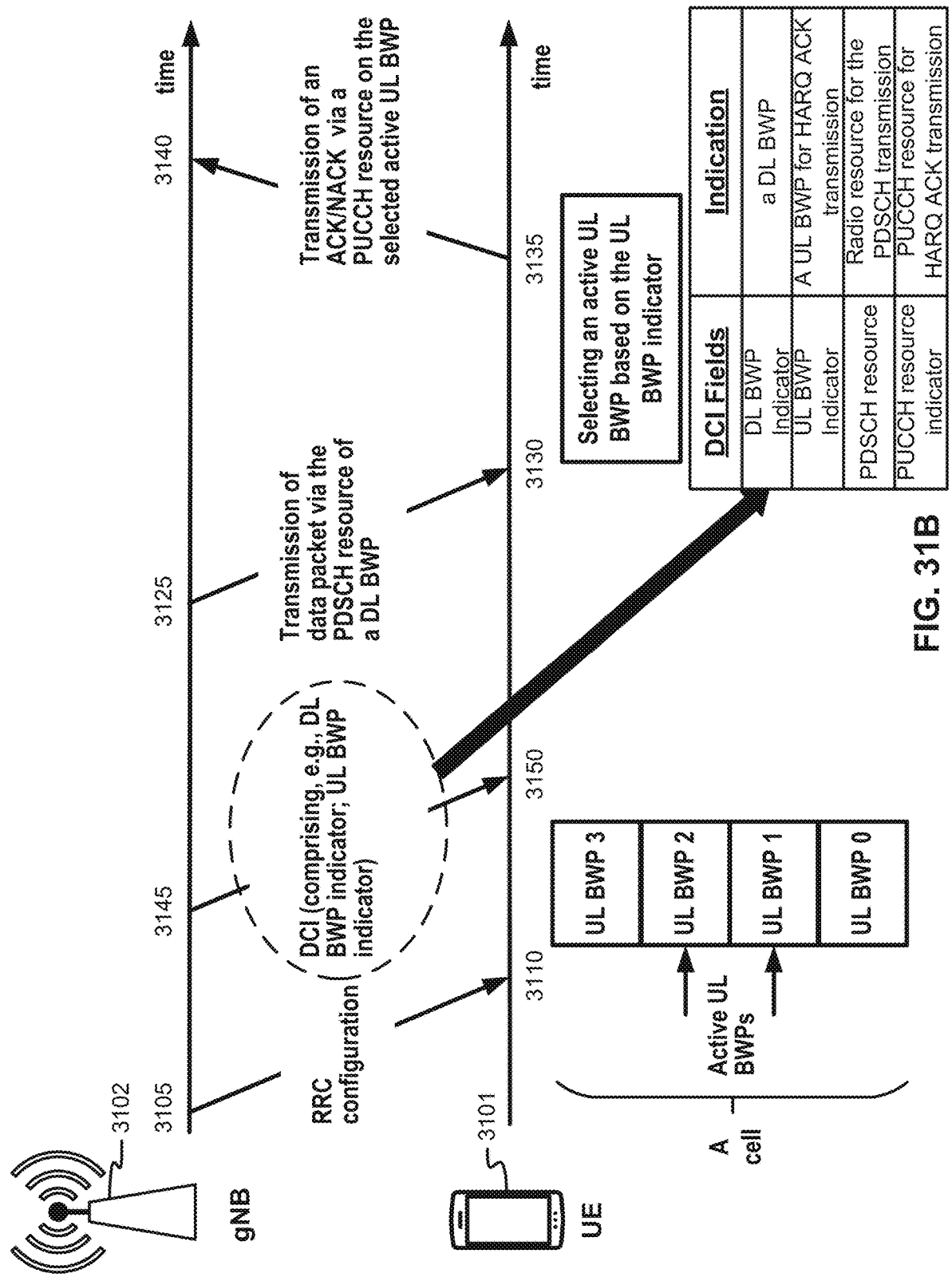

FIGS. 31A and 31B show an example of a UCI transmission if multiple UL BWPs of a cell are in active state simultaneously. Turning to FIG. 31A, a base station 3102 may transmit one or more RRC messages to a wireless device 3101 at time 3105. The one or more RRC messages may comprise configuration parameters for one or more UL BWPs of a cell. The cell may be a PCell or a PUCCH secondary cell. The configuration parameters for the one or more UL BWPs may comprise at least one of: configuration parameters of one or more PUCCH formats; configuration parameters of scheduling request resources (e.g., schedulingRequestResoruceToAddModList); one or more timing parameters of ACK information corresponding to PDSCH (e.g., dl-DataToUL-ACK); one or more PUCCH resources for multiplexing CSI (e.g., multi-CSI-PUCCH-ResourceList); one or more spatial relation information parameters (e.g., spatialRelationlnfoToAddModList); one or more PUCCH power control parameters (e.g., pucch-PowerControl); and/or one or more PUCCH resource sets. The one or more configuration parameters of a PUCCH format may comprise at least one of: an inter-slot frequency hopping indicator; an additional DMRS indicator; a code rate parameter (e.g., maxCodeRate); a PUCCH repetition parameter (e.g., nrofSlots); and/or a simultaneous ACK/CSI indicator (e.g., simultaneousHARQ-ACK-CSI). The PUCCH repetition parameter may be a value of 2, 4, or 8, in units of either slot or milliseconds. The PUCCH resource set may be indicated (e.g., identified) by a PUCCH resource set index (e.g., identifier). A PUCCH resource set may be configured with a plurality (or a list) of PUCCH resources and/or a quantity (e.g., number) of UCI bits. The wireless device 3101 may be allowed to transmit the quantity (e.g., number) of UCI bits using one of the plurality of PUCCH resources in the PUCCH resource set. The PUCCH resource may be identified by a PUCCH resource identifier (e.g., index). A PUCCH resource may be configured with: a starting PRB (e.g., startingPRB); an intra-slot frequency hopping indicator (e.g., intraSlotFrequencyHopping); a second hop PRB index (e.g., secondHopPRB); and/or a PUCCH format indicator. The wireless device 3101 may receive the one or more RRC messages at time 3110.

The wireless device 3101 may maintain at least two UL BWPs (e.g., UL BWP 1 and UL BWP 2) in an active state. The at least two UL BWPs may be active concurrently. At time 3115, the base station 3102 may transmit DCI via an active DL BWP. The DCI may comprise at least: a frequency resource indication for PDSCH transmission; a time resource indication for the PDSCH transmission; a HARQ ACK feedback timing indicator; a PUCCH resource indicator; a TPC command for PUCCH transmission; and/or an UL BWP indicator. The PUCCH resource indicator and the UL BWP indicator may be combined (e.g., organized) into a single BWP-PUCCH resource indicator. The single BWP-PUCCH resource indicator may indicate both an active UL BWP and/or a PUCCH resource on the active UL BWP. The single BWP-PUCCH resource indicator may have a quantity of bits (e.g., 4). The most significant bit (e.g., the leftmost bit) may indicate an active UL BWP from the at least two active UL BWPs. The least significant bit(s) (e.g., the rightmost 3 bits) may indicate, for example, one of the eight PUCCH resources discussed above with respect to FIG. 26.

The single BWP-PUCCH resource indicator may have a quantity of bits (e.g., 5). The most significant bits (e.g., the leftmost 2 bits) may indicate an active UL BWP from the at least two active UL BWPs (e.g., and at most 4 active UL BWPs). The least significant bits (e.g., the rightmost 3 bits) may indicate one of the eight PUCCH resources discussed above with respect to FIG. 26. At time 3120, the wireless device 3101 may receive the DCI from base station 3102. The UL BWP indicator in the DCI may indicate on which active UL BWP the wireless device 3101 may transmit UCI. Additionally, or alternatively, the wireless device 3101 may determine an active UL BWP, for example, based on the UL BWP indicator received in the DCI.

At time 3125, the base station 3102 may send (e.g., transmit) a data packet, via the PDSCH resource (e.g., time/frequency), to the wireless device 3101. At time 3130, the wireless device 3101 may detect the data packet, for example, based on or in response to the DCI, via the PDSCH resource. The wireless device 3101 may determine HARQ ACK information, for example, based on whether the detection is successful. The wireless device 3101 may determine a positive acknowledgement (e.g., ACK) for the HARQ ACK information, for example, based on or in response to the detection being successful. The wireless device 3101 may determine a negative acknowledgement (e.g., NACK) for the HARQ ACK information, for example, based on or in response to the detection being unsuccessful.

At time 3135, the wireless device 3101 may transmit the HARQ ACK information to base station 3102. The HARQ ACK information may be transmitted via a PUCCH resource indicated by the PUCCH resource indicator on the determined active UL BWP. The wireless device 3101 may determine the PUCCH resource from one PUCCH resource set of the one or more PUCCH resource sets. The wireless device 3101 may determine the one PUCCH resource set, for example, based on one or more UCI bits comprising the HARQ ACK information. The wireless device 3101 may select a first PUCCH resource set with the PUCCH resource set index equal to "0," for example, if a bit length of the one or more UCI bits is less than or equal to 2. The wireless device 3101 may select a second PUCCH resource set with the PUCCH resource set index equal to "1," for example, if the bit length of UCI information bits is greater than 2 and less than or equal to a first configured value. The wireless device 3101 may select a third PUCCH resource set with the PUCCH resource set index equal to "2," for example, if the bit length of UCI information bits is greater than the first configured value and less than or equal to a second configured value. The wireless device 3101 may select a fourth PUCCH resource set with the PUCCH resource set index equal to "3," for example, if the bit length of UCI information bits is greater than the second configured value and less than or equal to a third value (e.g., 1706). The wireless device 3101 may transmit UCIs comprising the HARQ ACK information via the PUCCH resource of the determined active UL BWP. The UCIs may be transmitted with a transmission power based on a TPC command for PUCCH transmission. The TPC command may be applied on whichever active UL BWP the wireless device 3101 selects (e.g., determines) for the UCI transmission. The TPC command may be applied with an offset value (e.g., −1 dB, 1 dB, 3 dB, any value in dB) on an active UL BWP. The offset value may depend on which one of the at least two active UL BWPs the wireless device 3101 selects.

The base station 3102 may monitor the PUCCH resource on the active UL BWP indicated by the UL BWP indicator, for example, based on or in response to transmitting the data packet on the PDSCH. At time 3140, the base station 3102 may receive the HARQ ACK information from the wireless device 3101. The base station 3102 may determine whether to transmit a new data packet and/or retransmit the data packet, for example, based on the HARQ ACK information received on the PUCCH resource. The base station 3102 may determine (e.g., consider) the transmission of the data packet successful, for example, if the HARQ ACK information indicates a positive acknowledgement (e.g., ACK). The base station 3102 may determine (e.g., consider) the transmission of the data packet unsuccessful, for example, if the HARQ ACK information indicates a negative acknowledgement (e.g., NACK). The base station 3102 may retransmit the data packet, for example, based on or in response to determining that the transmission of the data packet was unsuccessful.

FIG. 31B shows an example of a UCI transmission if multiple UL BWPs of a cell are in active state simultaneously. As discussed above with respect to FIG. 31A, a base station 3102 may transmit one or more RRC messages to a wireless device 3101 at time 3105. At time 3110, the wireless device 3101 may receive the one or more RRC messages at time 3110. The wireless device 3101 may maintain at least two active UL BWPs (e.g., UL BWP 1 and UL BWP 2). At time 3115, the base station 3102 may transmit DCI via an active DL BWP. The DCI may be a new format that comprises: a DL BWP indicator, a UL BWP indicator, a PDSCH resource, and/or a PUCCH resource indicator. The DL BWP indicator may indicate (e.g., identify) a DL BWP on which a wireless device may monitor and/or receive a data packet. The UL BWP indicator in the DCI may indicate on which active UL BWP the wireless device 3101 may transmit UCI (e.g., HARQ ACK information). Additionally, or alternatively, the wireless device 3101 may determine an active UL BWP, for example, based on the UL BWP indicator received in the DCI. The PDSCH resource may indicate the radio resource used for the PUCCH transmission. The PUCCH resource indicator field may indicate one of eight PUCCH resources in the PUCCH resource set. Additionally, the PUCCH resource indicator field may indicate the PUCCH resource for HARQ ACK transmission.

At time 3125, the base station 3102 may send (e.g., transmit) a data packet, via the PDSCH resource (e.g., time/frequency), to the wireless device 3101. At time 3130, the wireless device 3101 may detect the data packet, for example, based on or in response to the DCI, via the PDSCH resource. The wireless device 3101 may determine HARQ ACK information, for example, based on whether the detection is successful. The wireless device 3101 may determine a positive acknowledgement (e.g., ACK) for the HARQ ACK information, for example, based on or in response to the detection being successful. The wireless device 3101 may determine a negative acknowledgement (e.g., NACK) for the HARQ ACK information, for example, based on or in response to the detection being unsuccessful. At time 3135, the wireless device 3101 may transmit the HARQ ACK information to base station 3102. At time 3140, the base station 3102 may receive the HARQ ACK information from the wireless device 3101. The base station 3102 may determine whether to transmit a new data packet and/or retransmit the data packet, for example, based on the HARQ ACK information received on the PUCCH resource. The base station 3102 may determine (e.g., consider) the transmission of the data packet successful, for example, if the HARQ ACK information indicates a positive acknowledgement (e.g., ACK). The base station 3102 may determine (e.g., consider) the transmission of the data packet unsuccessful, for example, if the HARQ ACK information indicates a negative acknowledgement (e.g., NACK). The base station 3102 may retransmit the data packet, for example, based on or in response to determining that the transmission of the data packet was unsuccessful.

FIG. 32A shows an example of partially, concurrently active UL BWPs. In this regard, multiple UL BWPs may be concurrently (e.g., simultaneously) active in a cell. The UL BWPs may be partially or fully active. A first UL BWP 3210 (e.g., UL BWP 1) may be active during a first time period. A second UL BWP 3220 (e.g., UL BWP 2) may be active during a second time period. The first time period may overlap with the second time period.

FIG. 32B shows an example of fully, concurrently active UL BWPs. A first UL BWP 3210 (e.g., UL BWP 1) may be active in a first time period. A second UL BWP 3220 (e.g., UL BWP 2) may be active in a second time period. The first time period may fully overlap with the second time period.

Figure 33A:
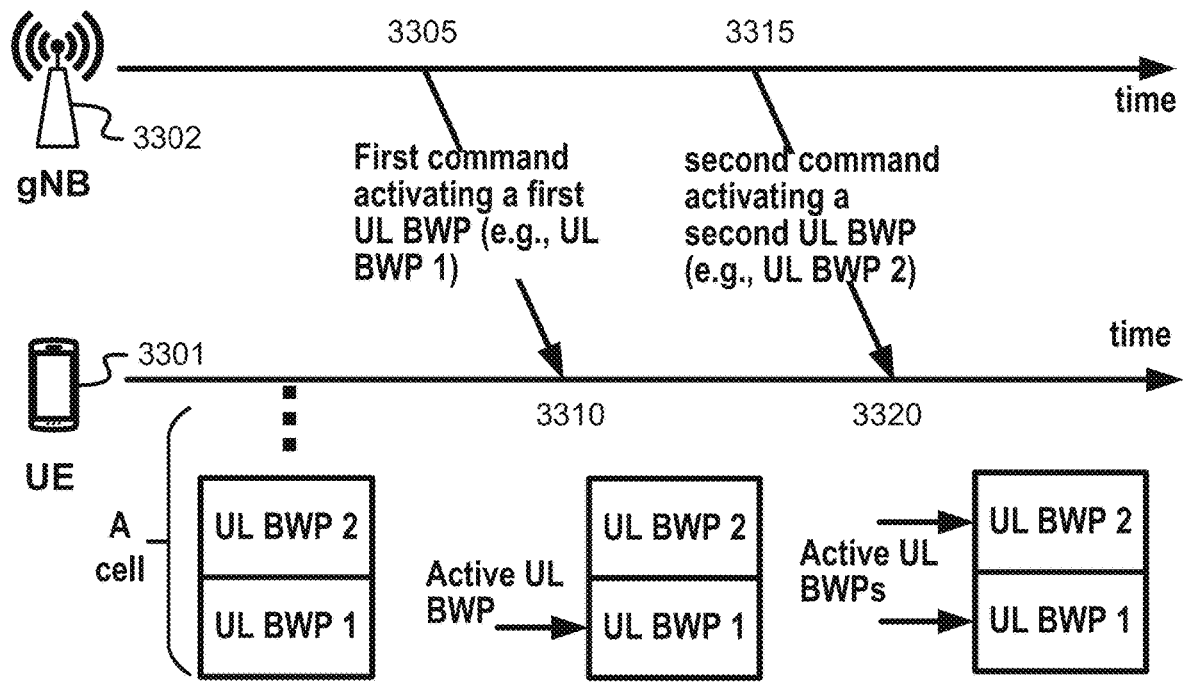
FIGS. 33A and 33B show examples of activating multiple active BWPs.

FIG. 33A shows an example of activating two UL BWPs separately or independently. A wireless device 3301 may activate at least two UL BWPs of a cell at the same time (e.g., simultaneously, together). Alternatively, the wireless device 3301 may activate at least two UL BWPs of the cell at different time (e.g., separately, independently). At time 3305, a base station 3302 may transmit a first command activating a first UL BWP. The first command may comprise at least one of: an RRC message; a MAC CE; and/or DCI. At time 3310, a wireless device 3301 may receive the first command. The wireless device may activate the first UL BWP, for example, based on or in response to receiving the first command. The wireless device 3301 may transmit uplink data channel, uplink control channel, and/or uplink signals on the first UL BWP, for example, based on or in response to the first UL BWP being in an active state. At time 3315, the base station 3302 may transmit a second command activating a second UL BWP (e.g., UL BWP 2). The second command may comprise at least one of: an RRC message; a MAC CE; and/or DCI. At time 3320, the wireless device 3301 may receive the second command. The wireless device 3301 may activate the second UL BWP (e.g., UL BWP 2), for example, based on or in response to receiving the second command. The wireless device 3301 may transmit uplink data channel, uplink control channel, and/or uplink signals on the second UL BWP (e.g., UL BWP 2), for example, based on or in response to the second UL BWP being in an active state. The wireless device may transmit uplink data channel, uplink control channel, and/or uplink signals on the first UL BWP and/or the second UL BWP, for example, based on or in response to the first UL BWP and the second UL BWP being in an active state simultaneously (e.g., partially or fully).

Figure 33B:
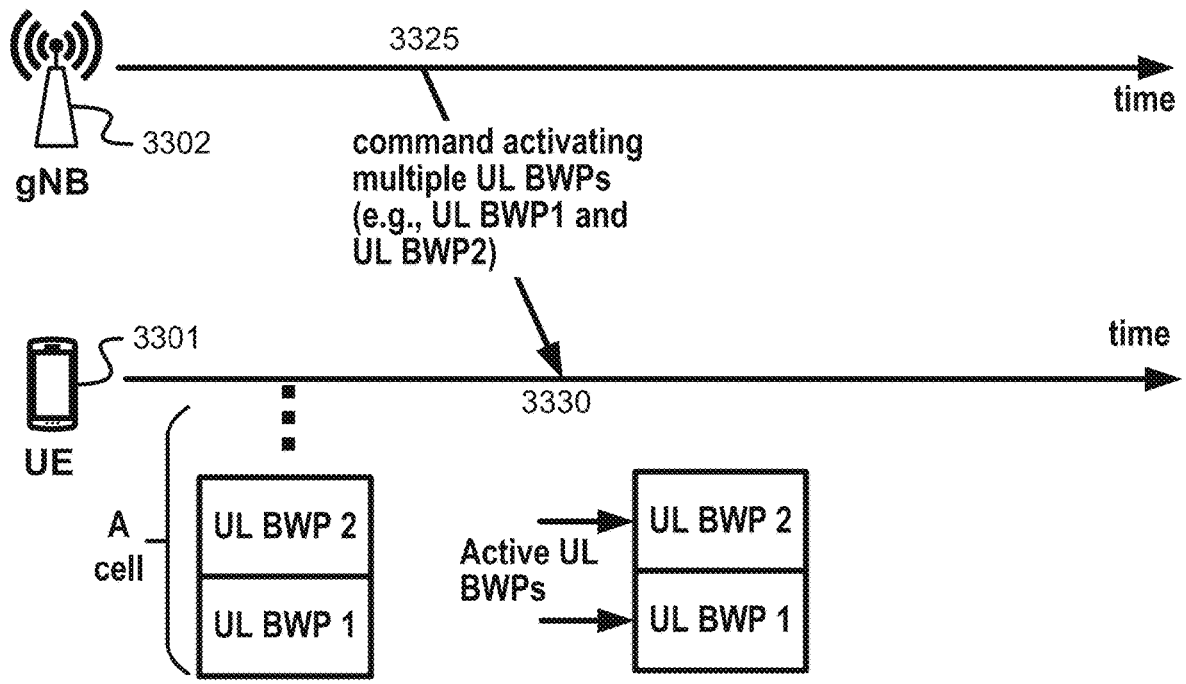

FIG. 33B shows an example of activating two UL BWPs simultaneously (e.g., together). At time 3325, a base station 3302 may transmit a command activating a first UL BWP (e.g., UL BWP 1) and a second UL BWP (e.g., UL BWP 2). The command may comprise at least one of: an RRC message; a MAC CE; and/or a DCI. At time 3330, a wireless device 3301 may receive the command from the base station 3302. The wireless device 3301 may activate the first UL BWP and the second UL BWP, for example, based on or in response to receiving the command. The wireless device 3301 may transmit uplink data channel, uplink control channel, and/or uplink signals on the first UL BWP and/or the second UL BWP, for example, based on or in response to the first UL BWP and the second UL BWP being in an active state simultaneously (e.g., partially or fully).

A base station and/or a wireless device may include a mechanism to determine an active UL BWP from a plurality of active UL BWPs. The active UL BWP may be used for UCI transmission(s). The mechanism may improve transmission latency and/or transmission reliability when configured with the plurality of active UL BWPs. DCI for downlink assignment may include an UL BWP indicator. The UL BWP indicator may be a single bit, for example, if no more than two active BWPs are supported in a cell. Additionally, or alternatively, the UL BWP indicator may comprise a plurality of bits (e.g., 2 or more), for example, if more than two active BWPs are supported in a cell.

Adding the UL BWP indicator in the DCI may increase the payload size of the DCI. Increasing the payload size of the DCI may be acceptable, for example, if the channel quality between the base station and the wireless device is good (e.g., above a threshold value). Additionally, or alternatively, increasing the payload size of the DCI may be acceptable, for example, if the load on the downlink control channel is light. Increasing the payload size of the DCI may impact transmission reliability, for example, if the wireless device is at an edge of a base station's coverage. In some examples, the impact on transmission reliability caused by the increased the payload size of the DCI may be reduced.

A quantity (e.g., number) of PUCCH resources in a PUCCH resource set may be reduced. One or more PUCCH resources may be configured (e.g., allocated, defined, set) in one or more RRC messages. For example, the quantity (e.g., number) of PUCCH resources in a PUCCH resource set may be reduced to any quantity (e.g., from 8 to 4). Reducing the quantity (e.g., number) of PUCCH resources in RRC message may reduce the quantity (e.g., number) of bits required for indicating one of the quantity (e.g., number) of PUCCH resources. A base station may indicate a first PUCCH resource using a fewer bits (e.g., 2 bits) in the DCI, for example, if the quantity (e.g., number) of PUCCH resources configured by the RRC messages is reduced (e.g., from 8 to 4). A 3-bit PUCCH resource indicator (e.g., field) in the DCI may indicate: one of the PUCCH resources (e.g., using the 2 most significant (e.g., rightmost) bits in the 3-bit PUCCH resource indicator, using the 2 least significant bits (e.g., left most) in the 3-bit PUCCH resource indicator); and one of the two active UL BWPs (e.g., the least significant bit (e.g., leftmost) bit in the 3-bit PUCCH resource indicator, the most significant bit (e.g., rightmost) bit in the 3-bit PUCCH resource indicator). For example, a wireless device may receive a DCI for downlink assignment that comprises a 3-bit PUCCH resource indicator. The wireless device may determine a first UL BWPs from the two simultaneously, active UL BWPs for UCI transmission, for example, based on one bit (e.g., the most significant bit, the least significant bit) of the 3-bit PUCCH resource indicator. The wireless device may select a first UL BWP from the two UL BWPs, for example, if the bit is set to "0." The first UL BWP may have a lower UL BWP index among the two simultaneously, active UL BWPs. The wireless device may select a second UL BWP, for example, if the bet is set to "1." The second UL BWP may have a higher UL BWP index among the two UL BWPs. The wireless device may determine (e.g., select) one of a plurality of PUCCH resources, for example, based on two bits (e.g., most significant, least significant) of the 3-bit PUCCH resource indicator. The wireless device may send (e.g., transmit) the UCI. The UCI may be transmitted via the determined PUCCH resource on the determined UL BWP. A base station and/or a wireless device may include a mechanism to determine an active UL BWP from a plurality of active UL BWPs for UCI transmission. Additionally, the mechanism may maintain a payload size of DCI that is the same payload size as existing DCI (e.g., DCI format 1_0/ 1_1). Further, the mechanism may maintain the same blind decoding complexity as existing technology, while providing additional information (e.g., uplink active BWP) in a DCI for supporting multiple active UL BWPs.

A wireless device may receive from a base station DCI. The DCI may comprise: a downlink BWP indicator; an UL BWP indicator; and/or a PUCCH resource indicator. The wireless device may receive a data packet via a downlink BWP indicated by the downlink BWP indicator. The wireless device may determine that a first UL BWP and a second UL BWP are both (e.g., concurrently, simultaneously) active in a cell. The wireless device may select an UL BWP from the first UL BWP and the second UL BWP, for example, based on or in response to determining that the first UL BWP and the second BWP are both active in the cell and based on the UL BWP indicator. The wireless device may send (e.g., transmit) acknowledgement information for the data packet on the selected UL BWP. The acknowledgement information may be transmitted via a PUCCH resource indicated by the PUCCH resource indicator. The first UL BWP and the second UL BWP being concurrently active may comprise the first UL BWP being active during at least a portion of a time when the second UL BWP is active.

Figure 34:
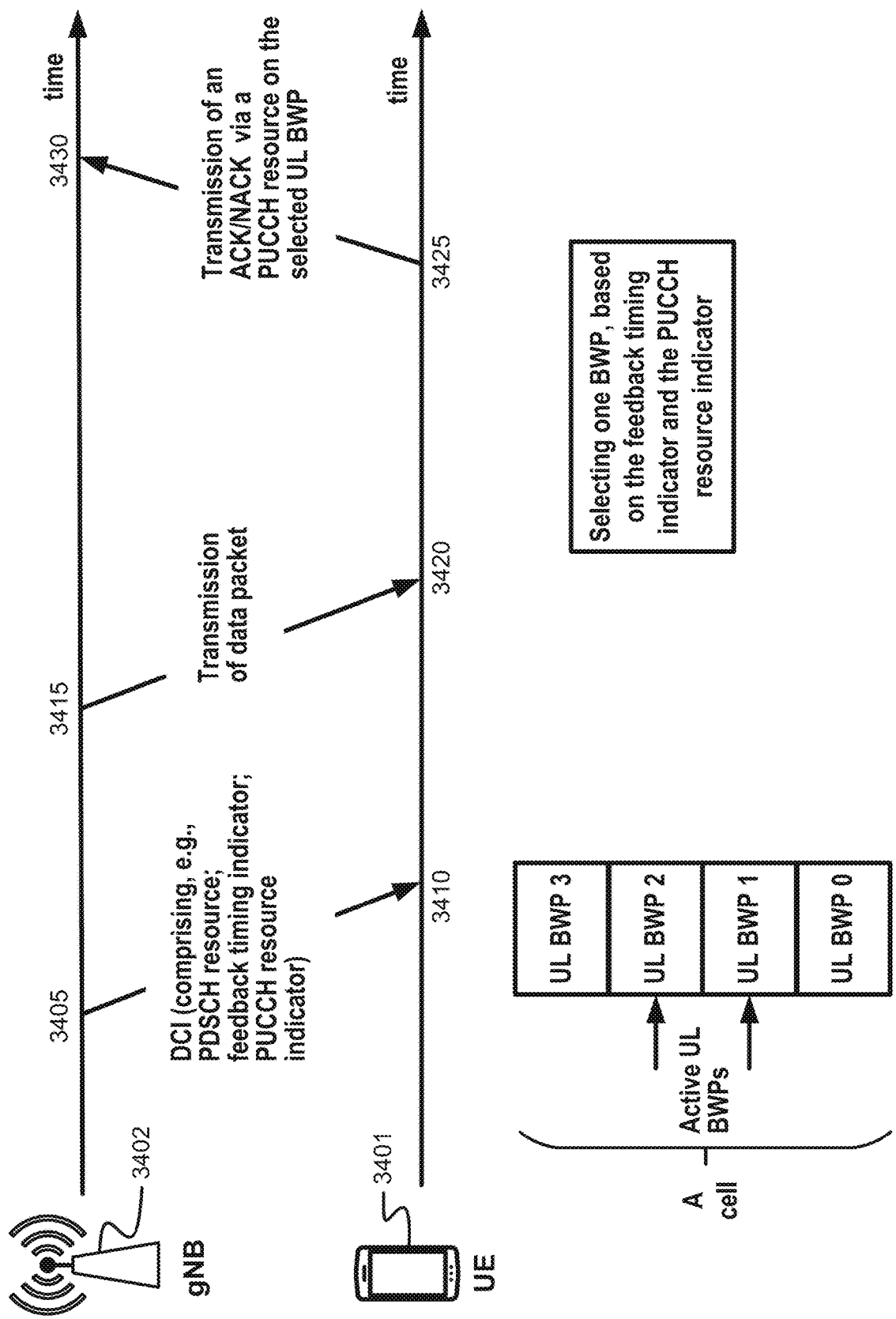
FIG. 34 shows an example of a UCI transmission in an active UL BWP.

FIG. 34 shows an example of UCI transmission if multiple UL BWPs are active during overlapping periods (e.g., simultaneously). At time 3405, a base station 3402 may send (e.g., transmit), to a wireless device 3401, one or more RRC messages. The one or more RRC messages may comprise configuration parameters for UL BWPs of a cell. The cell may be a PCell or a PUCCH secondary cell. The configuration parameters may comprise at least one of: configuration parameters of one or more PUCCH formats; configuration parameters of scheduling request resources (e.g., schedulingRequestResoruceToAddModList); one or more timing parameters of ACK information corresponding to PDSCH (e.g., dl-DataToUL-ACK); one or more PUCCH resources for multiplexing CSI (e.g., multi-CSI-PUCCH-ResourceList); one or more spatial relation information parameters (e.g., spatialRelationlnfoToAddModList); one or more PUCCH power control parameters (e.g., pucch-PowerControl); and/or one or more PUCCH resource sets. The wireless device 3401 may receive the one or more RRC messages from the base station 3402 at time 3410.

The wireless device 3401 may maintain at least two UL BWPs (e.g., UL BWP 1 and UL BWP 2) in an active state. The at least two UL BWPs may be active simultaneously (e.g., concurrently). At time 3405, the base station 3402 may transmit DCI via an active DL BWP. The DCI may comprise at least one of: a frequency resource indication for PDSCH transmission; a time resource indication for the PDSCH transmission; a HARQ ACK feedback timing indicator; and/or a PUCCH resource indicator. The DCI may be of an existing DCI format (e.g., DCI format 1_0/1_1 defined in a NR system). The DCI may not comprise an UL BWP indicator. At time 3410, the wireless device 3401 may receive the DCI via the active DL BWP.

At time 3415, the base station 3402 may transmit a data packet via a PDSCH resource (e.g. time/frequency). At time 3420, the wireless device 3401 may detect the data packet, for example, based on or in response to receiving the DCI. The wireless device 3401 may determine HARQ ACK information based on whether the detection is successful. The wireless device may determine the HARQ ACK information as a positive acknowledgement (e.g., ACK), for example, based on or in response to the detection being successful. The wireless device may determine the HARQ ACK information as a negative acknowledgement (e.g., NACK), for example, based on or in response to the detection being unsuccessful.

The wireless device 3401 may select an active UL BWP from the at least two active UL BWPs (e.g., UL BWP 1 and UL BWP 2), for example, based on or in response to the DCI. The wireless device 3401 may select the active UL BWP based on at least one of: the HARQ ACK feedback timing indicator; one or more configuration parameters of the at least two active UL BWPs; and/or the PUCCH resource indicator. The one or more configuration parameters may comprise at least one of: UL BWP identifiers of the at least two active UL BWPs; and/or numerologies of the at least two active UL BWPs. The wireless device 3401 may select an active UL BWP, from the at least two active UL BWPs, for example, based on or in response to the DCI. The selected active UL BWP may be selected, for example, based on a UL BWP identifier. For example, the wireless device 3401 may select an UL BWP that has a lower UL BWP identifier among UL BWP identifiers of the at least two active UL BWPs. Alternatively, the wireless device 3401 may select the UL BWP that has a higher UL BWP identifier amongst the UL BWP identifiers of the active BWPs. The wireless device 3401 may select an active UL BWP from the at least two active UL BWPs, for example, based on or in response to the DCI. The selected active UL BWP may have a lower (or higher) numerology index amongst the plurality of numerology indexes associated with the active UL BWPs.

At time 3425, the wireless device 3401 may transmit the HARQ ACK information to base station 3402. The HARQ ACK information may be transmitted via a PUCCH resource indicated by the PUCCH resource indicator on the determined active UL BWP. The base station 3402 may monitor the PUCCH resource on the active UL BWP indicated by the UL BWP indicator, for example, based on or in response to transmitting the data packet. At time 3430, the base station 3402 may receive the HARQ ACK information from the wireless device 3401. The base station 3402 may determine whether to transmit a new data packet and/or retransmit the data packet, for example, based on the HARQ ACK information received on the PUCCH resource. The base station 3402 may determine (e.g., consider) the transmission of the data packet successful, for example, if the HARQ ACK information indicates a positive acknowledgement (e.g., ACK). The base station 3402 may determine (e.g., consider) the transmission of the data packet unsuccessful, for example, if the HARQ ACK information indicates a negative acknowledgement (e.g., NACK). The base station 3402 may retransmit the data packet, for example, based on or in response to determining that the transmission of the data packet was unsuccessful.

Figure 35:
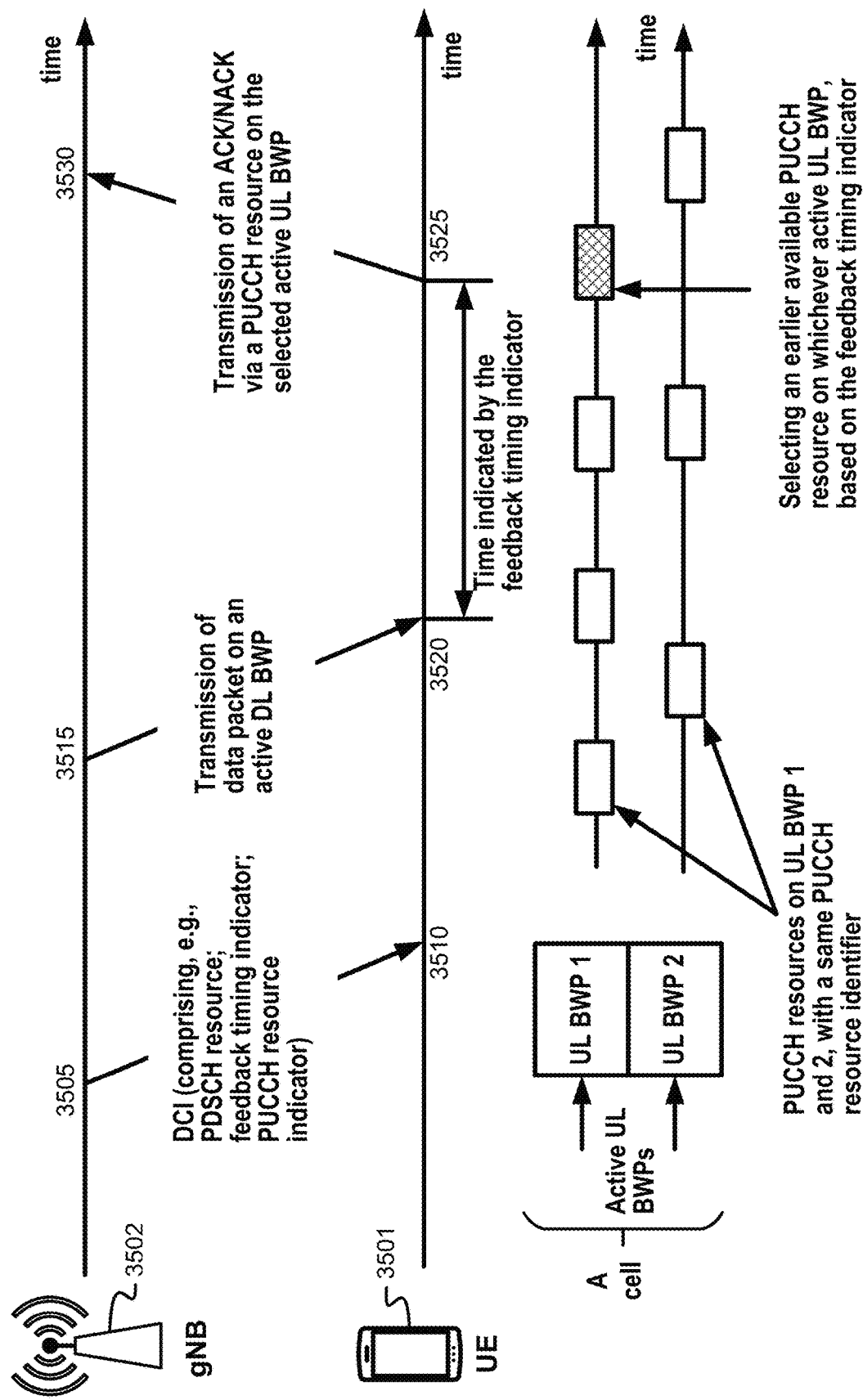
FIG. 35 shows an example of a UCI transmission in an active UL BWP.

FIG. 35 shows an example of UL BWP selection for UCI transmission. At time 3505, a base station 3502 may transmit a DCI to a wireless device 3501. The wireless device 3501 may select an active UL BWP from the at least two active UL BWPs, for example, based on or in response to the DCI. The wireless device 3501 may select the active UL BWP, for example, based on a PUCCH resource indicator and/or the HARQ ACK feedback timing indicator. A first PUCCH resource on a first UL BWP (e.g., UL BWP 1) and a second PUCCH resource on a second UL BWP (e.g., UL BWP 2) may have the same PUCCH resource identifier. The PUCCH resource indicator may indicate (e.g., identify, schedule) the first PUCCH resource on the first UL BWP and/or the second PUCCH resource on the second UL BWP. The wireless device 3501 may select an earlier available PUCCH resource from among the first PUCCH resource and/or the second PUCCH resource. The earlier available PUCCH resource may occur a number of slot/symbols/mini-slots after receiving the PDSCH. The number may be indicated by the HARQ ACK feedback timing indicator. As shown in FIG. 35, the selected PUCCH resource may be the first PUCCH resource on the first UL BWP (e.g., UL BWP 1). The first PUCCH resource may satisfy (e.g., meet) the requirements of the HARQ ACK feedback timing indicated by the HARQ ACK feedback timing indicator.

At time 3515, the base station 3502 may transmit a data packet on an active DL BWP. At time 3520, the wireless device 3501 may detect the data packet, for example, based on or in response to receiving the DCI. The wireless device 3501 may determine HARQ ACK information based on whether the detection is successful. At time 3525, the wireless device 3501 may send (e.g., transmit) the HARQ ACK information for the data packet to the base station 3502. The HARQ ACK information may be transmitted via the first PUCCH resource on the first UL BWP. The base station 3502 may monitor PUCCH resources (e.g., the first PUCCH resource and/or the second PUCCH resource) on one or more of the at least two active UL BWPs, for example, based on or in response to transmitting the data packet on the PDSCH. At time 3530, the base station 3502 may receive the HARQ ACK information from the wireless device 3501. The base station 3502 may determine whether to transmit a new data packet or retransmit the data packet, for example, based on the HARQ ACK information received on the PUCCH resources. The base station 3502 may determine (e.g., consider) the transmission of the data packet to be successful, for example, if the HARQ ACK information indicates a positive acknowledgement (e.g., ACK). The base station 3502 may determine (e.g., consider) the transmission of the data packet to be unsuccessful, for example, if the HARQ ACK information indicates a negative acknowledgement (e.g., NACK). The base station 3502 may retransmit the data packet, for example, if the transmission of the data packet is determined to be unsuccessful.

Figure 36A:
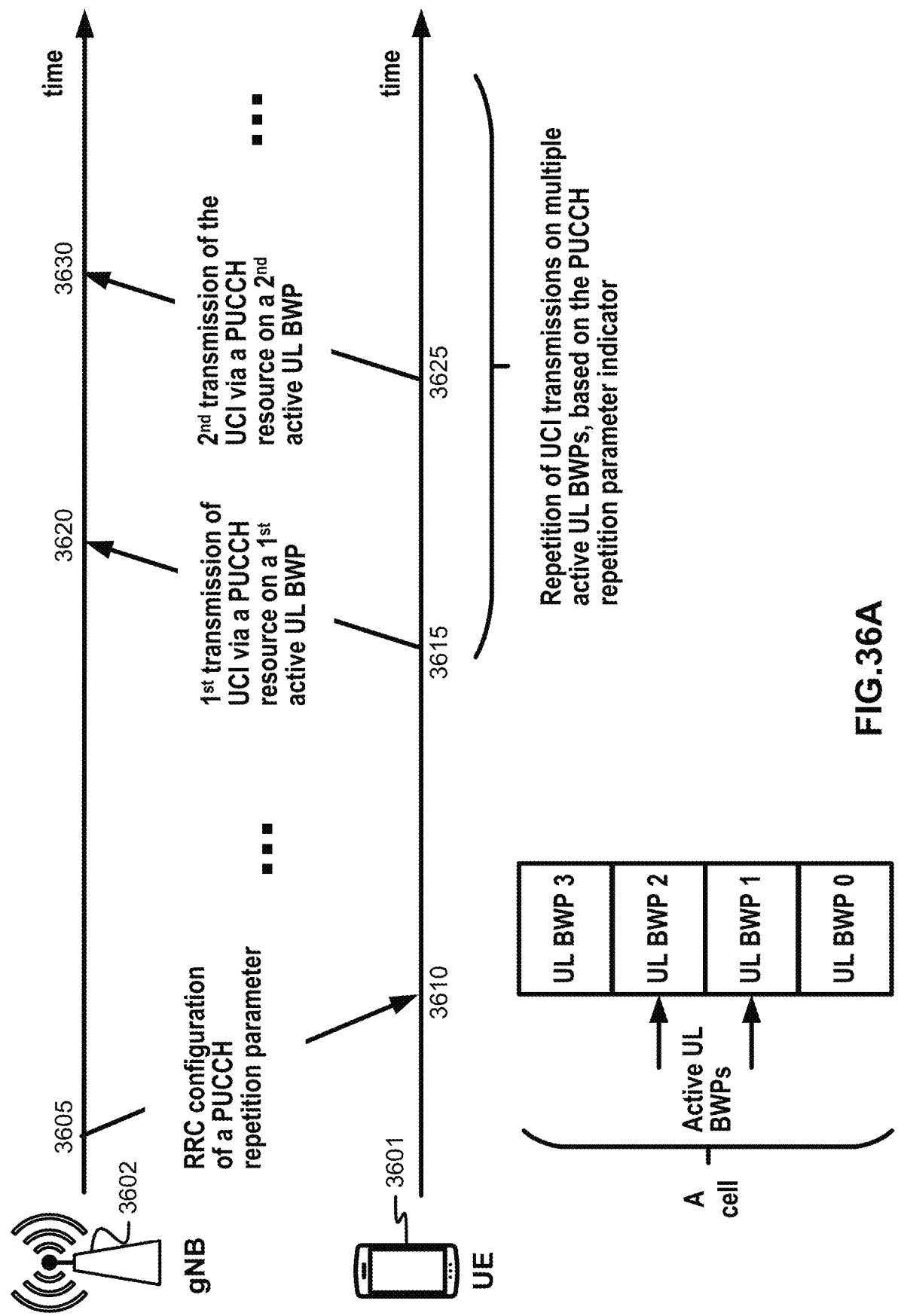
FIGS. 36A and 36B show an example of a UCI transmission with repetition.
Figure 36B:
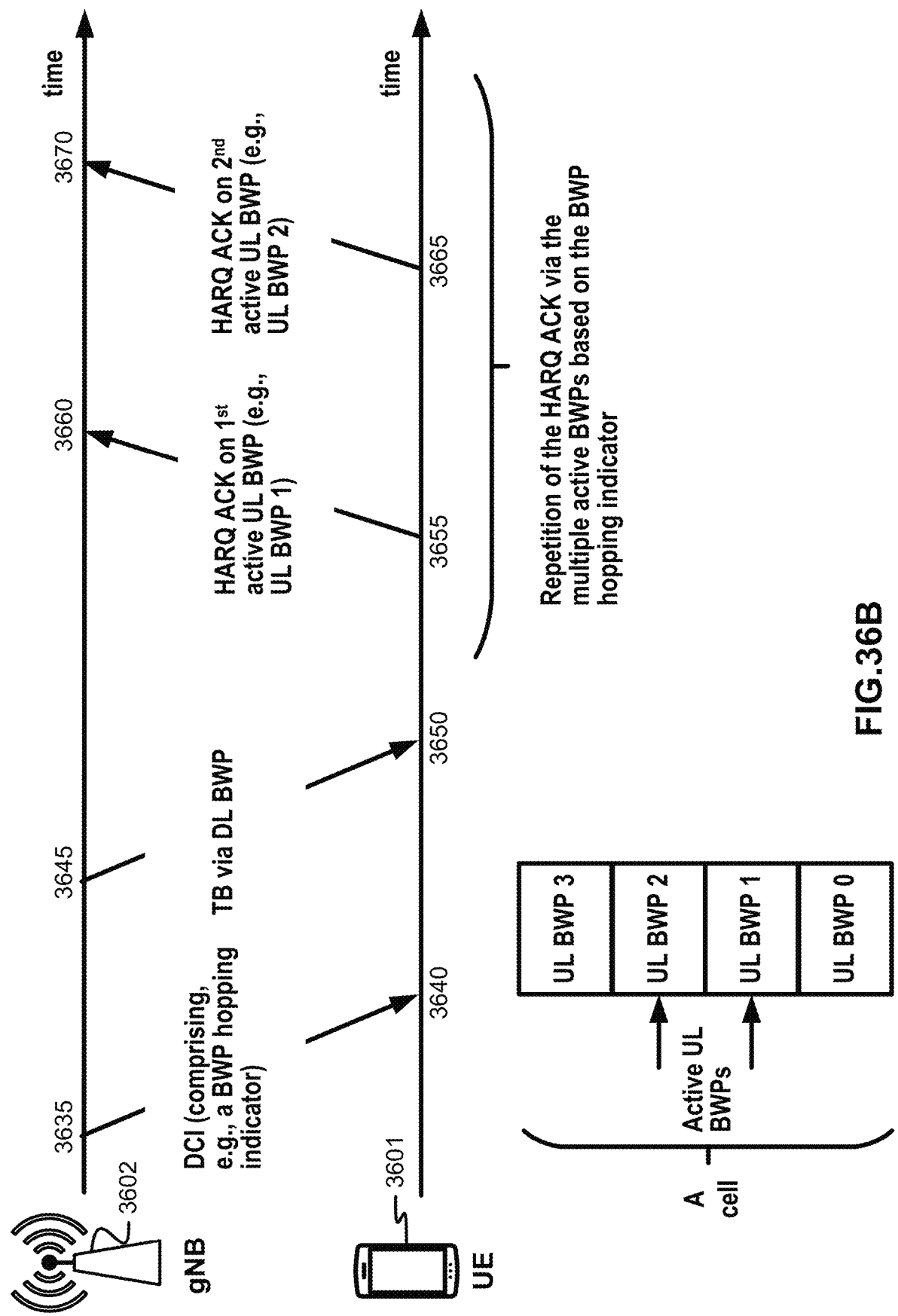

FIGS. 36A and 36B show an example of UCI repetition on a plurality of active UL BWPs of a cell. In FIG. 36A, a base station 3602 may transmit one or more RRC messages to a wireless device 3601 at time 3605. The one or more RRC messages may comprise configuration parameters for a plurality of UL BWPs of a cell. The configuration parameters may comprise one or more PUCCH repetition parameters indicating at least one of: a time domain repetition indicator; one or more frequency domain hopping indicator (e.g., intra-slot and/or inter-slot) in an active BWP; and/or a BWP hopping (e.g., switching) indicator. The time domain repetition indicator may indicate a quantity (e.g., number) of slots/symbol/mini-slots the UCI(s) may be transmitted with repetitions. The one or more frequency domain hopping indicator may indicate whether a frequency domain hopping within an active BWP is enabled (e.g., an intra-slot hopping or an inter-slot hopping). The BWP hopping indicator may indicate whether a BWP hopping is enabled or not. The BWP hopping may comprise a first transmission of UCI on a first active UL BWP and/or a second transmission of the UCI on a second active UL BWP. At time 3610, the wireless device 3601 may receive the one or more RRC messages from the base station 3602.

The wireless device 3601 may activate a first UL BWP and/or a second UL BWP, for example, based on or in response to receiving the one or more RRC messages. At time 3615, the wireless device 3601 may transmit one or more UCIs on a first active UL BWP (e.g., UL BWP1). The one or more UCIs may be transmitted via a first PUCCH resource of the first active UL BWP. The one or more UCIs may comprise at least one of: HARQ ACK information; SR; and/or CSI. At time 3625, the wireless device 3601 may repeat the transmission of the one or more UCI via a second PUCCH resource on a second active UL BWP (e.g., UL BWP2), for example, based on or in response to the BWP hopping indicator indicating the BWP hopping is enabled. The wireless device 3601 may repeat the transmission of the one or more UCI on the first active UL BWP and/or the second active UL BWP, for example, until a quantity (e.g., number) of transmissions indicated by the time domain repetition indicator is reached. The wireless device 3601 may repeat the transmission of the one or more UCI via the first PUCCH resource on the first active UL BWP, for example, based on or in response to the BWP hopping indicator indicating the BWP hopping is disabled. The wireless device 3601 may send (e.g. transmit) UCI(s) with repetitions on multiple active UL BWPs. By repeatedly transmitting UCI(s) on a plurality of active UL BWPs, the transmission robustness of UCI(s) may be improved. At time 3630, the base station 3602 may receive the UCI(s) from the wireless device 3601.

In FIG. 36B, a base station 3602 may transmit DCI to a wireless device 3601 at time 3635. The DCI may be a format that includes a BWP hopping indicator. The BWP hopping indicator may indicate whether BWP hopping is enabled or not. The BWP hopping may comprise a first transmission of HARQ ACK on a first active UL BWP (e.g., UL BWP 1) and/or a second transmission of the HARQ ACK on a second active UL BWP (e.g., UL BWP 2). At time 3640, the wireless device 3601 may receive the DCI from the base station 3602.

At time 3645, the base station 3602 may transmit a data packet on an active DL BWP. At time 3650, the wireless device 3601 may detect the data packet. The wireless device 3601 may determine HARQ ACK information based on whether the detection is successful. The wireless device may determine that the channel quality of the active UL BWP is poor, for example, based on the channel quality of the PUCCH not being reliable at base station 3602. At time 3655, the wireless device 3601 may send (e.g., transmit) the HARQ ACK information for the data packet to the base station 3502 on the first active UL BWP (e.g., UL BWP 1), for example, based on BWP hopping being enabled. At time 3665, the wireless device 3601 may send (e.g., transmit) the HARQ ACK information for the data packet to the base station 3502 on the first active UL BWP (e.g., UL BWP 1), for example, based on BWP hopping being enabled. The wireless device 3601 may repeat the transmission of the HARQ ACK on the first active UL BWP and/or the second active UL BWP, for example, until a quantity (e.g., number) of transmissions indicated by the time domain repetition indicator is reached. The wireless device 3601 may send (e.g. transmit) HARQ ACK with repetitions on multiple active UL BWPs. By repeatedly transmitting HARQ ACKs on a plurality of active UL BWPs, the transmission robustness of HARQ ACKs may be improved.

At times 3660 and 3670, the base station 3602 may receive the HARQ ACK(s) from the wireless device 3601. The base station 3602 may determine whether to transmit a new data packet or retransmit the data packet, for example, based on the HARQ ACK information received on the PUCCH resources. The base station 3602 may determine (e.g., consider) the transmission of the data packet to be successful, for example, if the HARQ ACK information indicates a positive acknowledgement (e.g., ACK). The base station 3602 may determine (e.g., consider) the transmission of the data packet to be unsuccessful, for example, if the HARQ ACK information indicates a negative acknowledgement (e.g., NACK). The base station 3602 may retransmit the data packet, for example, if the transmission of the data packet is determined to be unsuccessful.

Figure 37:
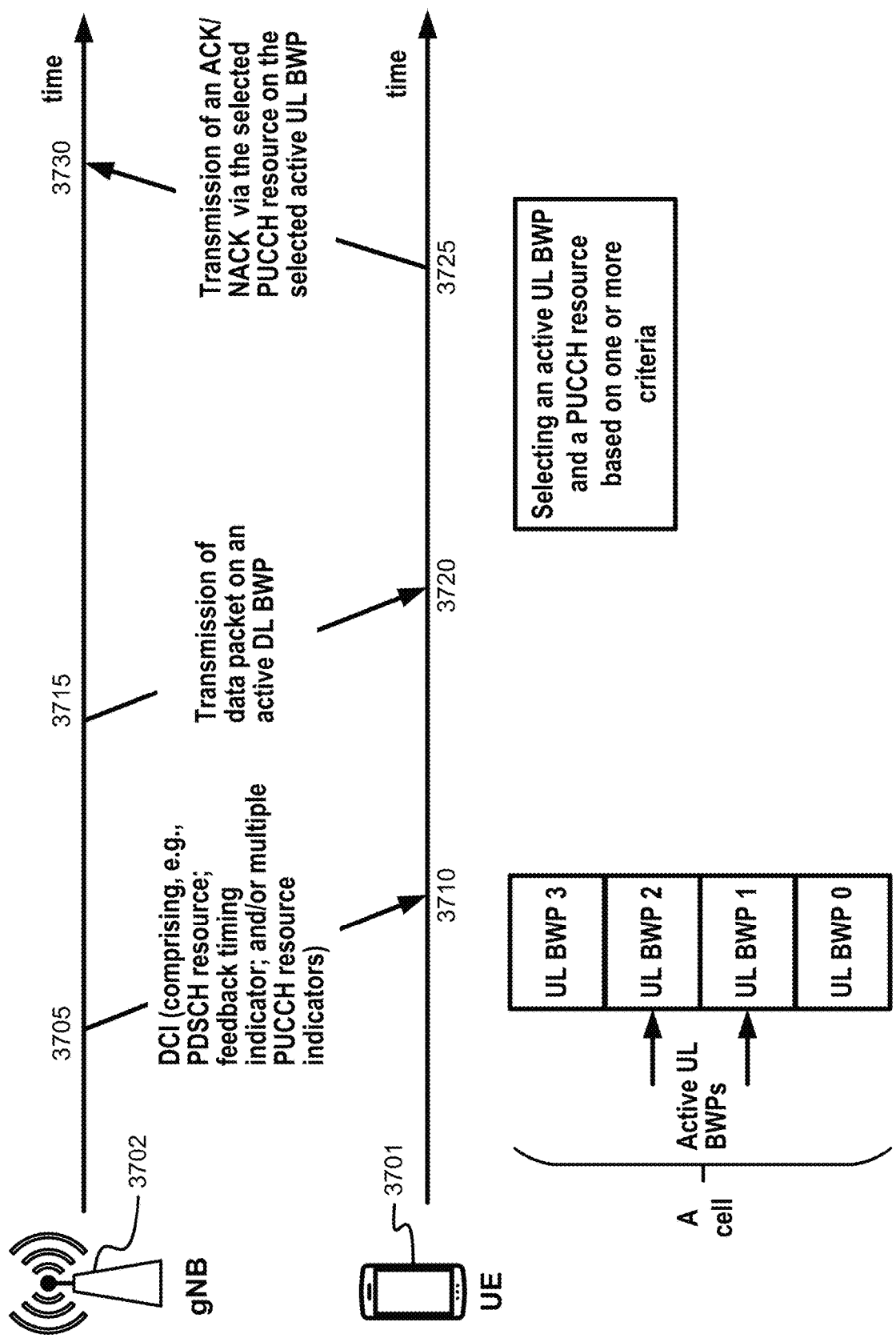
FIG. 37 shows an example of a UCI transmission in an active UL BWP.

FIG. 37 shows an example of a UCI transmission if a plurality of UL BWPs are active at the same time (e.g., simultaneously) in a cell. A base station 3702 may transmit one or more RRC messages to a wireless device 3701. The one or more RRC messages may comprise configuration parameters for each of the UL BWPs of the plurality of UL BWPs of the cell. The cell may be a PCell or a PUCCH secondary cell. The configuration parameters of an UL BWP of the UL BWPs may comprise at least one of: configuration parameters of one or more PUCCH formats; configuration parameters of scheduling request resources (e.g., schedulingRequestResoruceToAddModList); one or more timing parameters of ACK information corresponding to PDSCH (e.g., dl-DataToUL-ACK); one or more PUCCH resources for multiplexing CSI (e.g., multi-CSI-PUCCH-ResourceList); one or more spatial relation information parameters (e.g., spatialRelationlnfoToAddModList); one or more PUCCH power control parameters (e.g., pucch-PowerControl); and/or one or more PUCCH resource sets. The wireless device 3701 (e.g., UE in FIG. 37) may receive the one or more RRC messages from the base station 3702.

The wireless device 3701 may activate a first UL BWP (e.g., UL BWP 1) and a second UL BWP (e.g., UL BWP 2). The activation may be implemented as discussed above with respect to FIGS. 33A and/or 33B. At time 3705, the base station 3702 may transmit a DCI to the wireless device 3701. The DCI may comprise: one or more parameters of a PDSCH resource; a PDSCH-to-HARQ feedback timing indicator; and/or a plurality of PUCCH resource indicators. The plurality of PUCCH resource indicators may comprise at least a first PUCCH resource indicator indicating a first PUCCH resource on the first active UL BWP and/or a second PUCCH resource indicator indicating a second PUCCH resource on the second active UL BWP. At time 3710, the wireless device 3701 may receive the DCI. comprising:

At time 3715, the base station 3702 may transmit a data packet via the PDSCH resource (e.g., time/frequency.) The wireless device 3701 may detect the data packet, for example, based on or in response to receiving the DCI via the PDSCH resource at time 3720. The wireless device 3701 may determine HARQ ACK information based on whether the detection is successful. The wireless device 3701 may determine the HARQ ACK information as a positive acknowledgement (e.g., ACK), for example, based on or in response to the detection being successful. The wireless device 3701 may determine the HARQ ACK information as a negative acknowledgement (e.g., NACK), for example, based on in response to the detection being unsuccessful.

The wireless device 3701 may determine an active UL BWP from the at least two active UL BWPs, for example, based on one or more criteria in the DCI. Additionally, or alternatively, the wireless device 3701 may determine a PUCCH resource from multiple PUCCH resources indicated by the plurality of PUCCH resource indicators, for example, based on one or more criteria in the DCI. The one or more criteria may include: numerologies; UL BWP indexes (or indicators); the PDSCH-to-HARQ feedback timing indicator; a bit length of UCIs comprising the HARQ ACK information, SR and/or CSI report (periodic CSI report or SP CSI report on PUCCH). The wireless device 3701 may select an active UL BWP, from the plurality of active UL BWPs, that has the lowest UL BWP identifier among the plurality of UL BWP identifiers. Alternatively, the wireless device 3701 may select an active UL BWP, from the plurality of active UL BWPs, that has the highest UL BWP identifier among the plurality of UL BWP identifiers. The wireless device 3701 may select an active UL BWP, from the plurality of active UL BWPs, that has the lowest numerology index among the plurality of numerology indices. Alternatively, the wireless device 3701 may select an active UL BWP, from the plurality of active UL BWPs, that has the highest numerology index among the plurality of numerology indices. The wireless device 3701 may determine a PUCCH resource, for example, based on one of the plurality of PUCCH resource indicators. Each of the plurality of PUCCH resource indicators may be associated with one of the plurality of UL BWPs. The wireless device 3701 may select an active UL BWP, for example, based on the bit length of the UCIs. A PUCCH resource associated with the selected active UL BWP may accommodate transmission of the UCIs, for example, based on the bit length of the UCIs.

At time 3725, the wireless device 3701 may send (e.g., transmit) HARQ ACK information for the data packet to the base station 3702. The HARQ ACK information may be transmitted via a first PUCCH resource on the active UL BWP. The base station 3702 may monitor PUCCH resources (e.g., the first PUCCH resource and/or a second PUCCH resource) on one or more of the at least two active UL BWPs, for example, based on or in response to transmitting the data packet on the PDSCH. At time 3730, the base station 3702 may receive the HARQ ACK information from the wireless device 3701. The base station 3702 may determine whether to transmit a new data packet or retransmit the data packet, for example, based on the HARQ ACK information received on the PUCCH resources. The base station 3702 may determine (e.g., consider) the transmission of the data packet to be successful, for example, if the HARQ ACK information indicates a positive acknowledgement (e.g., ACK). The base station 3702 may determine (e.g., consider) the transmission of the data packet to be unsuccessful, for example, if the HARQ ACK information indicates a negative acknowledgement (e.g., NACK). The base station 3702 may retransmit the data packet, for example, if the transmission of the data packet is determined to be unsuccessful.

Figure 38A:
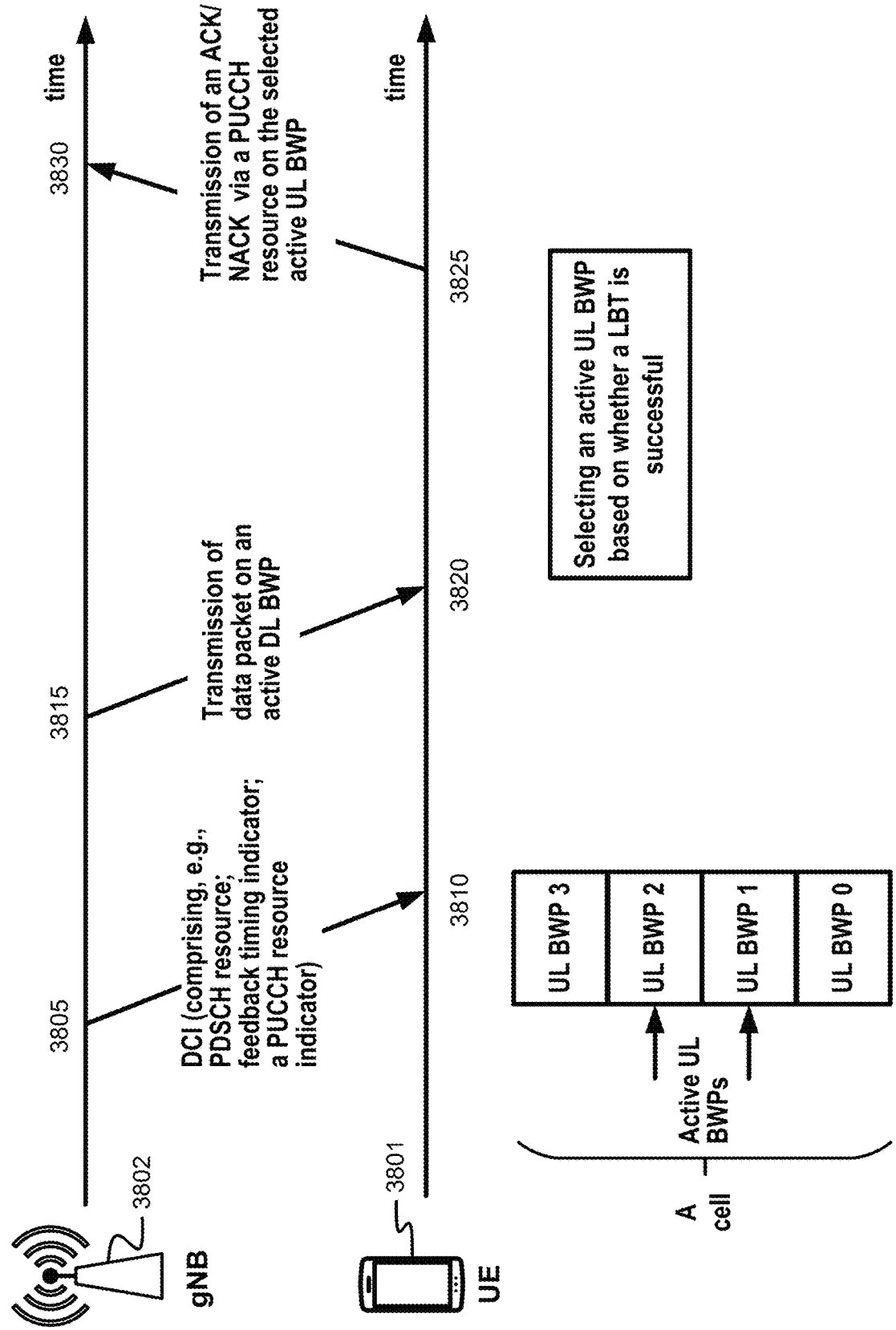
FIGS. 38A-38C show an example of a UCI transmission in an active UL BWP.
Figure 38B:
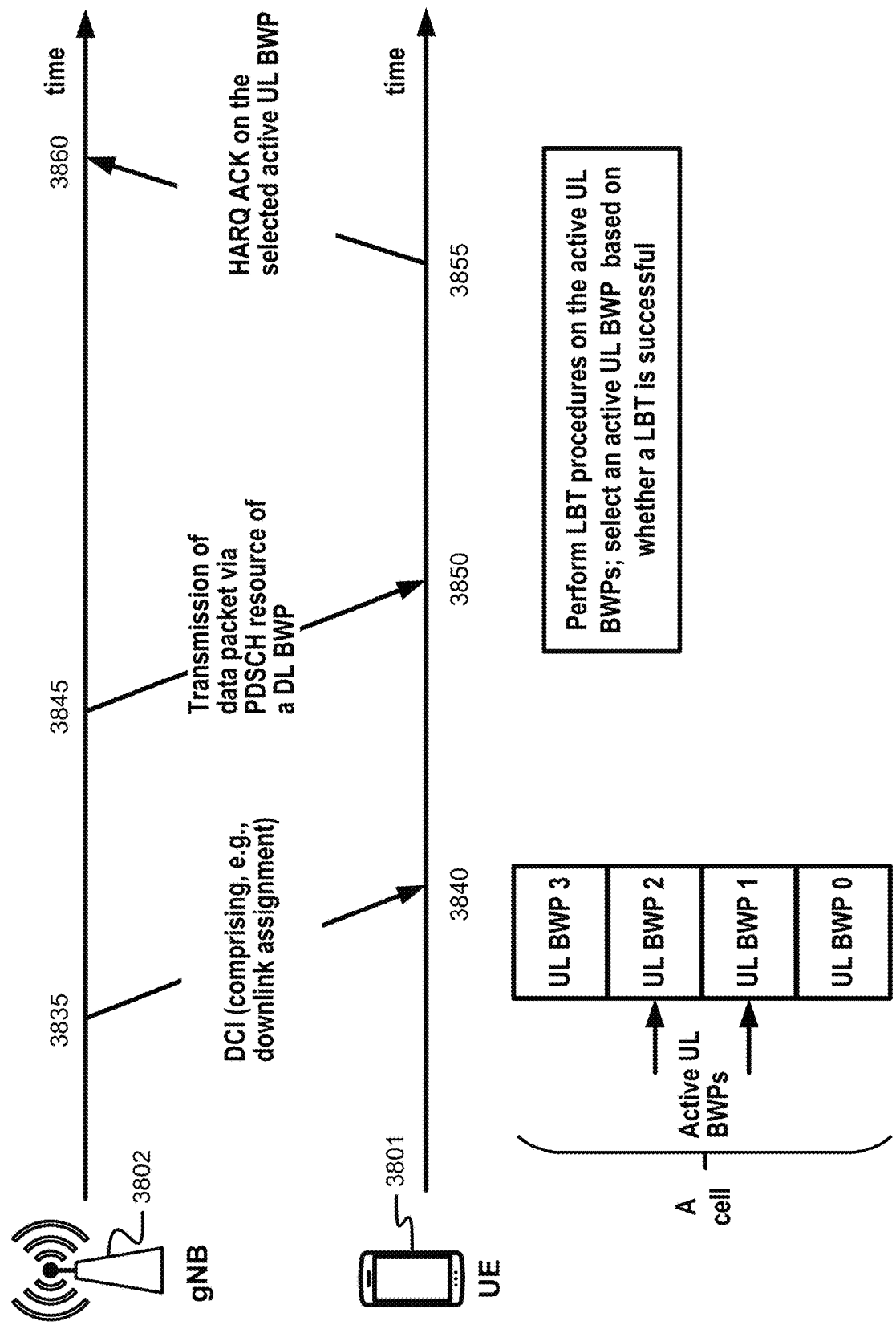
Figure 38C:
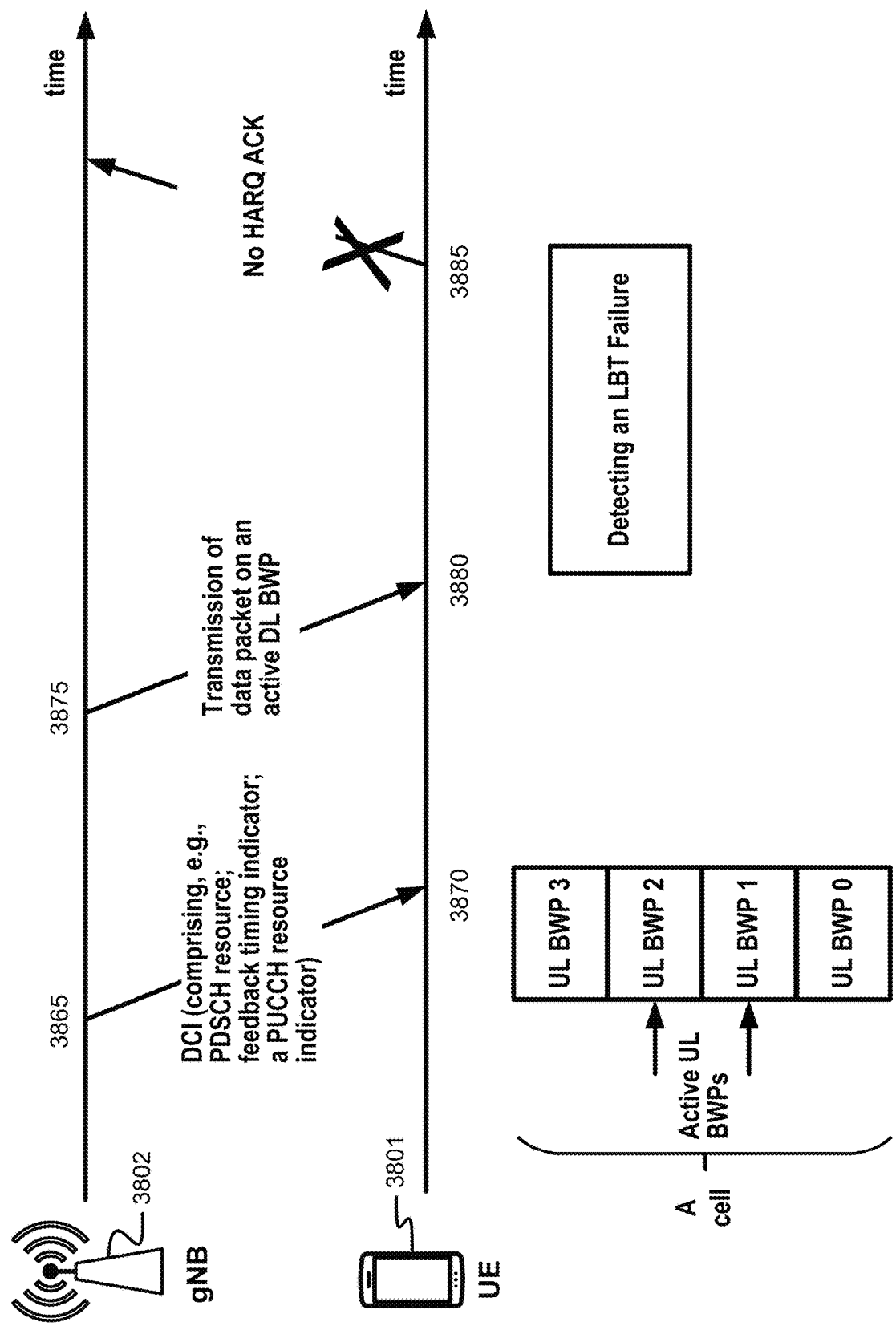

FIGS. 38A-38C show an example of a UCI transmission in a cell operating on an unlicensed band. In FIG. 38A, a wireless device 3801 may receive one or more RRC messages from a base station 3802. The one or more RRC messages may comprise configuration parameters for each of the plurality of UL BWPs in a cell. The cell may operate an unlicensed band. The cell may be a PCell or a PUCCH secondary cell. The configuration parameters for each of the plurality of UL BWPs may comprise at least one of: configuration parameters of one or more PUCCH formats; configuration parameters of scheduling request resources (e.g., schedulingRequestResoruceToAddModList); one or more timing parameters of ACK information corresponding to PDSCH (e.g., dl-DataToUL-ACK); one or more PUCCH resources for multiplexing CSI (e.g., multi-CSI-PUCCH-ResourceList); one or more spatial relation information parameters (e.g., spatialRelationlnfoToAddModList); one or more PUCCH power control parameters (e.g., pucch-PowerControl); and/or one or more PUCCH resource sets. The one or more RRC messages may further comprise one or more parameters of an LBT procedure. The one or more parameters of the LBT procedure may comprise at least one of: configuration parameters of multiple LBT types; one or more energy detection thresholds; and/or one or more indicators indicating whether a co-existing technology is absent in the unlicensed band.

The wireless device 3801 may activate multiple UL BWPs. For example, the wireless device 3801 may activate a first UL BWP (e.g., UL BWP 1) and a second UL BWP (e.g., UL BWP 2). The activation may be effectuated as discussed above with respect to FIGS. 33A and/or 33B. At time 3805, the base station 3802 may transmit DCI to the wireless device 3801. The DCI may comprise a PDSCH resource indication, a PDSCH-to-HARQ feedback timing indicator; and/or a PUCCH resource indicator. The DCI may indicate a PDSCH scheduling, for example, via a format of the DCI (e.g., DCI format 1_0/1_1). The DCI format may be CRC scrambled by a RNTI (e.g., C-RNTI, CS-RNTI, MCS-C-RNTI, or TC-RNTI). The DCI format may indicate a message (e.g., message 4) for a random access procedure, for example, if the DCI format is CRC scrambled using the TC-RNTI. At time 3810, the wireless device 3801 may receive the DCI.

At time 3815, the base station may transmit a data packet via a PDSCH resource (e.g., time/frequency). At time 3820, the wireless device 3801 may detect the data packet, for example, based on or in response to receiving the DCI. The wireless device 3801 may determine HARQ ACK information, for example, based on whether the detection is successful. The wireless device 3801 may determine the HARQ ACK information as a positive acknowledgement (e.g., ACK), for example, based on or in response to the detection being successful. The wireless device 3801 may determine the HARQ ACK information as a negative acknowledgement (e.g., NACK), for example, based on or in response to the detection being unsuccessful.

At time 3825, the wireless device 3801 may send (e.g., transmit) HARQ ACK information for the data packet to the base station 3802. The HARQ ACK information may be transmitted via a first PUCCH resource on the active UL BWP. The wireless device 3801 may transmit one or more UCIs. The one or more UCIs may comprise the HARQ ACK information for the data packet. The one or more UCIs may be transmitted via a PUCCH resource indicated by the PUCCH resource indicator on the selected UL active BWP. The base station 3802 may monitor PUCCH resources (e.g., the first PUCCH resource and/or a second PUCCH resource) on one or more of the at least two active UL BWPs, for example, based on or in response to transmitting the data packet on the PDSCH. At time 3830, the base station 3802 may receive the HARQ ACK information from the wireless device 3801. The base station 3802 may determine whether to transmit a new data packet or retransmit the data packet, for example, based on the HARQ ACK information received on the PUCCH resources. The base station 3802 may determine (e.g., consider) the transmission of the data packet to be successful, for example, if the HARQ ACK information indicates a positive acknowledgement (e.g., ACK). The base station 3802 may determine (e.g., consider) the transmission of the data packet to be unsuccessful, for example, if the HARQ ACK information indicates a negative acknowledgement (e.g., NACK). The base station 3802 may retransmit the data packet, for example, if the transmission of the data packet is determined to be unsuccessful.

The wireless device may select an active UL BWP from a plurality of active UL BWPs (e.g., UL BWP 1 and UL BWP 2), for example, based on or in response to the DCI. Additionally, or alternatively, the wireless device may select an active UL BWP from a plurality of active UL BWPs (e.g., UL BWP 1 and UL BWP 2), for example, based on one or more LBT procedures. The wireless device may select an active UL BWP on which the LBT procedure is successfully completed (e.g., finished), for example, if the wireless device is able to perform overlapping (e.g., simultaneous) LBT procedures on the plurality of active UL BWPs. The wireless device may select an active UL BWP on which the LBT procedure successfully finishes first, for example, if the wireless device is able to perform overlapping (e.g., simultaneous) LBT procedures on the plurality active UL BWPs. The wireless device may select an active UL BWP on which the LBT procedure finishes quickest (e.g. at an earlier time than other LBT procedures), for example, if the wireless device is able to perform simultaneous LBT procedures on the plurality active UL BWPs.

The wireless device may select an active UL BWP on which the LBT procedure is successfully completed (e.g., finished), if the wireless device is able to perform sequential LBT procedures on the plurality of active UL BWPs. The wireless device may perform a second LBT procedure on a second active UL BWP, for example, if the LBT procedure fails on a first UL BWP. The wireless device may select the second active UL BWP, for example, if the second LBT procedure is successful.

The DCI may be transmitted using a DCI format that includes an UL BWP indicator. The wireless device may perform an LBT procedure on an active UL BWP indicated by the UL BWP indicator, for example, based on or in response to the DCI. The wireless device may transmit one or more UCIs via a PUCCH resource indicated by the PUCCH resource indicator, for example, if the LBT procedure is successful. The UCIs may comprise the HARQ ACK information for the data packet. The wireless device may back off for a period of time, for example, if the LBT procedure is unsuccessful. The period of time may be indicated (e.g., defined) by one or more configuration parameters of the LBT procedure. The wireless device may perform a second LBT procedure on the UL BWP. The wireless device may transmit the one or more UCIs on the UL BWP, for example, if the second LBT procedure is successful.

In FIG. 38B, the wireless device 3801 may activate multiple UL BWPs, including, for example, a first UL BWP (e.g., UL BWP 1) and a second UL BWP (e.g., UL BWP 2). At time 3835, the base station 3802 may transmit DCI to the wireless device 3801. The DCI may comprise a downlink assignment. At time 3840, the wireless device 3801 may receive the DCI. At time 3845, the base station may transmit a data packet via a PDSCH resource (e.g., time/frequency), for example, based on the downlink assignment in the DCI. At time 3850, the wireless device 3801 may detect the data packet. The wireless device 3801 may determine HARQ ACK information, for example, based on whether the detection is successful. Prior to time 3855, the wireless device 3801 may perform one or more LBT procedures, for example, to select an active UL BWP from a plurality of active UL BWPs (e.g., UL BWP 1 and UL BWP 2). As noted above, the wireless device may select an active UL BWP on which the LBT procedure is successfully completed (e.g., finished). At time 3855, the wireless device 3801 does transmits the HARQ ACK, for example, based on or in response to the one or more LBT procedures completing successfully (e.g., finishing). At time 3860, the base station 3802 may receive the HARQ ACK information from the wireless device 3801. The base station 3802 may determine whether to transmit a new data packet or retransmit the data packet, for example, based on the HARQ ACK information received on the PUCCH resources. The base station 3802 may determine (e.g., consider) the transmission of the data packet to be successful, for example, if the HARQ ACK information indicates a positive acknowledgement (e.g., ACK). The base station 3802 may determine (e.g., consider) the transmission of the data packet to be unsuccessful, for example, if the HARQ ACK information indicates a negative acknowledgement (e.g., NACK). The base station 3802 may retransmit the data packet, for example, if the transmission of the data packet is determined to be unsuccessful.

In FIG. 38C, the wireless device 3801 may activate multiple UL BWPs, including, for example, a first UL BWP (e.g., UL BWP 1) and a second UL BWP (e.g., UL BWP 2). At time 3865, the base station 3802 may transmit DCI to the wireless device 3801. As noted above, the DCI may comprise a PDSCH resource indication, a PDSCH-to-HARQ feedback timing indicator; and/or a PUCCH resource indicator. At time 3870, the wireless device 3801 may receive the DCI. At time 3875, the base station may transmit a data packet via a PDSCH resource (e.g., time/frequency). At time 3880, the wireless device 3801 may detect the data packet, for example, based on or in response to receiving the DCI. The wireless device 3801 may determine HARQ ACK information, for example, based on whether the detection is successful. Prior to time 3885, the wireless device 3801 may perform one or more LBT procedures, for example, to select an active UL BWP from a plurality of active UL BWPs (e.g., UL BWP 1 and UL BWP 2). As noted above, the wireless device may select an active UL BWP on which the LBT procedure is successfully completed (e.g., finished). The wireless device 3801 may not select an active UL BWP from the plurality of active UL BWPs, for example, based on the one or more LBT procedures failing. At time 3885, the wireless device 3801 does not transmit the HARQ ACK, for example, based on or in response to the one or more LBT procedures failing (e.g., being unsuccessful).

Figure 39:
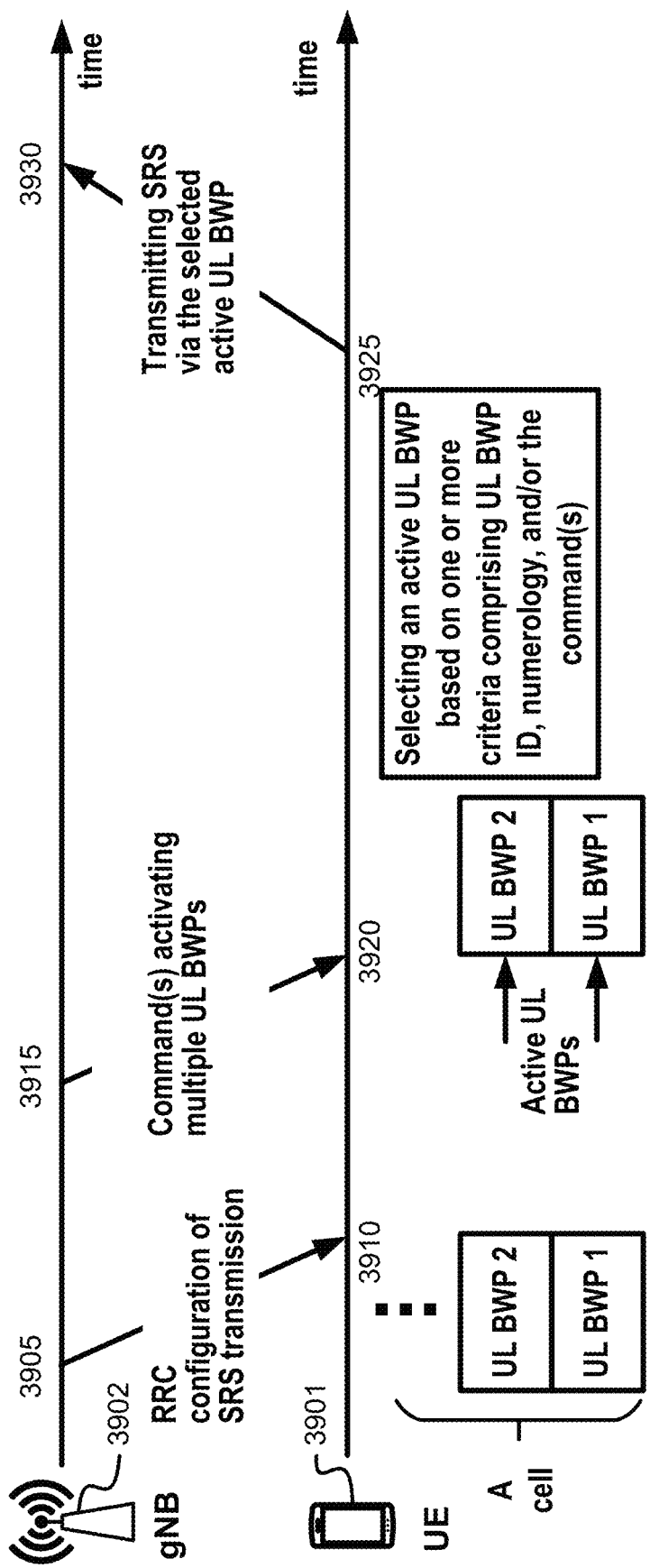
FIG. 39 shows an example of a SRS transmission in an active UL BWP.

FIG. 39 shows an example of a periodic SRS transmission in which multiple UL BWPs are active concurrently (e.g., simultaneously). At time 3905, a base station 3902 may transmit one or more RRC messages to a wireless device 3901. The one or more RRC messages may comprise configuration parameters for SRS transmission on a plurality of UL BWPs in a cell. The configuration parameters may comprise at least one of: a periodicity of SRS transmission; a time/frequency radio resource; cyclic shift parameters; and/or other radio parameters (e.g., bandwidth, frequency hopping, transmission comb and offset, frequency-domain position). The SRS transmission may be performed as discussed above with respect to FIGS. 28A-28C. At time 3010, the wireless device 3901 may receive the one or more RRC messages from the base station 3902.

At time 3915, the base station 3902 may send (e.g., transmit) one or more commands to the wireless device 3901. The one or more commands may indicate activation of a plurality of UL BWPs, including a first UL BWP (e.g., UL BWP 1) and a second UL BWP (e.g., UL BWP 2). The activation may be performed as discussed above with respect to FIGS. 33A and/or 33B. At time 3920, the wireless device 3901 may receive the one or more command(s) from the base station 3902.

The wireless device 3901 may select an active UL BWP from the plurality of active UL BWPs, for example, based on one or more criteria. The one or more criteria may comprise at least one of: UL BWP identifiers of the multiple active UL BWPs; numerologies of the multiple active UL BWPs; the configuration parameters of SRS transmission on the multiple UL BWPs. in response to the command(s), The wireless device 3901 may select an active UL BWP from the plurality of active UL BWPs, for example, based on or in response to the one or more command(s). The selected active UL BWP may be selected for having the lowest (e.g., a smaller) UL BWP identifier amongst the plurality of active UL BWPs. Alternatively, the selected active UL BWP may be selected for having the greatest (e.g., biggest) UL BWP identifier amongst the plurality of active UL BWPs. Additionally, or alternatively, the selected active UL BWP may be selected for having the lowest numerology index amongst the plurality of active UL BWPs. Alternatively, the selected active UL BWP may be selected for having the greatest (e.g., biggest) numerology index amongst the plurality of active UL BWPs. The selected active UL BWP may be selected for having a periodic SRS configuration with the shortest periodicity amongst the plurality of periodic SRS configurations. The selected active UL BWP may be selected for having a periodic SRS configuration with the longest periodicity amongst the plurality of periodic SRS configurations.

At time 3925, the wireless device 3901 may send (e.g., transmit) SRS transmissions to the base station 3902. The SRS transmissions may be transmitted via the selected active UL BWP. At time 3930, the base station 3902 may receive the SRS transmissions from the wireless device 3901.

Figure 40:
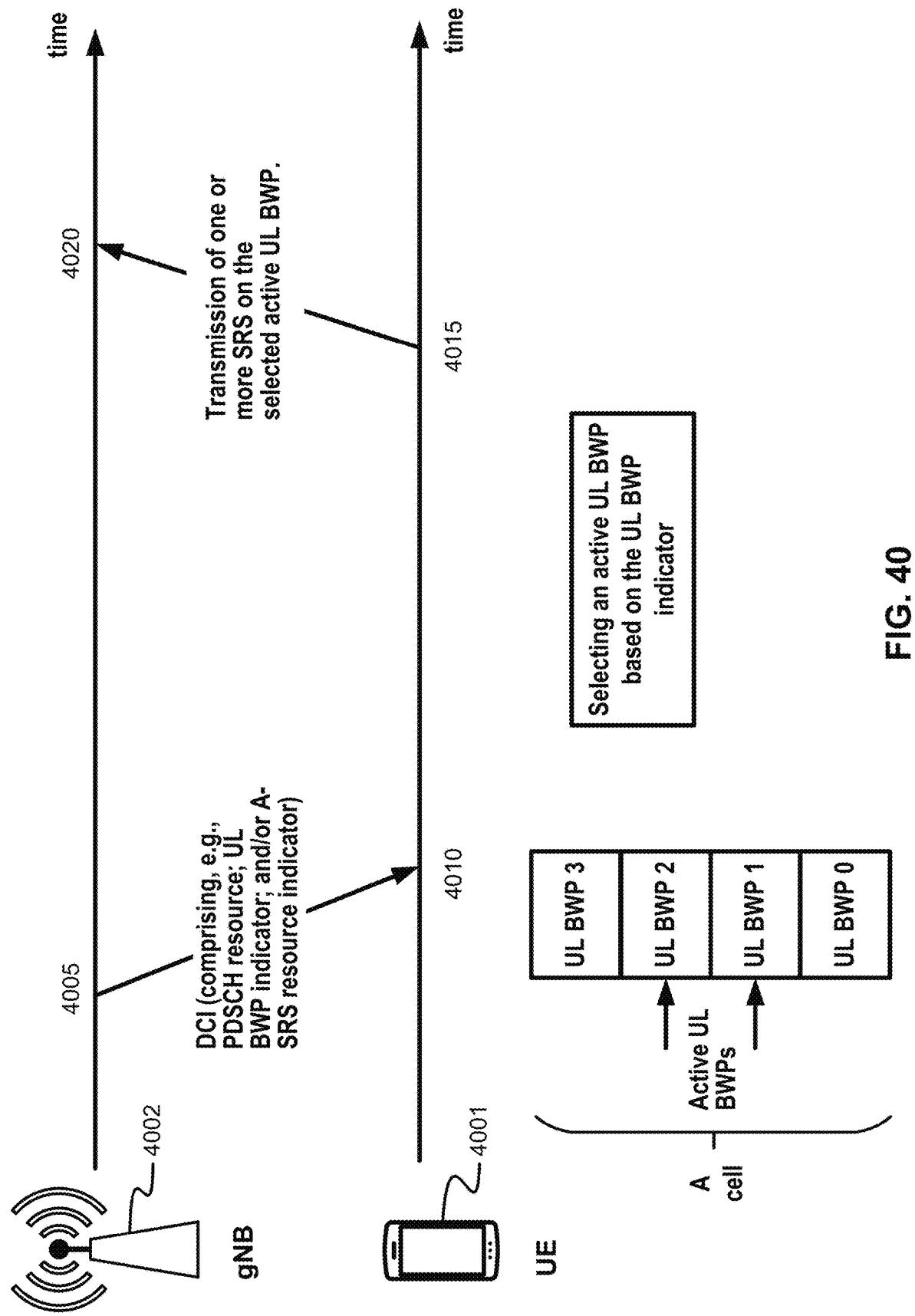
FIG. 40 shows an example of a SRS transmission in an active UL BWP.

FIG. 40 shows an example of an aperiodic SRS transmission in which a plurality of UL BWPs are active simultaneously. A wireless device 4001 may receive one or more RRC messages from a base station 4002. The one or more RRC messages may comprise configuration parameters for SRS transmission for a plurality of UL BWPs in a cell. The configuration parameters may comprise at least one of: a periodicity of SRS transmission; a time/frequency radio resource; cyclic shift parameters; and/or other radio parameters (e.g., bandwidth, frequency hopping, transmission comb and offset, frequency-domain position). The SRS transmission may be performed as discussed above with respect to FIGS. 28A-28C. The wireless device 4001 may activate a plurality of UL BWPs, including a first UL BWP (e.g., UL BWP 1) and a second UL BWP (e.g., UL BWP 2). The activation may be performed as discussed above with respect to FIGS. 33A-33B.

At time 4005, the base station 4002 may send (e.g., transmit) DCI to the wireless device 4001. The DCI may comprise a PDSCH resource indication; an UL BWP indicator; and/or an aperiodic SRS resource indicator. The format of the DCI may be a standard DCI format (e.g., DCI format 1_0/1_1) or a new DCI format. The UL BWP indicator may indicate an active UL BWP of the plurality of active UL BWPs that the wireless device 4001 may transmit the aperiodic SRS transmission. At time 4010, the wireless device 4001 may receive the DCI from the base station 4002.

The wireless device 4001 may determine (e.g., select) an active UL BWP from the plurality of active UL BWPS, for example, based on the UL BWP indicator included in the DCI. At time 4015, the wireless device 4001 may send (e.g., transmit) an aperiodic SRS transmission on the determined active UL BWP, for example, as indicated by the aperiodic SRS resource indicator. At time 4020, the base station 4002 may receive the aperiodic SRS transmission from the wireless device 4001.

A wireless device may receive DCI from a base station. The DCI may comprise a downlink BWP indicator; an UL BWP indicator; and/or an UL control resource indicator. The wireless device may receive a data packet via a DL BWP indicated by the DL BWP indicator. The wireless device may select an UL BWP from a plurality of concurrently active UL BWPs of a cell, for example, based on the UL BWP indicator. The wireless device may transmit, on the UL BWP of the cell, acknowledgement information for the data packet, for example, via an UL control resource indicated by the UL control resource indicator. The DCI may comprise an aperiodic SRS resource indicator. The wireless device may transmit, on the UL BWP, an aperiodic SRS indicated by the aperiodic SRS resource indicator, for example, based on or in response to the DCI. The wireless device may transmit, on the UL BWP, one or more UCIs.

A wireless device may receive, from a base station, a DCI comprising an uplink control resource indicator. The wireless device may determine that a first UL BWP and a second UL BWP are concurrently active on a cell. The wireless device may select the first UL BWP, for example, based on or in response to determining that the first UL BWP and the second UL BWP are both active on the cell. The first UL BWP may be selected, for example, based on a first BWP identifier of the first UL BWP being less than a second BWP identifier of the second UL BWP. The wireless device may transmit, on the selected UL BWP, one or more acknowledgement information for a data packet via an uplink control resource indicated by the uplink control resource indicator.

A wireless device may receive configuration parameters of a cell. The cell may comprise a first uplink bandwidth part (BWP) and a second uplink BWP. The wireless device may activate the first uplink BWP and the second uplink BWP. The wireless device may receive downlink control information (DCI). The DCI may comprise a first field indicating a downlink BWP, a second field indicating an at least one uplink BWP, and/or a third field indicating an uplink control resource. The wireless device may receive, via the downlink BWP indicated by the first field, a transport block. The wireless device may transmit, via the uplink control resource using a selected uplink BWP of the at least one uplink BWP, acknowledgement information.

The wireless device may also perform one or more additional operations or include additional elements in addition to those described above. For example, the wireless device may perform a first listen-before-talk procedure on the first uplink BWP and perform a second listen-before-talk procedure on the second uplink BWP. The wireless device may select, based on the first listen-before-talk procedure on the first uplink BWP and based on the second listen-before-talk procedure on the second uplink BWP, the first uplink BWP or the second uplink BWP as the selected BWP. The downlink control information further comprises a fourth field indicating whether BWP hopping is enabled for acknowledgement information. The wireless device may transmit, via the uplink control resource using the first uplink BWP, a first quantity of acknowledgement information for the transport block. The wireless device may transmit, via the uplink control resource using the second uplink BWP, a second quantity of acknowledgement information for the transport block. The second field may indicate the selected uplink BWP as the at least one uplink BWP. The wireless device may activate the first uplink BWP at a first time and the second uplink BWP at a second time. In some examples, the first time and the second time partially overlap. The wireless device may transmit, via the first uplink BWP and based on the activating the first uplink BWP, a first uplink transport block. Additionally, or alternatively, the wireless device may transmit, via the second uplink BWP and based on the activating the second uplink BWP, a second uplink transport block. The configuration parameters may indicate scheduling request resources on the first uplink BWP and/or physical uplink control channel resources on the first uplink BWP. The configuration parameters may also indicate scheduling request resources on the second uplink BWP and physical uplink control channel resources on the second uplink BWP. The cell may be a primary cell that comprises a downlink BWP. In some examples, the downlink BWP may be located in a second cell. The cell may comprise a physical uplink control channel (PUCCH) secondary cell. The wireless device may select the first uplink BWP as the uplink BWP based on the second field indicating the first uplink BWP. Additionally, or alternatively, the wireless device may select the second uplink BWP as the uplink BWP based on the second field indicating the second uplink BWP. The acknowledgement information may comprise a positive acknowledgement based on successfully decoding the transport block. The wireless device may decode the transport block based on cyclic redundancy check bits of the transport block being successfully checked. Alternatively, the acknowledgement information may comprise a negative acknowledgement based on the decoding the transport block being unsuccessful. The transport block may be unsuccessfully decoded based on cyclic redundancy check bits of the transport block being checked unsuccessfully. The wireless device may activate the first uplink BWP based on receiving a command indicating the activation of the first uplink BWP. The command may comprise second downlink control information (DCI). The DCI may further comprise physical downlink shared channel (PDSCH) resources of the downlink BWP. The wireless device may decode the transport block via the physical downlink shared channel resources of the downlink BWP.

A wireless device may receive configuration parameters of a cell. The wireless device may activate a first uplink BWP and a second uplink BWP associated with the cell. The wireless device may receive downlink control information (DCI) comprising a first field indicating a downlink BWP; and a second field indicating an uplink control resource. The wireless device may decode a transport block via the downlink BWP. The wireless device may select a third uplink BWP between the first uplink BWP and the second uplink BWP based on a first BWP index of the first uplink BWP and a second BWP index of the second uplink BWP. The wireless device may transmit, via the uplink control resource of the third uplink BWP, acknowledgement information for the transport block based on the decoding. The wireless device may select the first uplink BWP as the third uplink BWP, for example, based on or in response to the first BWP index being smaller than the second BWP index. The wireless device may select the second uplink BWP as the third uplink BWP, for example, based on or in response to the first BWP index being greater than the second BWP index.

A wireless device may receive configuration parameters of a cell comprising a first uplink bandwidth part (BWP) and a second uplink BWP. The wireless device may activate the first uplink BWP and the second uplink BWP. The wireless device may receive downlink control information comprising a first field indicating a downlink BWP, a second field indicating an uplink BWP, and a third field indicating an aperiodic sounding reference signal (SRS) resource. The wireless device may transmit, on a third uplink BWP, an aperiodic SRS via the aperiodic SRS resource, wherein the third uplink BWP is selected, based on the second field, between the first uplink BWP and the second uplink BWP. The wireless device may receive a transport block via the downlink BWP.

A wireless device may receive configuration parameters of a cell, wherein the cell comprises a first uplink bandwidth part (BWP) and a second uplink BWP. The wireless device may activate the first uplink BWP and the second uplink BWP. The wireless device may receive downlink control information (DCI) comprising a first field indicating a downlink BWP and a second field indicating an uplink control resource. The wireless device may receive, via the downlink BWP indicated by the first field, a transport block. The wireless device may select, based on a first listen-before-talk procedure on the first uplink BWP and a second listen-before-talk procedure on the second uplink BWP, the first uplink BWP or the second uplink BWP as a selected uplink BWP. The wireless device may transmit, via the uplink control resource using the selected uplink BWP, acknowledgement information for the transport block.

The wireless device may select the first uplink BWP as the selected uplink BWP based on the first listen-before-talk procedure on the first uplink BWP indicating a clear channel and the second listen-before-talk procedure on the second uplink BWP indicating an occupied channel. The wireless device may select the second uplink BWP as the selected uplink BWP based on the first listen-before-talk procedure on the first uplink BWP indicating an occupied channel and the second listen-before-talk procedure on the second uplink BWP indicating a clear channel. The downlink control information may further comprise a third field indicating whether a BWP hopping is enabled for acknowledgement information. The wireless device may transmit, via the uplink control resource using the first uplink BWP, a first quantity of acknowledgement information for the transport block. The wireless device may transmit, via the uplink control resource using the second uplink BWP, a second quantity of the acknowledgement information for the transport block, wherein the second quantity is different from the first quantity. The wireless device may activate the first uplink BWP at a first time and the second uplink BWP at a second time. The first time and the second time may partially overlap. The wireless device may transmit, via the first uplink BWP and based on the activating the first uplink BWP, a first uplink transport block. The wireless device may transmit, via the second uplink BWP and based on the activating the second uplink BWP, a second uplink transport block. The wireless device may receive a data packet comprising the transport block and decode the data packet. The acknowledgement information may be based on whether the data packet is successfully decoded.

A wireless device may receive configuration parameters of a cell, wherein the cell comprises a first uplink bandwidth part (BWP) and a second uplink BWP. The wireless device may activate the first uplink BWP and/or the second uplink BWP. The wireless device may receive downlink control information (DCI) comprising a first field indicating a downlink BWP, a second field indicating whether a BWP hopping is enabled for acknowledgement information, and a third field indicating uplink control resource. The wireless device may receive, via the downlink BWP indicated by the first field, a transport block. The wireless device may transmit, via the uplink control resource of the first uplink BWP, a first quantity of acknowledgement information for the transport block, for example, based on or in response to the second field indicating that the BWP hopping is enabled. The wireless device may transmit, via the uplink control resource of the second uplink BWP, a second quantity of the acknowledgement information for the transport block, for example, based on or in response to the second field indicating that the BWP hopping is enabled.

The wireless device may perform a first listen-before-talk procedure on the first uplink BWP, wherein the transmitting the first quantity of acknowledgement information for the transport block is based on an outcome of the first listen-before-talk procedure. The wireless device may perform a second listen-before-talk procedure on the second uplink BWP, wherein the transmitting the second quantity of acknowledgement information for the transport block is based on an outcome of the second listen-before-talk procedure. The DCI may further comprise a fourth field indicating at least one of first uplink BWP and/or the second uplink BWP. The wireless device may activate the first uplink BWP at a first time and the second uplink BWP at a second time. The first time and the second time may partially overlap. The acknowledgement information may indicate that the wireless device was unable to decode a data packet comprising the transport block.

Figure 41:
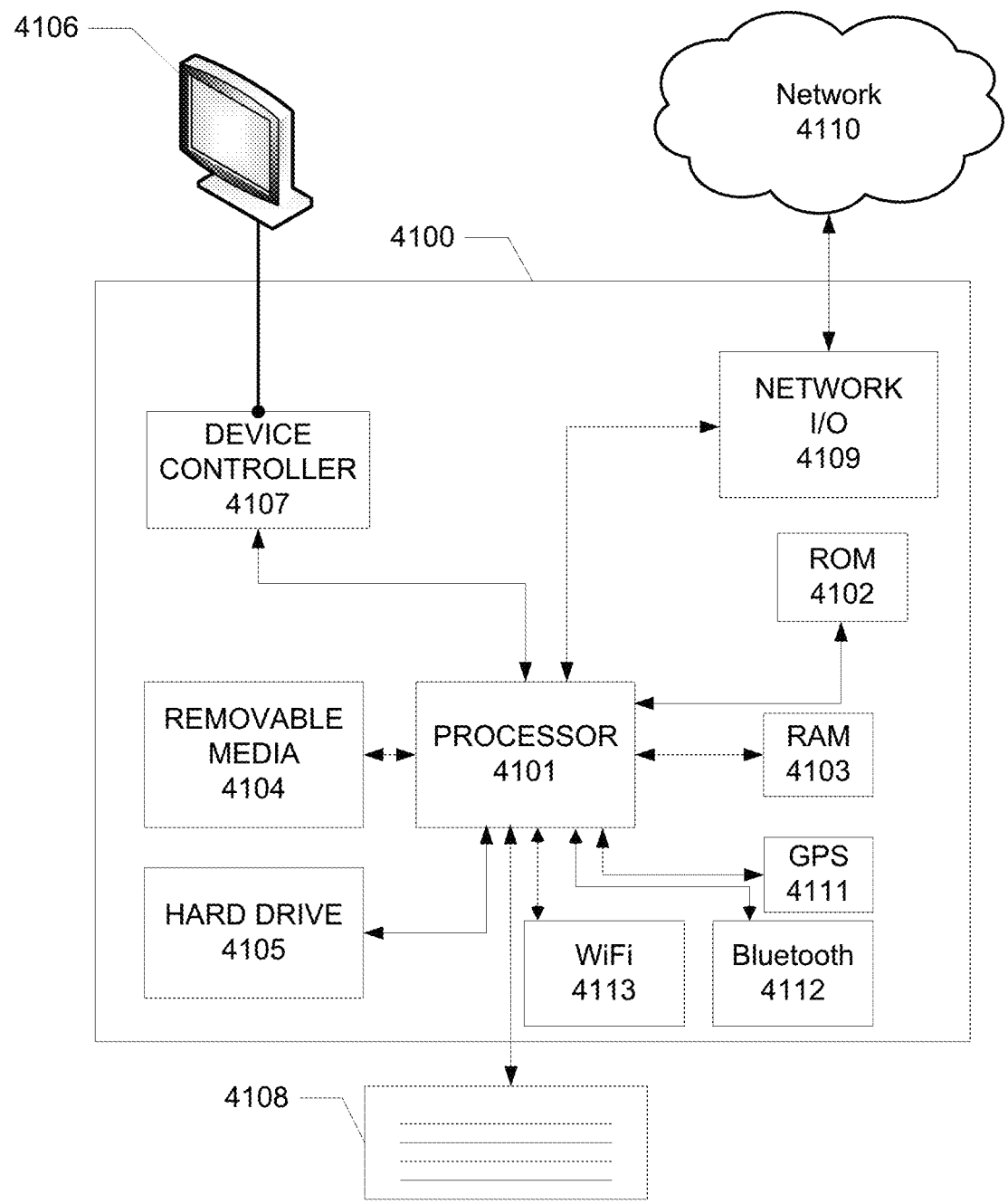
FIG. 41 shows example elements of a computing device that may be used to implement any of the various devices described herein.

FIG. 41 shows general hardware elements that may be used to implement any of the various computing devices discussed herein, including, e.g., the base station 4101, the wireless device 4106, or any other base station, wireless device, or computing device described herein. The computing device 4100 may include one or more processors 4101, which may execute instructions stored in the random access memory (RAM) 4103, the removable media 4104 (such as a Universal Serial Bus (USB) drive, compact disk (CD) or digital versatile disk (DVD), or floppy disk drive), or any other desired storage medium. Instructions may also be stored in an attached (or internal) hard drive 4105. The computing device 4100 may also include a security processor (not shown), which may execute instructions of one or more computer programs to monitor the processes executing on the processor 4101 and any process that requests access to any hardware and/or software components of the computing device 4100 (e.g., ROM 4102, RAM 4103, the removable media 4104, the hard drive 4105, the device controller 4107, a network interface 4109, a GPS 4111, a Bluetooth interface 4112, a WiFi interface 4113, etc.). The computing device 4100 may include one or more output devices, such as the display 4106 (e.g., a screen, a display device, a monitor, a television, etc.), and may include one or more output device controllers 4107, such as a video processor. There may also be one or more user input devices 4108, such as a remote control, keyboard, mouse, touch screen, microphone, etc. The computing device 4100 may also include one or more network interfaces, such as a network interface 4109, which may be a wired interface, a wireless interface, or a combination of the two. The network interface 4109 may provide an interface for the computing device 4100 to communicate with a network 4110 (e.g., a RAN, or any other network). The network interface 4109 may include a modem (e.g., a cable modem), and the external network 4110 may include communication links, an external network, an in-home network, a provider's wireless, coaxial, fiber, or hybrid fiber/coaxial distribution system (e.g., a DOCSIS network), or any other desired network. Additionally, the computing device 4100 may include a location-detecting device, such as a global positioning system (GPS) microprocessor 4111, which may be configured to receive and process global positioning signals and determine, with possible assistance from an external server and antenna, a geographic position of the computing device 4100.

The example in FIG. 41 is a hardware configuration, although the components shown may be implemented as software as well. Modifications may be made to add, remove, combine, divide, etc. components of the computing device 4100 as desired. Additionally, the components may be implemented using basic computing devices and components, and the same components (e.g., processor 4101, ROM storage 4102, display 4106, etc.) may be used to implement any of the other computing devices and components described herein. For example, the various components described herein may be implemented using computing devices having components such as a processor executing computer-executable instructions stored on a computer-readable medium, as shown in FIG. 41. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    receiving, by a wireless device, configuration parameters of a cell comprising a plurality of uplink bandwidth parts (BWPs);
    receiving downlink control information comprising:
        a first field indicating a downlink BWP; and
        a second field indicating at least one of a first active uplink BWP or a second active uplink BWP of the plurality of uplink BWPs;
    receiving, via the downlink BWP indicated by the first field, a transport block; and
    transmitting, via at least one uplink BWP indicated by the second field, acknowledgement information associated with the transport block.

2. The method of claim 1, further comprising:
    selecting, based on a first listen-before-talk procedure on the first active uplink BWP and based on a second listen-before-talk procedure on the second active uplink BWP, the first active uplink BWP or the second active uplink BWP as a selected uplink BWP.

3. The method of claim 2, wherein the second field indicates the selected uplink BWP as the at least one uplink BWP.

4. The method of claim 2, wherein the selecting comprises selecting the first active uplink BWP as the selected uplink BWP based on:
    the first listen-before-talk procedure on the first active uplink BWP indicating a clear channel; and the second listen-before-talk procedure on the second active uplink BWP indicating an occupied channel.

5. The method of claim 1, wherein the downlink control information further comprises a third field indicating that frequency hopping for the first active uplink BWP and the second active uplink BWP is enabled for acknowledgement information, and wherein the transmitting the acknowledgement information comprises:
   transmitting, via the first active uplink BWP, a first quantity of acknowledgement information associated with the transport block; and
   transmitting, via the second active uplink BWP, a second quantity of acknowledgement information associated with the transport block.

6. The method of claim 1, wherein the first active uplink BWP is activated at a first time and the second active uplink BWP is activated at a second time.

7. The method of claim 6, wherein the first time and the second time partially overlap.

8. The method of claim 1, further comprising:
   transmitting, via the first active uplink BWP, a first uplink transport block; and
   transmitting, via the second active uplink BWP, a second uplink transport block.

9. The method of claim 1, wherein the receiving the transport block comprises receiving a data packet comprising the transport block, and wherein the method further comprises:
   decoding the data packet, wherein the acknowledgement information is based on whether the data packet is successfully decoded.

10. A wireless device comprising:
    one or more processors; and
    memory storing instructions that, when executed by one or more processors, cause the wireless device to:
      receive configuration parameters of a cell comprising a plurality of uplink bandwidth parts (BWPs);
      receive downlink control information comprising:
        a first field indicating a downlink BWP; and
        a second field indicating at least one of a first active uplink BWP or a second active uplink BWP of the plurality of uplink BWPs;
      receive, via the downlink BWP indicated by the first field, a transport block; and
      transmit, via at least one uplink BWP indicated by the second field, acknowledgement information associated with the transport block.

11. The wireless device of claim 10, wherein the instructions, when executed by the one or more processors, cause the wireless device to:
    select, based on a first listen-before-talk procedure on the first active uplink BWP and based on a second listen-before-talk procedure on the second active uplink BWP, the first active uplink BWP or the second active uplink BWP as a selected uplink BWP.

12. The wireless device of claim 11, wherein the second field indicates the selected uplink BWP as the at least one uplink BWP.

13. The wireless device of claim 11, wherein the instructions, when executed by the one or more processors, cause the wireless device to select the first active uplink BWP or the second active uplink BWP as the selected uplink BWP by selecting based on:
    the first listen-before-talk procedure on the first active uplink BWP indicating a clear channel; and
    the second listen-before-talk procedure on the second active uplink BWP indicating an occupied channel.

14. The wireless device of claim 10, wherein the downlink control information further comprises a third field indicating that frequency hopping for the first active uplink BWP and the second active uplink BWP is enabled for acknowledgement information, and wherein the instructions, when executed by the one or more processors, cause the wireless device to transmit the acknowledgement information by:
    transmitting, via the first active uplink BWP, a first quantity of acknowledgement information associated with the transport block; and
    transmitting, via the second active uplink BWP, a second quantity of acknowledgement information associated with the transport block.

15. The wireless device of claim 10, wherein the first active uplink BWP is activated at a first time and the second active uplink BWP is activated at a second time.

16. The wireless device of claim 15, wherein the first time and the second time partially overlap.

17. The wireless device of claim 10, wherein the instructions, when executed by the one or more processors, cause the wireless device to:
    transmit, via the first active uplink BWP, a first uplink transport block; and
    transmit, via the second active uplink BWP, a second uplink transport block.

18. The wireless device of claim 10, wherein the instructions, when executed by the one or more processors, cause the wireless device to receive the transport block by receiving a data packet comprising the transport block, and wherein the instructions, when executed by the one or more processors, further cause the wireless device to:
    decode the data packet, wherein the acknowledgement information is based on whether the data packet is successfully decoded.

19. A non-transitory computer-readable medium storing instructions that, when executed, configure a wireless device to:
    receive configuration parameters of a cell comprising a plurality of uplink bandwidth parts (BWPs);
    receive downlink control information comprising:
      a first field indicating a downlink BWP; and
      a second field indicating at least one of a first active uplink BWP or a second active uplink BWP of the plurality of uplink BWPs;
    receive, via the downlink BWP indicated by the first field, a transport block; and
    transmit, via at least one uplink BWP indicated by the second field, acknowledgement information associated with the transport block.

20. The non-transitory computer-readable medium of claim 19, wherein the instructions, when executed, configure the wireless device to:
    select, based on a first listen-before-talk procedure on the first active uplink BWP and based on a second listen-before-talk procedure on the second active uplink BWP, the first active uplink BWP or the second active uplink BWP as a selected uplink BWP.

21. The non-transitory computer-readable medium of claim 20, wherein the second field indicates the selected uplink BWP as the at least one uplink BWP.

22. The non-transitory computer-readable medium of claim 20, wherein the instructions, when executed, configure the wireless device to select the first active uplink BWP or the second active uplink BWP as the selected uplink BWP by selecting based on:
    the first listen-before-talk procedure on the first active uplink BWP indicating a clear channel; and the second listen-before-talk procedure on the second active uplink BWP indicating an occupied channel.

23. The non-transitory computer-readable medium of claim 19, wherein the downlink control information further comprises a third field indicating that frequency hopping for the first active uplink BWP and the second active uplink BWP is enabled for acknowledgement information, and wherein the instructions, when executed, configure the wireless device to transmit the acknowledgement information by:
 transmitting, via the first active uplink BWP, a first quantity of acknowledgement information associated with the transport block; and
 transmitting, via the second active uplink BWP, a second quantity of acknowledgement information associated with the transport block.

24. The non-transitory computer-readable medium of claim 19, wherein the first active uplink BWP is activated at a first time and the second active uplink BWP is activated at a second time.

25. The non-transitory computer-readable medium of claim 24, wherein the first time and the second time partially overlap.

26. The non-transitory computer-readable medium of claim 19, wherein the instructions, when executed, configure the wireless device to:
 transmit, via the first active uplink BWP, a first uplink transport block; and
 transmit, via the second active uplink BWP, a second uplink transport block.

27. The non-transitory computer-readable medium of claim 19, wherein the instructions, when executed, configure the wireless device to receive the transport block by receiving a data packet comprising the transport block, and wherein the instructions, when executed, further configure the wireless device to:
 decode the data packet, wherein the acknowledgement information is based on whether the data packet is successfully decoded.

28. A system comprising:
 a base station; and
 a wireless device;
 wherein the base station is configured to:
  transmit configuration parameters of a cell comprising a plurality of uplink bandwidth parts (BWPs);
  transmit downlink control information comprising:
   a first field indicating a downlink BWP; and
   a second field indicating at least one of a first active uplink BWP or a second active uplink BWP of the plurality of uplink BWPs; and
  transmit, via the downlink BWP indicated by the first field, a transport block; and
 wherein the wireless device is configured to:
  transmit, via at least one uplink BWP indicated by the second field, acknowledgement information associated with the transport block.

29. The system of claim 28, wherein the wireless device is configured to:
 select, based on a first listen-before-talk procedure on the first active uplink BWP and based on a second listen-before-talk procedure on the second active uplink BWP, the first active uplink BWP or the second active uplink BWP as a selected uplink BWP.

30. The system of claim 29, wherein the second field indicates the selected uplink BWP as the at least one uplink BWP.

31. The system of claim 29, wherein the wireless device is configured to select the first active uplink BWP or the second active uplink BWP as the selected uplink BWP by selecting based on:
 the first listen-before-talk procedure on the first active uplink BWP indicating a clear channel; and
 the second listen-before-talk procedure on the second active uplink BWP indicating an occupied channel.

32. The system of claim 28, wherein the downlink control information further comprises a third field indicating that frequency hopping for the first active uplink BWP and the second active uplink BWP is enabled for acknowledgement information, and wherein the wireless device is configured to transmit the acknowledgement information by:
 transmitting, via the first active uplink BWP, a first quantity of acknowledgement information associated with the transport block; and
 transmitting, via the second active uplink BWP, a second quantity of acknowledgement information associated with the transport block.

33. The system of claim 28, wherein the first active uplink BWP is activated at a first time and the second active uplink BWP is activated at a second time.

34. The system of claim 33, wherein the first time and the second time partially overlap.

35. The system of claim 28, wherein the wireless device is configured to:
 transmit, via the first active uplink BWP, a first uplink transport block; and
 transmit, via the second active uplink BWP, a second uplink transport block.

36. The system of claim 28, wherein the wireless device is configured to receive the transport block by receiving a data packet comprising the transport block, and wherein the wireless device is further configured to:
 decode the data packet, wherein the acknowledgement information is based on whether the data packet is successfully decoded.

37. The method of claim 1, further comprising:
 receiving second downlink control information indicating an activation of the first uplink BWP and the second uplink BWP of the cell.

* * * * *